US012806954B2

(12) United States Patent
Rogers et al.

(10) Patent No.: US 12,806,954 B2
(45) Date of Patent: Nov. 24, 2026

(54) WHEEL ALIGNMENT SYSTEMS

(71) Applicant: Doftek Pty Ltd, Bayswater (AU)

(72) Inventors: Geoffrey William Rogers, Bayswater (AU); Jacob Arthur Rayner, Bayswater (AU)

(73) Assignee: Doftek Pty Ltd, Bayswater (AU)

( * ) Notice: Subject to any disclaimer, the term of this patent is extended or adjusted under 35 U.S.C. 154(b) by 0 days.

(21) Appl. No.: 19/195,729

(22) Filed: Apr. 30, 2025

(65) Prior Publication Data

US 2025/0326268 A1 Oct. 23, 2025

Related U.S. Application Data

(63) Continuation of application No. 18/249,056, filed as application No. PCT/AU2021/051194 on Oct. 13, 2021, now Pat. No. 12,291,071.

(60) Provisional application No. 63/091,235, filed on Oct. 13, 2020.

(51) Int. Cl.

*B60G 17/019* (2006.01)
*B60G 3/20* (2006.01)
*B60G 21/055* (2006.01)
*B62D 17/00* (2006.01)

(52) U.S. Cl.

CPC ............ *B60G 17/019* (2013.01); *B60G 3/20* (2013.01); *B60G 21/0553* (2013.01); *B62D 17/00* (2013.01); *B60G 2200/144* (2013.01); *B60G 2200/46* (2013.01); *B60G 2200/462* (2013.01); *B60G 2200/464* (2013.01); *B60G 2202/42* (2013.01); *B60G 2202/43* (2013.01); *B60G 2204/419* (2013.01); *B60G 2401/17* (2013.01); *B60G 2600/042* (2013.01)

(58) Field of Classification Search

CPC ......... B60G 17/019; B60G 3/20; B60G 17/00
See application file for complete search history.

(56) References Cited

U.S. PATENT DOCUMENTS

| | | | |
|---|---|---|---|
| 2,907,578 | A | 10/1959 | Taber |
| 4,371,191 | A | 2/1983 | Goldberg et al. |
| 4,445,892 | A | 5/1984 | Hussein et al. |
| 4,573,702 | A | 3/1986 | Klem |
| 4,655,746 | A | 4/1987 | Daniels et al. |
| 4,696,304 | A | 9/1987 | Chin |
| 4,700,972 | A | 10/1987 | Young |

(Continued)

FOREIGN PATENT DOCUMENTS

| | | | |
|---|---|---|---|
| CN | 102198781 | A | 9/2011 |
| CN | 102414035 | A | 4/2012 |

(Continued)

OTHER PUBLICATIONS

US 7,316,661 B2, 01/2008, Azizi (withdrawn)

(Continued)

*Primary Examiner* — Long T Tran
(74) *Attorney, Agent, or Firm* — Shay Glenn LLP

(57) ABSTRACT

Apparatuses and systems for monitoring wheel alignment and/or for controlling vehicle suspension settings to adjust alignment. Described herein are alignment monitoring apparatuses for determining wheel alignment (e.g., camber, castor and/or toe). Also described herein are alignment adjusting or control apparatuses for adjusting one or more of camber, caster and/or toe.

28 Claims, 39 Drawing Sheets

(56) References Cited

U.S. PATENT DOCUMENTS

| | | | |
|---|---|---|---|
| 4,714,460 A | 12/1987 | Calderon | |
| 4,830,003 A | 5/1989 | Wolff et al. | |
| 4,883,459 A | 11/1989 | Calderon | |
| 5,046,753 A | 9/1991 | Giovanni | |
| 5,086,861 A | 2/1992 | Peterson | |
| 5,143,400 A | 9/1992 | Miller et al. | |
| 5,281,200 A | 1/1994 | Corso et al. | |
| 5,318,535 A | 6/1994 | Miraki | |
| 5,338,301 A | 8/1994 | Diaz | |
| 5,397,307 A | 3/1995 | Goodin | |
| 5,411,479 A | 5/1995 | Bodden | |
| 5,415,636 A | 5/1995 | Forman | |
| 5,419,763 A | 5/1995 | Hildebrand | |
| 5,462,529 A | 10/1995 | Simpson et al. | |
| 5,478,309 A | 12/1995 | Sweezer et al. | |
| 5,484,412 A | 1/1996 | Pierpont | |
| 5,514,092 A | 5/1996 | Forman et al. | |
| 5,575,815 A | 11/1996 | Slepian et al. | |
| 5,810,757 A | 9/1998 | Sweezer et al. | |
| 5,833,644 A | 11/1998 | Azizi et al. | |
| 5,833,650 A | 11/1998 | Imran | |
| 5,833,672 A | 11/1998 | Kawata et al. | |
| 5,836,905 A | 11/1998 | Lemelson et al. | |
| 5,836,967 A | 11/1998 | Schneider | |
| 5,839,749 A | 11/1998 | Lyu | |
| 5,840,066 A | 11/1998 | Matsuda et al. | |
| 5,843,050 A | 12/1998 | Jones et al. | |
| 5,888,530 A | 3/1999 | Netti et al. | |
| 5,916,193 A | 6/1999 | Stevens et al. | |
| 5,919,135 A | 7/1999 | Lemelson | |
| 5,919,163 A | 7/1999 | Glickman | |
| 5,925,016 A | 7/1999 | Chornenky et al. | |
| 5,947,459 A | 9/1999 | Ducloux et al. | |
| 5,961,536 A | 10/1999 | Mickley et al. | |
| 5,968,012 A | 10/1999 | Ren et al. | |
| 6,030,362 A | 2/2000 | Boussignac et al. | |
| 6,051,014 A | 4/2000 | Jang | |
| 6,056,721 A | 5/2000 | Shulze | |
| 6,083,198 A | 7/2000 | Afzal | |
| 6,156,053 A | 12/2000 | Gandhi et al. | |
| 6,165,152 A | 12/2000 | Becker et al. | |
| 6,176,844 B1 | 1/2001 | Lee | |
| 6,267,387 B1 | 7/2001 | Weiss | |
| 6,287,290 B1 | 9/2001 | Perkins et al. | |
| 6,299,598 B1 | 10/2001 | Bander | |
| 6,346,098 B1 | 2/2002 | Yock et al. | |
| 6,347,802 B1 | 2/2002 | Mackle et al. | |
| 6,351,663 B1 | 2/2002 | Flower et al. | |
| 6,375,634 B1 | 4/2002 | Carroll | |
| 6,386,553 B2 | 5/2002 | Zetterström | |
| 6,440,097 B1 | 8/2002 | Kupiecki | |
| 6,461,327 B1 | 10/2002 | Addis et al. | |
| 6,482,172 B1 | 11/2002 | Thramann | |
| 6,485,223 B1 | 11/2002 | Van Schmus et al. | |
| 6,485,500 B1 | 11/2002 | Kokish et al. | |
| 6,488,672 B1 | 12/2002 | Dance et al. | |
| 6,508,777 B1 | 1/2003 | Macoviak et al. | |
| 6,520,183 B2 | 2/2003 | Amar | |
| 6,569,146 B1 | 5/2003 | Werner et al. | |
| 6,569,148 B2 | 5/2003 | Bagaoisan et al. | |
| 6,575,932 B1 | 6/2003 | O'Brien et al. | |
| 6,589,264 B1 | 7/2003 | Barbut et al. | |
| 6,592,546 B1 | 7/2003 | Barbut et al. | |
| 6,676,145 B2 | 1/2004 | Carlstedt et al. | |
| 6,682,499 B2 | 1/2004 | Lenker | |
| 6,685,672 B1 | 2/2004 | Forman | |
| 6,692,458 B2 | 2/2004 | Forman et al. | |
| 6,699,231 B1 | 3/2004 | Sterman et al. | |
| 6,702,781 B1 | 3/2004 | Reifart et al. | |
| 6,706,013 B1 | 3/2004 | Bhat et al. | |
| 6,706,062 B2 | 3/2004 | Vardi et al. | |
| 6,723,070 B1 | 4/2004 | Arai et al. | |
| 6,743,196 B2 | 6/2004 | Barbut et al. | |
| 6,929,633 B2 | 8/2005 | Evans et al. | |
| 6,939,320 B2 | 9/2005 | Lennox | |
| 6,986,788 B2 | 1/2006 | Paul et al. | |
| 7,111,849 B2 | 9/2006 | Yun | |
| 7,150,736 B2 | 12/2006 | Barbut et al. | |
| 7,179,251 B2 | 2/2007 | Palasis | |
| 7,210,693 B2 | 5/2007 | Ingalls et al. | |
| 7,297,475 B2 | 11/2007 | Koiwai et al. | |
| 7,407,174 B2 | 8/2008 | Kusaka et al. | |
| 7,452,532 B2 | 11/2008 | Alt | |
| 7,503,904 B2 | 3/2009 | Choi | |
| 7,513,514 B1 | 4/2009 | Schlosser et al. | |
| 7,536,245 B2 | 5/2009 | Naruse et al. | |
| 7,537,562 B2 | 5/2009 | Takano | |
| 7,607,668 B2 | 10/2009 | Dugandzic et al. | |
| 7,645,259 B2 | 1/2010 | Goldman | |
| 7,704,220 B2 | 4/2010 | Solar et al. | |
| 7,708,715 B2 | 5/2010 | Gellman | |
| 7,766,344 B2 | 8/2010 | Buma | |
| 7,780,628 B1 | 8/2010 | Keren et al. | |
| 7,815,624 B2 | 10/2010 | Larson | |
| 7,878,511 B2 | 2/2011 | Haeusler et al. | |
| 7,887,661 B2 | 2/2011 | Chiu et al. | |
| 7,914,020 B2 | 3/2011 | Boston | |
| 8,043,257 B2 | 10/2011 | Nguyen et al. | |
| 8,088,103 B2 | 1/2012 | Teeslink et al. | |
| 8,162,879 B2 | 4/2012 | Hattangadi et al. | |
| 8,172,792 B2 | 5/2012 | Wang et al. | |
| 8,177,829 B2 | 5/2012 | Benson et al. | |
| 8,182,446 B2 | 5/2012 | Schaeffer et al. | |
| 8,182,463 B2 | 5/2012 | Chiu et al. | |
| 8,187,229 B2 | 5/2012 | Weitzner et al. | |
| 8,251,948 B2 | 8/2012 | Goldman | |
| 8,414,473 B2 | 4/2013 | Jenkins et al. | |
| 8,424,880 B2 | 4/2013 | Horiguchi et al. | |
| 8,607,920 B2 | 12/2013 | Jungbecker et al. | |
| 8,702,678 B2 | 4/2014 | Comerota et al. | |
| 8,755,972 B2 | 6/2014 | Aoki et al. | |
| 8,820,759 B1 | 9/2014 | Croutcher | |
| 8,821,476 B2 | 9/2014 | Agah et al. | |
| 8,870,849 B2 | 10/2014 | Steinmetz et al. | |
| 8,973,929 B1 | 3/2015 | Seo et al. | |
| 9,085,256 B2 | 7/2015 | Parker et al. | |
| 9,102,207 B2 | 8/2015 | Raes | |
| 9,205,874 B2 * | 12/2015 | Schindler | B60G 21/0555 |
| 9,216,625 B2 | 12/2015 | Ramirez Ruiz | |
| 9,254,210 B2 | 2/2016 | Bourang | |
| 9,457,171 B2 | 10/2016 | Agah et al. | |
| 9,463,304 B2 | 10/2016 | Agah et al. | |
| 9,707,813 B2 | 7/2017 | Randle | |
| 10,099,040 B2 | 10/2018 | Agah et al. | |
| 10,112,649 B2 | 10/2018 | Rogers | |
| 10,286,191 B2 | 5/2019 | Wang et al. | |
| 10,369,854 B2 | 8/2019 | Klinger et al. | |
| 10,512,761 B2 | 12/2019 | Agah et al. | |
| 10,668,950 B2 | 6/2020 | Kurita et al. | |
| 10,695,543 B2 | 6/2020 | Agah et al. | |
| 10,988,177 B2 | 4/2021 | Rogers | |
| 11,052,224 B2 | 7/2021 | Agah et al. | |
| 11,541,211 B2 | 1/2023 | Agah et al. | |
| 11,565,752 B2 | 1/2023 | Rogers | |
| 11,952,010 B1 | 4/2024 | Roy | |
| 12,084,110 B2 | 9/2024 | Rogers | |
| 12,290,564 B2 | 5/2025 | Agah et al. | |
| 12,291,071 B2 | 5/2025 | Rogers et al. | |
| 2001/0041862 A1 | 11/2001 | Glickman | |
| 2002/0016565 A1 | 2/2002 | Zadno-Azizi et al. | |
| 2002/0072706 A1 | 6/2002 | Hiblar et al. | |
| 2002/0082548 A1 | 6/2002 | Sanchez et al. | |
| 2002/0107471 A1 | 8/2002 | Thompson et al. | |
| 2002/0115982 A1 | 8/2002 | Barbut et al. | |
| 2003/0116375 A1 | 6/2003 | DeBarr | |
| 2003/0147862 A1 | 8/2003 | Buschmann et al. | |
| 2003/0149997 A1 | 8/2003 | Hageman | |
| 2004/0094924 A1 | 5/2004 | Jones et al. | |
| 2005/0051988 A1 | 3/2005 | Gradu et al. | |
| 2005/0059930 A1 | 3/2005 | Garrison et al. | |
| 2005/0059931 A1 | 3/2005 | Garrison et al. | |
| 2005/0115785 A1 | 6/2005 | Thomas | |
| 2005/0149112 A1 | 7/2005 | Barbut | |
| 2005/0149159 A1 | 7/2005 | Andreas et al. | |

(56) References Cited

U.S. PATENT DOCUMENTS

| | | | | |
|---|---|---|---|---|
| 2006/0009798 | A1 | 1/2006 | Callister et al. | |
| 2006/0149218 | A1 | 7/2006 | Slater et al. | |
| 2006/0149393 | A1 | 7/2006 | Calderon | |
| 2006/0173440 | A1 | 8/2006 | Lamson et al. | |
| 2006/0188442 | A1 | 8/2006 | Hallahan | |
| 2006/0200075 | A1 | 9/2006 | Azizi | |
| 2006/0253079 | A1 | 11/2006 | McDonough et al. | |
| 2007/0010782 | A1 | 1/2007 | Doty et al. | |
| 2007/0055132 | A1 | 3/2007 | Camus et al. | |
| 2007/0080513 | A1 | 4/2007 | Osterlanger et al. | |
| 2007/0131474 | A1 | 6/2007 | Zetterstroem | |
| 2008/0051660 | A1 | 2/2008 | Kakadaris et al. | |
| 2008/0058759 | A1 | 3/2008 | Makower et al. | |
| 2008/0082046 | A1 | 4/2008 | Kato et al. | |
| 2008/0269718 | A1 | 10/2008 | Wiener et al. | |
| 2008/0303234 | A1 | 12/2008 | Mc Cann | |
| 2009/0018526 | A1 | 1/2009 | Power et al. | |
| 2009/0043194 | A1 | 2/2009 | Barbut | |
| 2009/0048577 | A1 | 2/2009 | Gillies et al. | |
| 2009/0088676 | A1 | 4/2009 | Murata | |
| 2009/0131866 | A1 | 5/2009 | Zhang et al. | |
| 2009/0143760 | A1 | 6/2009 | Van Dam et al. | |
| 2009/0198093 | A1 | 8/2009 | Meissner et al. | |
| 2009/0198216 | A1 | 8/2009 | Muni et al. | |
| 2009/0209631 | A1 | 8/2009 | Zsebo | |
| 2009/0264819 | A1 | 10/2009 | Diethrich et al. | |
| 2009/0267312 | A1 | 10/2009 | Vaxelaire | |
| 2009/0275918 | A1 | 11/2009 | Crocker | |
| 2010/0016836 | A1 | 1/2010 | Makower et al. | |
| 2010/0106181 | A1 | 4/2010 | Gross et al. | |
| 2010/0331815 | A1 | 12/2010 | Alt | |
| 2011/0093000 | A1 | 4/2011 | Ogle et al. | |
| 2011/0152683 | A1 | 6/2011 | Gerrans et al. | |
| 2011/0218494 | A1 | 9/2011 | Gerrans et al. | |
| 2011/0257577 | A1 | 10/2011 | Lane et al. | |
| 2011/0282195 | A1 | 11/2011 | Solar et al. | |
| 2012/0259215 | A1 | 10/2012 | Gerrans et al. | |
| 2013/0173120 | A1 | 7/2013 | Michel et al. | |
| 2014/0214002 | A1 | 7/2014 | Lieber et al. | |
| 2014/0239603 | A1 | 8/2014 | Balandin | |
| 2014/0364835 | A1 | 12/2014 | Allen et al. | |
| 2015/0018762 | A1 | 1/2015 | Fierens et al. | |
| 2015/0191070 | A1* | 7/2015 | Raymond | B60G 21/051 280/124.128 |
| 2015/0191546 | A1 | 7/2015 | Molldrem et al. | |
| 2016/0082178 | A1 | 3/2016 | Agah et al. | |
| 2017/0305221 | A1 | 10/2017 | Schmidt | |
| 2018/0169067 | A1 | 6/2018 | Bascomb et al. | |
| 2018/0251156 | A1 | 9/2018 | Sigmar | |
| 2020/0206481 | A1 | 7/2020 | Agah et al. | |
| 2020/0223270 | A1 | 7/2020 | Kinkel et al. | |
| 2021/0338977 | A1 | 11/2021 | Agah et al. | |
| 2022/0048568 | A1 | 2/2022 | Fischer et al. | |
| 2023/0074504 | A1* | 3/2023 | Ellifson | B60G 21/005 |
| 2023/0076135 | A1* | 3/2023 | Tesar | B60K 17/043 |
| 2023/0302262 | A1 | 9/2023 | Agah et al. | |
| 2023/0355934 | A1 | 11/2023 | Agah et al. | |
| 2023/0382175 | A1* | 11/2023 | Rogers | B60G 15/068 |
| 2025/0065954 | A1 | 2/2025 | Rogers et al. | |

FOREIGN PATENT DOCUMENTS

| | | | |
|---|---|---|---|
| CN | 103317992 | A | 9/2013 |
| CN | 104417616 | A | 3/2015 |
| CN | 106080073 | A | 11/2016 |
| CN | 108372764 | A | 8/2018 |
| DE | 10064585 | A1 | 9/2002 |
| DE | 102009033105 | A1 | 1/2011 |
| DE | 102010041407 | A1 | 3/2012 |
| DE | 102012019870 | A1 | 4/2014 |
| DE | 102016203872 | A1 | 9/2017 |
| DE | 102016204081 | A1 | 9/2017 |
| EP | 0402467 | A1 | 12/1990 |
| EP | 2436541 | B1 | 1/2015 |
| EP | 3463939 | A1 | 4/2019 |
| JP | S60-193781 | A | 10/1985 |
| JP | S62-134635 | A | 6/1987 |
| JP | S62-268772 | A | 11/1987 |
| JP | S64-39112 | A | 2/1989 |
| JP | S64-39112 | U | 3/1989 |
| JP | S64-090805 | A | 4/1989 |
| JP | H02-003979 | U | 1/1990 |
| JP | H02-095905 | A | 4/1990 |
| JP | H02-095908 | A | 4/1990 |
| JP | H04-22629 | U | 2/1992 |
| JP | H05-221217 | A | 8/1993 |
| JP | H06-122312 | A | 5/1994 |
| JP | H06-166317 | A | 6/1994 |
| JP | H06-270836 | A | 9/1994 |
| JP | H10-324253 | | 12/1998 |
| JP | 2001021019 | A | 1/2001 |
| JP | 2004122932 | A | 4/2004 |
| JP | 2009113796 | A | 5/2006 |
| JP | 2006224829 | A | 8/2006 |
| JP | 2007106332 | A | 4/2007 |
| JP | 2007326459 | A | 12/2007 |
| JP | 2008032064 | A | 2/2008 |
| JP | 2008068853 | A | 3/2008 |
| JP | 2009132279 | A | 6/2009 |
| JP | 2009133339 | A | 6/2009 |
| JP | 2010280370 | A | 12/2010 |
| JP | 2011207332 | A | 10/2011 |
| JP | 2013500067 | A | 1/2013 |
| JP | 2013203271 | A | 10/2013 |
| JP | 2016168085 | A | 9/2016 |
| JP | 2017500144 | A | 1/2017 |
| KR | 10-2004-0097752 | A | 11/2004 |
| KR | 10-2004-0101818 | A | 12/2004 |
| KR | 10-2011-058462 | A | 6/2011 |
| KR | 10-1461903 | B1 | 11/2014 |
| KR | 10-2015-099138 | A | 8/2015 |
| KR | 102488024 | B1 | 1/2023 |
| WO | WO02/074178 | A2 | 9/2002 |
| WO | WO2004/041621 | A1 | 5/2004 |
| WO | WO2014/197362 | A1 | 12/2014 |
| WO | WO2015/074045 | A2 | 5/2015 |
| WO | WO2016/011328 | A1 | 1/2016 |
| WO | WO2022/077059 | A1 | 4/2022 |

OTHER PUBLICATIONS

America Cancer Society; Cancer facts and figures, American Cancer Society; 72 pages; retrieved from the internet (https://www.cancer.org/research/cancer-facts-statistics/all-cancer-facts-figures/cancer-facts-figures-2016.html); 2016 (the year of publication is sufficiently earlier than the effective U S. filing date and any foreign priority date so that the particular month of publication is not in issue).

Burkhardt et al; Intra-arterial chemotherapy for malignant gliomas: a critical analysis; Interventional Neuroradiology; 17(3); pp. 286-295; Sep. 2011.

Cancer.net; Colorectal cancer: stages; 12 pages; retrieved from the internet (https://www.cancer.net/cancer-types/colorectal-cancer/stages) on Jan. 14, 2020.

Cancer.net; Liver cancer: statistics; 2 pages; retrieved from the internet (https://www.cancer.net/cancer-types/liver-cancer/statistics) on Jan. 14, 2020.

Cancer.net; Uterine cancer: Statistics; 2 pages; retrieved from the internet (https://www.cancer.net/cancer-types/uterine-cancer/statistics) on Jan. 14, 2020.

Chauffert et al.; Phase III trial comparing intensive induction chemoradiotherapy (60 Gy, infusional 5-FU and intermittent cisplatin) followed by maintenance gemcitabine with gemcitabine alone for locally advanced unresectable pancreatic cancer. Definitive results of the 2000-01 FFCD?SFRO study; Annals of Oncology; 19(9); pp. 1592-1599; Sep. 2008.

Goodman et al.; Static and dynamic vascular impact of large artery irradiation; International Journal of Radiation Oncology* Biology* Physics; 26(2); pp. 305-310; May 20, 1993.

(56) References Cited

OTHER PUBLICATIONS

Jain; Delivery of molecular and cellular medicine to solid tumors; Advanced Drug Delivery Reviews; vol. 64; pp. 353-365; Dec. 1, 2012.
Kawaguchi et al; Comparison of neoadjuvant intraaterial chemotherapy versus concurrent chemoradiotherapy in patients with stage IIB uterine cervical cancer; World Journal of Oncology; 4(6); pp. 221-229; Dec. 2013.
Lewandowski et al.; Transcatheter intraarterial therapies: rationale and overview; Radiology; 259(3); pp. 641-657; Jun. 2011.
Mahadevan et al.; Sterotactic body radiotherapy and gemcitabine for locally advanced pancreatic cancer; International Journal of Radiation Oncology*Biology*Physics; 78(3); pp. 735-742; Nov. 2010.
Medgadget; Renovocath for targeted fluid delivery into peripheral vasculature cleared in europe; 3 pages; retrieved from the internet (https://www.medgadget.com/2015/10/renovocath-targeted-fluid-delivery-peripheral-vasculature-cleared-europe.html); Oct. 23, 2015.
Moghanaki; Further evidence of effective adjuvant combined radiation and chemotherapy following curative resection of pancreatic cancer; Gastrointestinal Tumor Study Group; Cancer; 59(12); pp. 2006-2010; 1987 (the year of publication is sufficiently earlier than the effective U.S. filing date and any foreign priority date so that the particular month of publication is not in issue).
Multhoff et al.; Radiation-induced changes in microcirculation and interstitial fluid pressure affecting delivery of macromolecules and nanotherapeutics to tumors. Frontiers in Oncology, 2012; 2(165); pp. 1-6, Nov. 2012.
National Cancer Institute; About cancer; 3 pages; retrieved from the internet (https://www.cancer.gov/about-cancer) on Jan. 14, 2020.
Neoptolemos et al; Adjuvant chemoradiotherapy and chemotherapy in resectable pancreatic cancer: a randomised controlled trial; The Lancet: 358(9293); pp. 1576-1585; Nov. 2001.
Park et al.; Radiation-induced vascular damage in tumors: implications of vascular damage in ablative hypofractionated radiotherapy (SBRT and SRS). Radiation research; 177(3); pp. 311-327; Mar. 1, 2012.
Renovorx; RenovoCath Animation, delivering what matters; Dec. 17, 2014 (Dec. 17, 2014), Retrieved from the internet: 1 page; URL:https//www.youtube.com/watch?v=?v=LFZ7tvCU2a4&feature=youtube on Jan. 13, 2020.
Renovorx; RenovoCath } RC120 Receives FDA 510(k) Clearance; 3 pages; retrieved from the internet (https://renovorx.com/renovocath-rc120-receives-fda-clearance/); Oct. 30, 2014.
Renovorx; Researchers report survival benefits with use of renovocath TM in patients with locally advanced pancreatic tumors, 2 pages; retrieved from the internet (https://renovorx.com/researchers-report-survival-benefits-use-renovocath-patients-locally-advanced-pancreatic-tumors/); Apr. 19, 2017.
Renovorx; Wayback Machine: RenovoCath } RC120—RenovoRx; 7 pages; retrieved from the internet (https://web.archive.org/web/20230000000000*/renovorx.com/wp-content/uploads/2016/07/MTK-5001.pdf); Apr. 25, 2017.
Sante; Lungcancer prognosis; 3 pages; retrieved from the internet (https://translate.google.com/translate?hl=en&sl=fr&u=http://www.lungcancer-prognosis.com/&prev=search) on Jan. 14, 2020.
Suryadevra et al; Immunotherapy for malignant glioma; Surgical Neurology International; 6(Suppl 1); S68-S77; Feb. 2015.
Vogl et al.; Regional chemotherapy of the lung: transpulmonary chemoembolization in malignant lung tumors; Seminars in Interventional Radiology; 30(2); pp. 176-184; Jun. 2013.
Wasan; The Emerging Synergy between Radioembolization, Systemic Chemotherapy, and Liver Surgery in Metastatic Colorectal Cancer; European Oncological Disease; 1(1); pp. 52-58; 2007 (the year of publication is sufficiently earlier than the effective U.S. filing date and any foreign priority date so that the particular month of publication is not in issue).
Agah et al.; U.S. Appl. No. 19/129,277 entitled "Methods and apparatuses for delivering an agent through the vasa vasorum," filed May 12, 2025.

* cited by examiner

WHEEL ALIGNMENT SYSTEMS

CLAIM OF PRIORITY

This patent application is a continuation of U.S. patent application Ser. No. 18/249,056, titled "WHEEL ALIGNMENT SYSTEMS," filed on Apr. 13, 2023, now U.S. Pat. No. 12,291,071, which is a national phase application under 35 USC 371 of International Patent Application No. PCT/AU2021/051194, titled "WHEEL ALIGNMENT SYSTEMS," filed on Oct. 13, 2021, now International Publication No. WO 2022/077059, which claims priority to U.S. Provisional Patent Application No. 63/091,235 titled "WHEEL ALIGNMENT SYSTEMS," filed on Oct. 13, 2020, each of which are herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Described herein are wheel alignment monitoring and wheel alignment control/adjustment apparatuses (e.g., systems, devices, etc., including software, firmware and hardware) and methods. These wheel alignment monitoring and/or adjustment apparatuses may include one or more electromechanical apparatuses for controlling vehicle suspension settings.

BACKGROUND

The positional settings on any vehicle's (e.g. an automobile's) suspension system significantly affect the vehicle's driving characteristics, including handling, tire wear, fuel efficiency, safety, passenger comfort, and the like. There is typically a trade-off between these characteristics, whereby one set of settings tends to optimize some driving characteristics, while another set of settings tends to optimize other driving characteristics.

For example, vehicles predominantly used for normal road applications typically use more neutral settings for camber, castor and/or toe that optimize passenger comfort, but sacrifice handling performance. On the other hand, vehicles predominantly used for competition applications (e.g. racing) typically use more aggressive settings that optimize handling performance but sacrifice passenger comfort.

If a vehicle is generally used for a single purpose only, settings can be fixed appropriately for that application. However, there are many vehicles that are used for more than one purpose, or in more than one set of driving conditions, where it is desirable to alter settings. For example, many modern sports cars are used for commuting to work during the week (where passenger comfort is desirable), and then used for sport/recreational use on the weekend (where handling performance is desirable). Furthermore, in order to optimize variables such as handling, safety, fuel efficiency, tire life and emissions, different vehicle settings should ideally be used according to the driving conditions, including weather, road condition, and vehicle activity/use.

Suspension settings that may be adjusted on a vehicle in order to alter driving characteristics may include: spring rates, damper rates, wheel alignment (e.g., camber, castor and toe), anti-roll bar rates, roll centers, tire pressures, and the like. While magnetic or adaptive dampers allow the damping rates of a suspension system to be conveniently adjusted via the push of a button or automatically, in general the other settings must be adjusted manually, most commonly by a mechanic. For people frequently using their vehicles for more than purpose, or in more than one set of driving conditions, it is time-consuming and expensive to alter settings often.

Thus, there is a need for a solution that enables suspension settings other than just damper rates to be quickly and easily altered, for example, by the press of a button or automatically. Further, it would be particularly useful to provide solutions that may be retrofitted onto existing suspensions systems. Described herein are apparatuses (e.g. devices and systems) and methods of making and operating them, which address this need. Any of the apparatuses described herein may manually, automatically or semi-automatically (e.g., electromechanically, robotically, etc.) adjust one or more suspension settings such as camber, toe, and castor or combinations of these. There is also a need for a solution that enables wheel alignment (e.g. camber, castor and/or toe) to be monitored on-vehicle, for the purpose of alerting a driver/user if the wheel alignment deviates beyond a determined acceptance level and/or automatically correcting for the deviation by electromechanically adjusting the wheel alignment. In particular, these systems must be robust, inexpensive and have a high degree of accuracy. Described herein are apparatuses (e.g. devices and systems) and methods of making and operating them, which address this need.

SUMMARY OF THE DISCLOSURE

The apparatuses (systems, devices, etc.) and methods described herein provide wheel alignment monitoring, and in some configurations, wheel alignment control/adjustment. The apparatuses and methods may allow for improved handling performance, which impacts cornering performance, safety and obstacle avoidance; lower rolling resistance, which impacts fuel efficiency, emissions, noise, vibration and harshness (NVH), and tire life; and lower peak tire temperatures, which impacts tire life and uneven tire wear.

At least some of the apparatuses and methods described herein may be related to, and may substantially improve upon, U.S. patent application Ser. No. 15/875,919, filed on Oct. 30, 2018, which issued as U.S. Pat. No. 10,112,649, claiming priority to Provisional Patent Application No. 62/447,912, filed Jan. 19, 2017; and to pending patent application Ser. No. 16/478,394, titled "Electromechanical Devices for Controlling Vehicle Suspension Settings," filed on Jul. 16, 2019, which is a U.S. National phase application claiming priority to PCT No. PCT/IB2018/000352, filed on Jan. 19, 2018, which also claims priority to Provisional Patent Application No. 62/447,912, filed Jan. 19, 2017. All of these applications and issued patents are herein incorporated by reference in its entirety.

In general, the wheel alignment settings for each wheel may be jointly or independently controlled by a single apparatus or a plurality of apparatuses. The apparatuses may be configured to be compatible with the vehicle manufacturer's standard suspension systems, or with aftermarket suspension systems.

Any of the devices described herein may be used on the suspension for any wheel, including a left (e.g. driver's side)

wheel, a right (e.g. passenger's side) wheel, a front wheel, a rear wheel, a steered wheel, a non-steered wheel, a driven wheel, a non-driven wheel, or any combination of these (e.g., both front wheels, both rear wheels, all four wheels, etc.). For example, a vehicle may have one or more devices fitted to the front (e.g. steered) wheels only to control front wheel alignment settings. In another example, a vehicle may have one or more devices fitted to all wheels to control all wheel alignment settings.

In general, the wheel alignment settings of each wheel may be controlled independently of all other wheels. For example, it may be possible to have different wheel alignment settings between front and rear wheels, and/or between left and right wheels, and/or between steered and non-steered wheels, and/or between driven and non-driven wheels.

The apparatuses described herein include apparatuses for controlling wheel alignment settings (e.g., adjusting wheel alignment) of a vehicle having a suspension. For example, an apparatus for controlling wheel alignment systems may be a device and may include: a frame, configured to be mounted to the vehicle (and to secure components of the device to the vehicle); a drive motor coupled to the frame; a drive shaft driven in rotation by the drive motor; a gear engaging the drive shaft, such that rotation of the drive shaft by the drive motor rotates the gear; and an offset bushing coupled to the gear and configured to be rotated by the gear when the drive motor rotates the gear, wherein the offset bushing is configured to couple with a linkage coupled to a wheel of the vehicle and to drive the linkage into or away from the wheel to adjust the alignment of the vehicle.

In some variations the gear (which may be or be part of a gear assembly), includes a hypoid drive gear and an offset gear, wherein the offset gear is configured to rotate the offset bushing. The offset gear may be rigidly coupled to the offset bushing. For example, the drive shaft may be geared to the offset bushing with a 2:1 or greater gear ratio (e.g., 3:1 or greater, 4:1 or greater, 5:1 or greater, etc.), so that the movement of the motor may be translated into relatively small and precise movement of the offset bushing. The linkage may be part of the suspension (e.g., includes a control arm of a double-wishbone suspension system, a link of a multi-link suspension system, etc.). In any of these apparatuses, the linkage may be a toe link of a suspension system that may control the toe angle of the wheel. This may be useful for rear wheel steering and is typically independent of suspension geometry (i.e. MacPherson, double-wishbone, multi-link, etc.).

The frame may be configured to secure the drive motor perpendicular to the linkage. In some variations the frame may secure the drive motor so that it is parallel to the linkage. The drive motor may extend laterally from the frame. The frame may be configured to pivotally support the offset bushing.

Any of these apparatuses (e.g., devices) may be configured to adjust camber or castor of a wheel, as described herein.

The apparatus may include one or more encoders configured to monitor the position of the drive motor and/or gear. In general, these apparatuses may be configured to lock, and secure the position of the offset bushing when the motor is not powered. For example, the drive motor may be configured to lock in position when not driving rotation of the drive shaft.

For example, a device for adjusting wheel alignment of a vehicle having a suspension may include: a frame, configured to be securely mounted to the vehicle; a spiral bevel gear including a hypoid drive gear, and an offset gear having a larger diameter than the hypoid drive gear; a drive motor coupled to the frame and configured to drive the hypoid drive gear; and an eccentric shaft coupled to the offset gear and configured to be rotated by the offset gear, when the drive motor rotates the hypoid drive gear to rotate the offset gear, wherein the eccentric shaft is configured to couple with a linkage coupled to a wheel of the vehicle.

The eccentric shaft may be configured to couple to the linkage. As mentioned, the linkage may comprise, for example, a control arm of a double-wishbone suspension system, a straight arm, a link of a multi-link suspension system, etc. The linkage may comprise a toe link of a suspension system for controlling the toe angle of the wheel.

Any of these apparatuses may include an electronic controller configured to control actuation of the drive motor.

As mentioned, the device may include an encoder, e.g., configured to monitor the position of the drive motor and/or spiral bevel gear.

Also described herein are systems for adjusting wheel alignment of a vehicle having a suspension, that include: a frame mounted to a body of the vehicle; a drive motor coupled to the frame; a drive shaft driven in rotation by the drive motor; a gear engaging the drive shaft, such that rotation of the drive shaft by the drive motor rotates the gear; an offset bushing coupled to the gear and configured to be rotated by the gear when the drive motor rotates the gear; and a linkage coupled to the offset bushing wherein the linkage is also coupled to a wheel of the vehicle, wherein rotation of the offset bushing causes the linkage to move axially perpendicular to the wheel or the vehicle to adjust alignment of the wheel.

The system may be configured as a camber adjustment system. In some variations, the system is configured as a caster adjustment system.

As mentioned, the linkage may be an upper or a lower control arm of a double-wishbone suspension, a straight arm of a multi-link system, and/or a link of a multi-link suspension system. The linkage may be a toe link of a suspension system for controlling the toe angle of the wheel. The drive shaft may be geared to the offset bushing through the gear with a 2:1 or greater gear ratio, as described above.

The system may include an electronic controller configured to control the actuation of the drive motor.

A system for adjusting alignment of a vehicle having a suspension may include: a frame mounted to a body of the vehicle; a spiral bevel gear including; a hypoid drive gear, and an offset gear having a larger diameter than the hypoid drive gear; a drive motor coupled to the frame and configured to drive the hypoid drive gear; and an eccentric shaft coupled to the offset gear and configured to be rotated by the offset gear, when the drive motor rotates the hypoid drive gear to rotate the offset gear, a linkage coupled to the eccentric shaft wherein the linkage is also coupled to a wheel of the vehicle, wherein rotation of the eccentric shaft causes the linkage to move axially perpendicular to the knuckle of the wheel or the vehicle.

Also described herein are systems for monitoring the alignment of one or more wheels of a vehicle. These systems may generally include one or more sensors coupled to a non-rotating part that otherwise moves with the tread plane of the wheel, e.g., a non-rotating portion of a wheel assembly, such as the knuckle (e.g., steering knuckle, spindle, etc.), hub (wheel hub, hub assembly, etc.), or the like.

For example, a system for monitoring the alignment of one or more wheels of a vehicle may include: a wheel inertial measurement unit (IMU), comprising one or more sensors, coupled to the steering knuckle of a wheel of the vehicle so as to move with a tread plane of the wheel; a body IMU, comprising a plurality of sensors, rigidly coupled to a frame of the vehicle; and a processor adapted to receive data from the wheel IMU and body IMU and to calculate one or more of camber, caster and toe based on changes in the wheel IMU data relative to the body IMU data.

In general, the IMU may refer generally to the one or more processors and position, orientation and/or inclination sensors, such as (but not limited to) accelerometers, gyroscopes, and magnetometers. As used herein, the term IMU may also be referred to as a control unit or a processing unit. For example, the systems described herein may include one or more processing units to receive sensed data from any one or more of an accelerometer (for measuring camber and/or caster), a magnetometer (for sensing toe and/or camber and/or castor), etc. Any of the apparatuses (e.g., systems) described herein may be configured to include controller area network (CAN) transceivers (e.g., communications circuitry) and/or may be configured to use CAN protocols to allow any of the microcontrollers and devices (e.g., a sensor module, a magnet module, etc.) to communicate with each other (and/or with a processing unit/IMU) or other applications without a host computer. It is a message-based protocol. For each device, the data in a frame is transmitted sequentially but in such a way that if more than one device transmits at the same time, the highest priority device can continue while the others back off. Frames are received by all devices, including by the transmitting device, but only processed and actioned by the intended recipient device(s).

As will be described in greater detail below, in some variations the wheel IMU (e.g., sensor module) may include a magnetometer, which may use one or more reference magnets that generate a reference magnetic field. For example, the system may include one or more magnets coupled to the vehicle (e.g., magnet module(s)) around the wheel IMU and configured to apply a reference magnetic field of greater than about 0.25 mT to the wheel IMU. The magnets may be permanent magnets or electromagnets. Any of these systems may include an encoder coupled to the steering knuckle by an encoder linkage, in which the encoder is configured to communicate with the processor.

For example, a system for monitoring the alignment of one or more wheels of a vehicle may include: a magnetometer coupled to the one or more wheels (e.g., to a non-rotating part of the wheel assembly that moves with the tread axis of the wheel); a reference magnet rigidly coupled to a frame of the vehicle and configured to generate a reference magnetic field to be detected by the magnetometer; and a processor configured to receive data from the magnetometer and to determine one or more of toe, camber or caster of the wheel based on the received data.

Any of these systems may include a body sensor coupled (e.g., rigidly coupled) to the frame of the vehicle, wherein the processor is further configured to receive data from the body sensor.

As mentioned, in any of these systems, the magnetometer is part of an inertial sensor module (e.g., measurement unit, or IMU); the sensor module (e.g., wheel IMU) may include additional sensors, such as accelerometer, gyroscope, etc. For example, the system may include an accelerometer coupled to the one or more wheels.

Any of the systems described herein may include one or more field-shaping magnets configured to modify (e.g., expand, spread, etc.) the reference magnetic field so that the movement through the magnetic field by the magnetometer may be correlated with sufficient resolution to allow reliable readings. The field-shaping magnet may be positioned anywhere round the magnetometer and may move with the magnetometer. For example, the field-shaping magnet may be mounted behind the magnetometer, between the magnetometer and the wheel (e.g., in the knuckle, etc. region). For example, the methods and apparatuses described herein may include a second field-shaping magnet. A field-shaping magnet may be mounted, e.g., in front of the magnetometer, including in-line with an axis of rotation of the wheel.

Any number of reference (and/or field-shaping magnets) may be used. For example, the system may include a second reference magnet rigidly coupled to the frame of the vehicle contributing to the reference magnetic field. The reference magnet may be configured to apply a magnetic field of greater than about 0.25 mT to the magnetometer. The reference magnet may be a comprises an electromagnet.

Also described herein are systems for monitoring the alignment of one or more wheels of a vehicle. For example, a system may include: a magnetometer coupled to the one or more wheels of the vehicle; one or more reference magnets rigidly coupled to a frame of the vehicle and configured to generate a reference magnetic field to be detected by the magnetometer; one or more field-shaping magnets configured to expand the reference magnetic field; and a processor configured to receive data from the magnetometer and to determine one or more of toe, camber or caster of the wheel based on the received data.

Also described herein are methods of A method of adjusting the alignment of a wheel of a vehicle, the method comprising: receiving input data from one or more sensors on the vehicle (e.g., magnetometer, accelerometer, gyroscope, etc.); prioritizing the input data into primary and secondary, or more, input data streams; combining primary input data according to a measure of vehicle operating dynamics; computing target wheel alignment settings based on combined primary input data and one or more alignment maps; comparing target wheel alignment settings to secondary input data streams; and converting target settings to drive signals for one or more alignment adjusting units in the vehicle.

Any of the methods described herein may include (as part of or separate from receiving input data) receiving data from one or more sensor modules (e.g., wheel IMUs) and one or more central IMUs (also referred to herein as body IMUs or processors). The one or more alignment maps may include camber alignment maps (and/or castor alignment maps, and/or toe alignment maps, etc.) for at least two of: normal mode, sport mode and sport+mode.

Also described herein are apparatuses including electromechanical brakes for locking the motor of an alignment electromechanical actuator in place when the power is off. For example, described herein are apparatuses for adjusting alignment of a wheel of a vehicle that include: an electromechanical actuator comprising an electric motor, the electromechanical actuator coupled to the wheel to drive adjustment of one or more of camber, caster and toe; an electromechanical brake configured to lock the electric motor, the electromechanical brake comprising: a solenoid with a spring-return coupled to the electric motor; a brake arm; and a notched or slotted disk coupled to a rotating shaft of the electric motor, wherein the solenoid is configured to engage the brake arm into the notched disk to prevent the electric motor from rotating when the power to the solenoid is turned off.

In some examples the brake arm may be pivotally connected to the solenoid. Any of these apparatuses may include a support for the brake arm coupled to the electric motor.

The support may comprise a channel, or slot that supports the brake arm to prevent it from bending or fracturing when the brake arm is engaged in a notch of the notched disk.

Any of these apparatuses may also include an electronic controller configured to operate the electromechanical actuator. The electronic controller may be configured to adjust toe when the electronic controller also adjusts camber or caster by controlling a camber or caster adjusting unit. In some examples, the apparatus may be configured to adjust the toe of a steered wheel of the vehicle. The apparatus may be configured to adjust the toe of a non-steered wheel of the vehicle.

Any of these apparatuses may be configured to adjust toe. For example the apparatus may include a telescoping rod configured to extend or retract in a distal-to-proximal direction by rotating within a rod mount; wherein the electromechanical actuator is coupled to the telescoping rod through a gear set, wherein the electromechanical actuator is configured to drive rotation of the telescoping rod to extend or retract the telescoping rod; and a link mount at a proximal end of the telescoping rod, wherein the link mount is configured to connect to the vehicle.

Any of these apparatuses may be configured to adjust camber. For example, the apparatus may include a mount body having a translational bearing surface, wherein the mount body is configured to rigidly connect to the vehicle's frame; a strut holder configured to hold an end of the strut, wherein the strut holder is movably connected to the translational bearing surface, further wherein the translational bearing surface is configured to permit the strut holder to move in a first translational axis and to constrain the strut holder from moving in a second translational axis that is transverse to the first translational axis or a third translational axis that is transverse to the second translational axis; and wherein the electromechanical actuator is coupled to the strut holder to drive the strut holder along the translational bearing surface in the first translational axis.

BRIEF DESCRIPTION OF THE DRAWINGS

FIG. 2K shows the module of FIG. 2J with a portion of the cover removed.

FIG. 2M shows the magnet module of FIG. 2L with a portion of the cover removed.

FIG. 22A shows a front perspective view of an apparatus for controlling camber mounted on the top of a strut of a MacPherson-type suspension. The device is configured to control the camber or castor of a MacPherson strut suspension system. FIG. 22B is a top perspective view of the apparatus of FIG. 22A mounted onto the top of a strut tower. FIG. 22C is a sectional view thorough the apparatus of FIG. 22B. FIG. 22D is a bottom perspective view of the apparatus of FIG. 22A shown with the outer housing removed and part of the suspension (and frame) removed. FIG. 22E is a top perspective view of the apparatus of FIG. 22D. FIGS. 22F and 22G show alternative sectional views through the apparatus of FIG. 22A with and without a housing cover, respectively.

In FIGS. 23A-23H the apparatus is configured to control the toe of a wheel. FIGS. 23A-23B show perspective views of the toe controlling electromechanical apparatus. FIG. 23C is a section view through the electromechanical apparatus of FIGS. 23A-23B. FIG. 23D is a larger section view through a portion of the electromechanical apparatus of FIGS. 23A-23B. FIGS. 23E and 23F illustrate side and top perspective views, respectively, of the electromechanical apparatus of FIGS. 23A-23B. FIG. 23G is an enlarged left perspective view and FIG. 23F is an enlarged right perspective view of the same electromechanical apparatus.

DETAILED DESCRIPTION

Figure 1A:
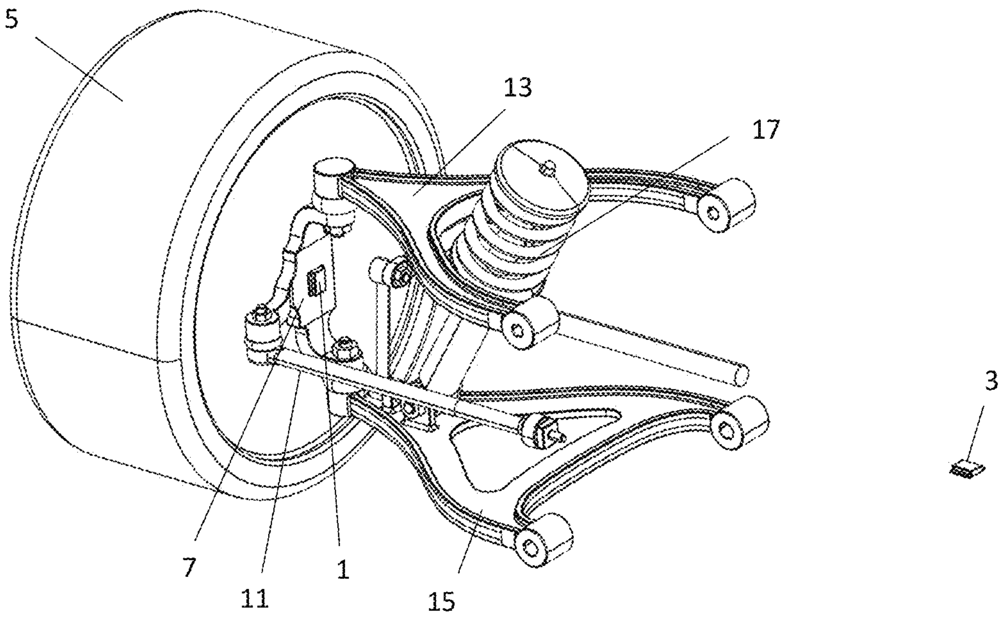
FIG. 1A illustrates a perspective view of a portion of a vehicle having one arrangement of sensors (inertial measurement units, IMUs) including a wheel IMU and a central IMU that may be used as described herein.

In general, described herein are apparatuses and methods for monitoring wheel position/alignment, apparatuses and methods for adjusting wheel position/alignment, and apparatuses and methods for monitoring and adjusting wheel position/alignment. An apparatus may include a system, device, or assembly, and may include hardware, software and firmware. Although the various components of these apparatuses may be described separately in this disclosure, it is to be understood that, unless the context requires otherwise, any of these components or subsystems may be used in combination and may form an assembly for use in monitoring and/or adjusting wheel position/alignment.

As used herein wheel position/alignment may be referred to as simply "wheel alignment" and includes alignment angle, including any one or more of: camber, caster and toe.

Alignment Monitoring

An alignment monitoring apparatus as described herein may be used to monitor wheel alignment of one or more wheels. These apparatuses may be used as stand-alone monitoring systems that may sense, record, transmit and in some variations analyze wheel alignment (e.g., camber, caster, and/or toe). In some variations an alignment monitoring apparatus as described herein may be used to adjust or maintain correct wheel alignment, including providing closed-loop feedback.

The wheel alignment apparatuses described herein may be referred to as wheel alignment monitoring ("WAM") systems. Any of these wheel alignment monitoring systems may include one or more sensors, and in particular may include one or more of: an accelerometer, a gyroscope, and/or a magnetometer. In some variations these one or more sensors may be integrated into an inertial measurement unit (IMU). These sensors may be wired or wireless. The sensor (s) are typically mounted to a non-rotating portion of the wheel assembly (e.g., each wheel assembly) that moves with the tread plane of the wheel. The tread plane of the wheel refers to the plane passing transverse to the tread surface of the wheel and may transect the tread surface in a circle passing through the midline of the wheel. For example, the sensor(s) may be mounted on the wheel knuckle (steering knuckle, spindle, etc.), hub (wheel hub, hub assembly, etc.) or axle of the tire. The one or more sensors may be coupled to any non-rotating portion of the tire mount that moves with the tread plane.

The wheel alignment sensor may be rigidly coupled to the non-rotating portion of the tire mount that moves with the tread plane of the tire, so that as the tread plane of the tire changes relative to the body of the vehicle (e.g., the frame of the vehicle). The sensor(s) may detect even small (e.g., less than 0.1 mm) changes. As the area around a wheel (wheel well) is potentially exposed to a great deal of debris, motion, water, mud, and other environmental factors, it is challenging to provide accurate sensing during normal or exceptional operation of a vehicle. In contrast to sensing while stationary (as when tuning or otherwise adjusting a vehicle while garaged), sensing during operation, particularly at high fidelity and sensitivity (e.g., greater than 0.1 mm) have proven difficult to achieve. In addition certain sensing modes that may be reliably used on a garaged vehicle may not be used in operation, during which the vehicle may be exposed to variations in road surface conditions (bumpiness, wetness) and weather (rain, snow, etc.). The sensitivity of the apparatuses described herein typically allow detection of 0.1 degree or less. Lower sensitivity detection (e.g., 0.5 mm) may not provide sufficient detection. In addition, these sensors (or sensor assemblies) that are attached to a non-rotating portion of the tire mount must not interfere or impede operation (e.g., turning) of the wheel, and must be compatible with the exposed and harsh environment of the wheel well.

In some variations a gravity sensor, such as an accelerometer, may be used, particularly to measure camber and/or caster. Alternatively or additionally multiple sensors may be used together (e.g., accelerometer, gyroscope and/or magnetometer). As will be described in greater detail herein, a magnetometer may be used (alone or in conjunction with one or more of an accelerometer, gyroscope, etc.) to detect toe, and these apparatuses may include an applied local magnetic field to provide reference and/or normalization of a magnetometer, as the background earth magnetic field may be too weak to provide sufficient sensitivity to detect a relatively tiny change in tire angle. When an applied external magnetic field is used, as described below, the applied field may be conditioned so as to prevent non-linear regions that may arise due to the non-uniformity in direction and/or magnitude (e.g., in "fringe regions" of the magnetic field) of the applied magnetic field. In other variations an applied external magnetic field may be condition so as to provide non-linear regions for the purposes of improving detection sensitivity.

As mentioned, the wheel alignment monitoring (WAM) systems described herein may provide alignment information locally (e.g., for display or storage in the car) or remotely (e.g., for display or storage at a remote site). For example, the wheel alignment monitoring systems described herein may provide wheel alignment information (for one or more wheels, e.g., two wheels, three wheels, four or more wheels), including information for one or more wheel alignment components (e.g., camber, caster and/or toe) to a display or storage within the vehicle, including on the dashboard. Alternatively or additionally, this information may be transmitted to a remote site for display and/or storage. The information may be encoded with one or more indicators of the identity of the vehicle from which the data was collected, as well as date/time information, and one or more conditions under which the vehicle was operating (e.g., speed, location, externa temperature, weather conditions, etc.). The information may be displayed locally and/or remotely in real time or near real-time (e.g., within a few minutes, such as within 10 minutes, 7 minutes, 5 minutes, 2 minutes, etc.).

In one example, a fleet of vehicles (such a fleet of trucks) each includes one or more of the wheel alignment monitoring (WAM) systems as described herein. A system may receive the alignment information for each of the vehicles on a continuous or periodic basis at a remote site (e.g., monitoring processor) and this information may be displayed and/or stored for later review. In some variations this information may be processed to generate one or more reports and/or alerts to indicate that a vehicle, or one or more wheels of the vehicle, is not within a predetermined alignment range, for one or more of camber, caster and/or toe. An alert may be provided (e.g., transmitted, emailed, texted, etc.) to a supervisor, and/or the vehicle driver, so that the alignment may be corrected. Similarly, an alignment monitoring (WAM) system of an individual vehicle (e.g., car, truck, bus, etc.) may be configured to present an alert, warning or signal (e.g., tone, dashboard light, text, email, etc.) when one or more of the alignment parameters exceeds a predefined range. In any of the methods and apparatuses (e.g., systems) described herein the alignment data (e.g., data on toe, data on camber, and/or data on castor) may be transmitted to a remote server for access by a fleet manager.

Also described herein, in greater detail below, are apparatuses including alignment monitoring (WAM) systems that monitor alignment of one or more tires of a vehicle and automatically or semi-automatically adjust the alignment using one or more alignment adjustment devices. Thus, these systems may be used for active adjustment of the wheel alignment, including during operation of the vehicle.

For example, described herein are apparatuses and methods using one or more inertial measurement units (IMUs) mounted to one or more (e.g., each) wheel of the vehicle to be monitored, plus one or more IMUs mounted centrally in the vehicle on the chassis/body. The central IMU may provide a reference frame of the vehicle's chassis/body in space. The IMU attached to each wheel may provide a measurement frame for each wheel. By comparing the measurement frame of each wheel to the central reference frame, the angles and orientation of each wheel can be determined, allowing determination of each wheel's alignment (camber, caster and/or toe).

In general, each IMU can be any type of IMU, including for example a 9-degree-of-freedom (9-DOF) IMU with a 3-axis accelerometer, a 3-axis gyro, and a 3-axis magnetometer. Less degrees of freedom than this can also be used, and each IMU can be different and have a different number of degrees of freedom.

As an example, a central IMU with 9-DOF can be used to describe the vehicle's overall pitch, roll and yaw angles in space. An IMU with 9-DOF attached to each wheel can then describe each wheel's pitch, roll and yaw (heading) angles in space. Comparing these angles against those of the vehicle's central IMU (describing the chassis/body) can determine the camber (from roll), caster (from pitch) and toe (from yaw). The output data from each IMU may include, for example, Euler angles or quaternions.

In another example, a central IMU containing a 3-axis accelerometer and a 3-axis magnetometer (6-DOF total) can be used to describe the vehicle's pitch and roll (e.g., using the 3-axis accelerometer and a gravity vector) and also its yaw (e.g., using the 3-axis magnetometer and the earth's magnetic field to determine the vehicle's heading). Similarly, one IMU containing a 3-axis accelerometer and a 3-axis magnetometer (6-DOF total) can be used to describe each wheel's pitch and roll (again using the gravity vector) and also its yaw (again using the earth's magnetic field, this time to determine the wheel's heading). Again, comparing these angles determines the camber, caster and toe of each wheel.

In any IMU, the data used may be raw outputs from a given sensor (e.g. from the accelerometer), or fused data from multiple sensors in order to minimize error and sensor drift over time.

Figure 1B:
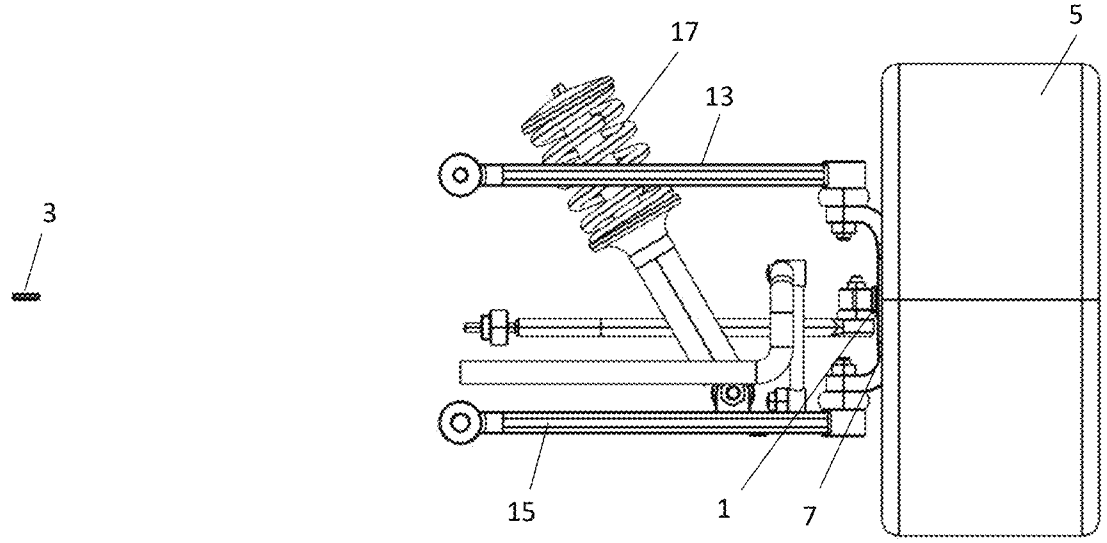
FIG. 1B shows a side view of the portion of the vehicle shown in FIG. 1A.

FIGS. 1A and 1B illustrates one example of this concept. In the perspective view of FIG. 1A, a central IMU 3 may be positioned on the frame or body (not shown) of the vehicle, at any appropriate position relative to one or more IMUS on the wheels, such as the IMU 1 shown mounted on the wheel assembly in FIG. 1, which moves with the wheel/tire. In FIG. 1, the wheel IMU 1 is mounted to the non-moving link coupled to the wheel that moves with the tread plane of the wheel (in this example, shown on the knuckle 7 of the wheel 5). The knuckle is also attached to a tie rod 11 and the upper control arm (wishbone) 13 and lower control arm (wishbone) 15. A strut 17 is also shown coupled to the lower control arm. The central IMU 3 and the one or more wheel IMU(s) 1 may communicate (wired or wirelessly) with each other and/or may communicate (wired or wirelessly) with a processor that may control the apparatuses, e.g., for adjusting one or more alignment parameters (castor, camber, and/or toe), as described herein. FIG. 1B shows a side view of the same vehicle portion as FIG. 1A.

Figure 1C:
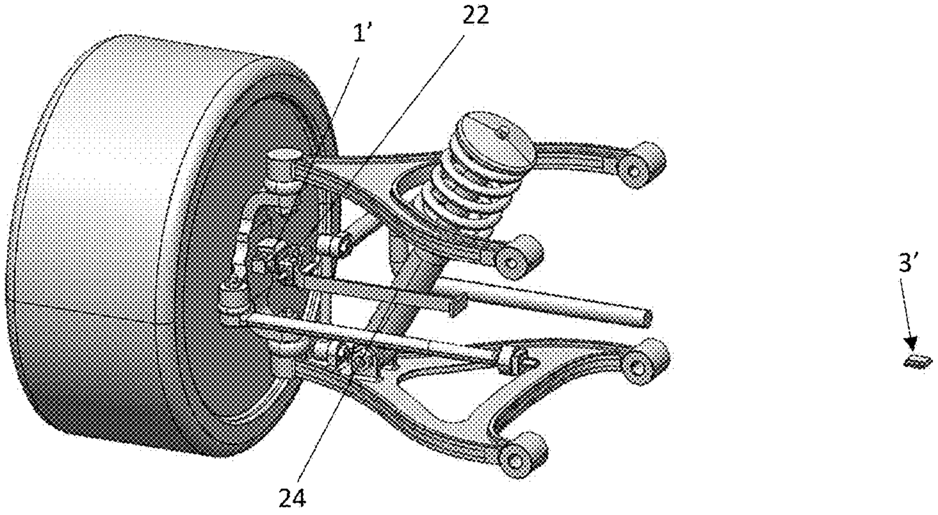
FIG. 1C shows another example of a perspective view of a portion of a vehicle having an arrangement of sensors that are part of a wheel alignment monitoring (WAM) system.
Figure 1D:
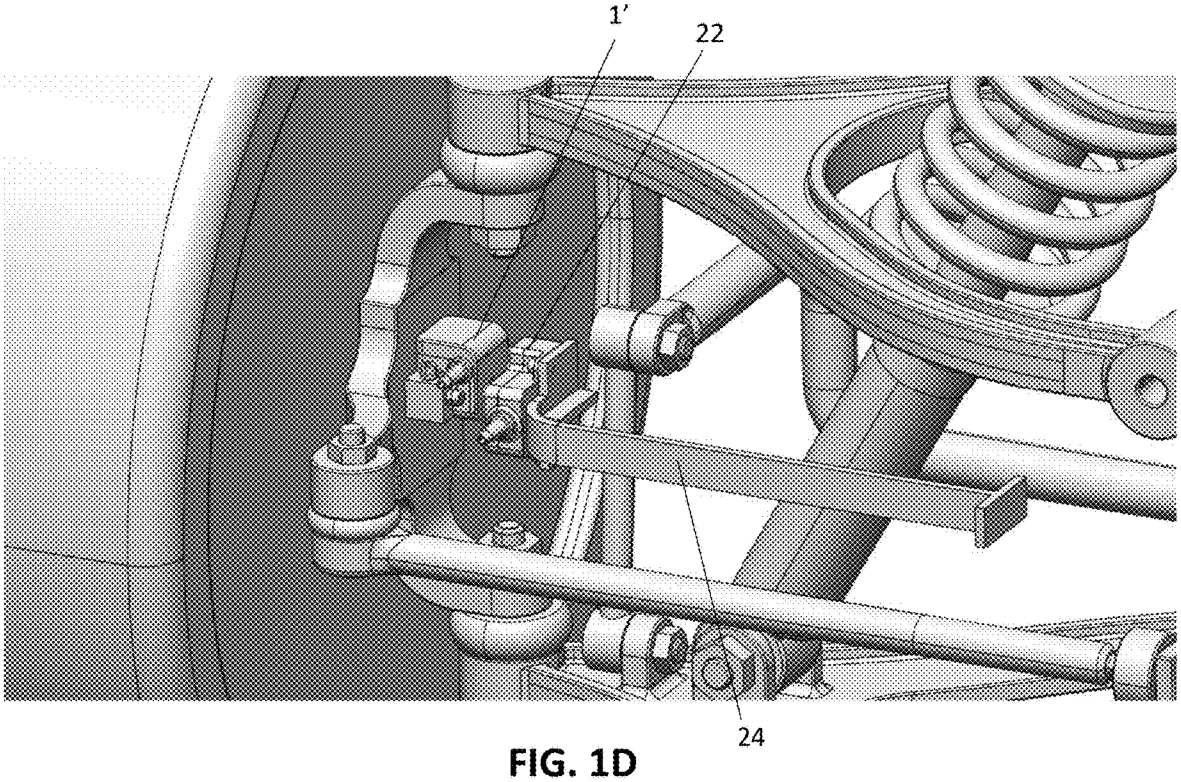
FIGS. 1D and 1E show additional views of the portion of the vehicle having the arrangement of sensors shown in FIG. 1C.
Figure 1E:
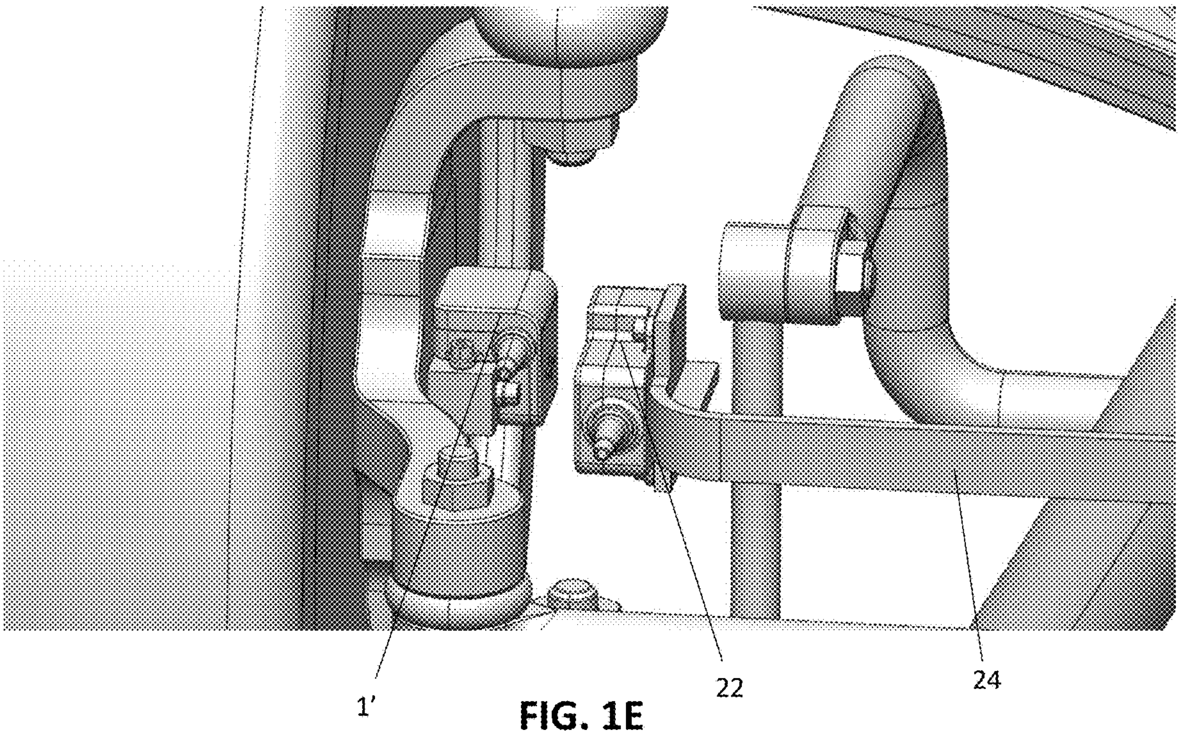

FIGS. 1C-1E illustrate another example of a wheel alignment monitoring system. In this example, the system includes a sensor module 1' and a magnet module 22. The sensor module 1' rigidly mounts to a non-rotating portion of the wheel assembly (e.g. the steering knuckle or hub), while the magnet module 22 rigidly mounts to the chassis or body of the vehicle, possibly via a bracket 24 (in this example, shown rigidly extending from the vehicle body). As the sensor module moves with the suspension and wheel assembly, the sensor module may move relative to the magnet module and the system may measure camber, caster and/or toe of the wheel assembly. The system may optionally include a central IMU 3' that measures the roll, pitch and/or yaw of the body or chassis of the vehicle. The central IMU 3' may also include a processor that receives input from the sensor modules and/or magnet modules of the vehicle.

In this example, camber and caster are measured via a low-range, high-accuracy accelerometer (e.g. 2 g full range) included within the sensor module. The system may use the high-accuracy accelerometer to detect the tilt angle relative to the earth's gravity vector. Toe is measured via a magnetometer, which detects the angle of the wheel assembly in the horizontal plane relative to a local magnetic field generated by the magnet module, as will be described in greater detail below. This system may detect camber and caster angles of less than 0.1 degrees accuracy, and toe to better than 0.1 mm per wheel.

Each sensor module may also include a high-range accelerometer (e.g. 100 g full range) for suspension health monitoring. This accelerometer makes it possible to detect high-g impacts on the wheel, such as when the vehicle hits a pothole, curb or other obstacle. The accelerometer may also detect knocking and vibration in the wheel or suspension system for maintenance signaling, and may detect, for example, incorrect wheel balance, excessive play in bushes, or more serious issues. The sensor module 1' shown in FIGS. 1D-1E is described in greater detail below, e.g., in reference to FIGS. 2J and 2K, and the magnet module 22 in FIGS. 1D-1E is described below in reference to FIGS. 2L-2M. In general, the sensor module moves with the tire, though in a non-rotating manner (e.g., it does not rotate with the tire). The magnet module 22 typically remains stationary, mounted to the frame of the vehicle. In FIGS. 2C-2E the magnet module is mounted by a bracket 24 extending from the body of the vehicle. The bracket may be rigidly coupled to the body of the vehicle so that it remains stationary (and may therefore hold the magnet module stationary) relative to the body.

Figure 2A:
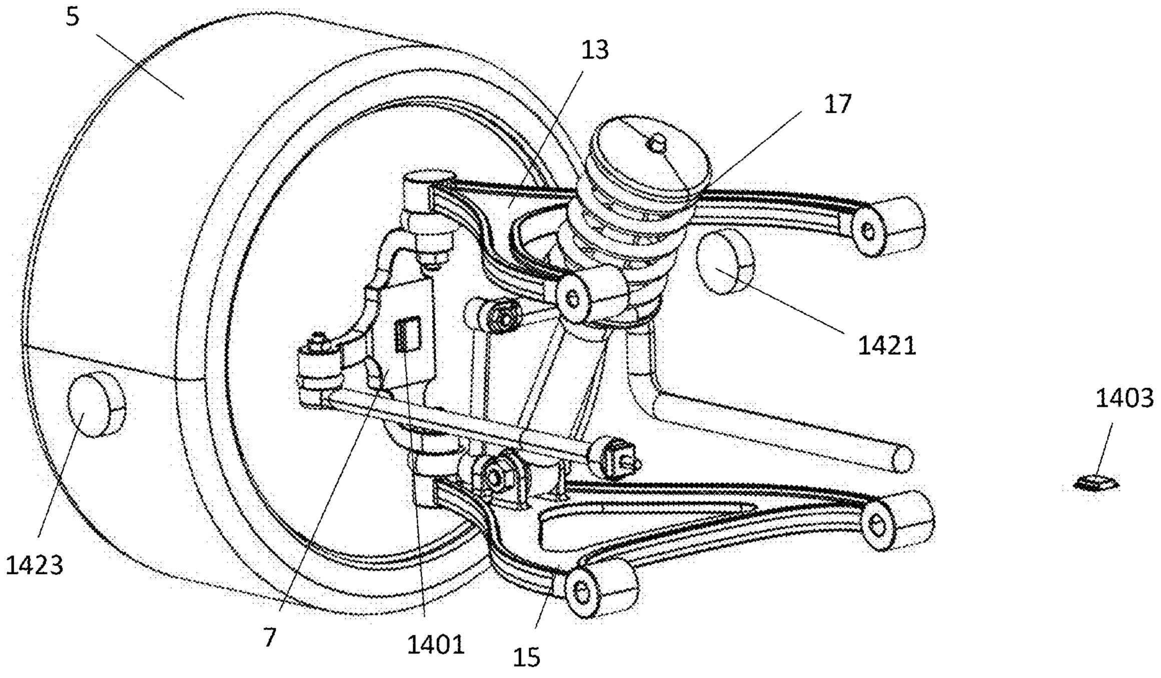
FIG. 2A illustrates a perspective view of a portion of a vehicle having another arrangement of sensors (IMUs) including a wheel IMU and a central IMU that may be used as described herein, as well as an applied external magnetic field.
Figure 2B:
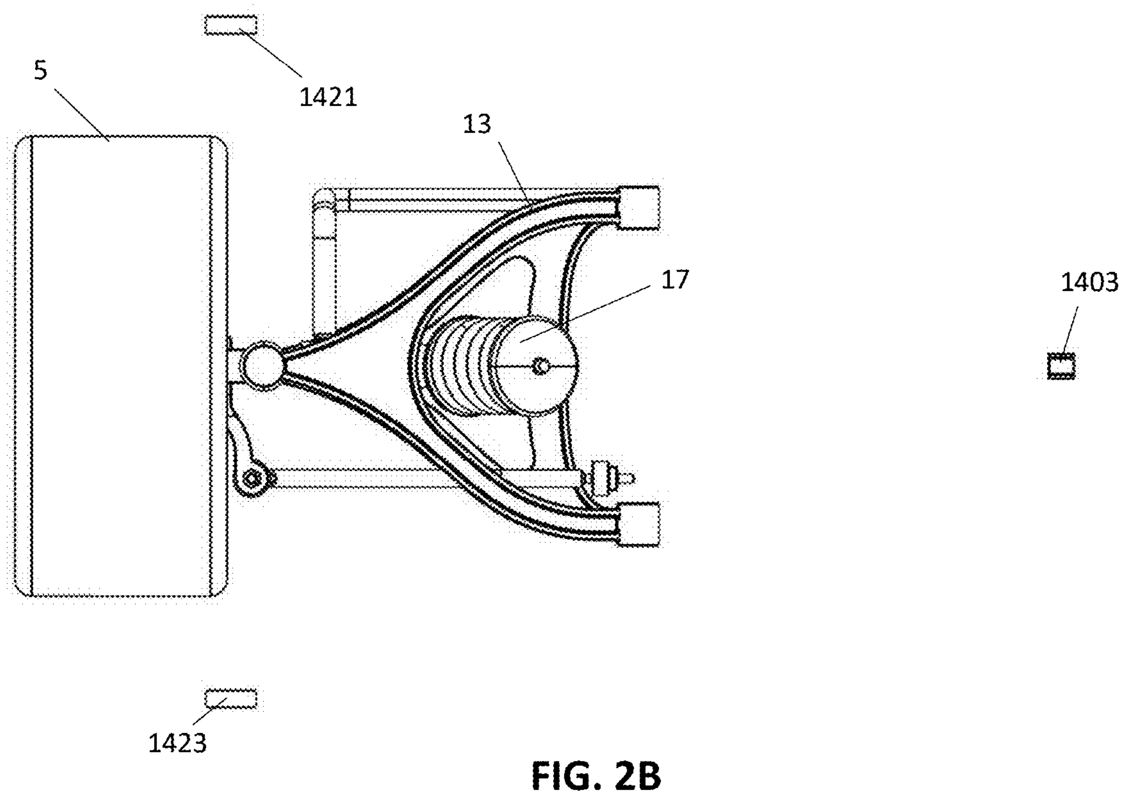
FIG. 2B shows a top view of the portion of the vehicle shown in FIG. 2A.
Figure 2C:
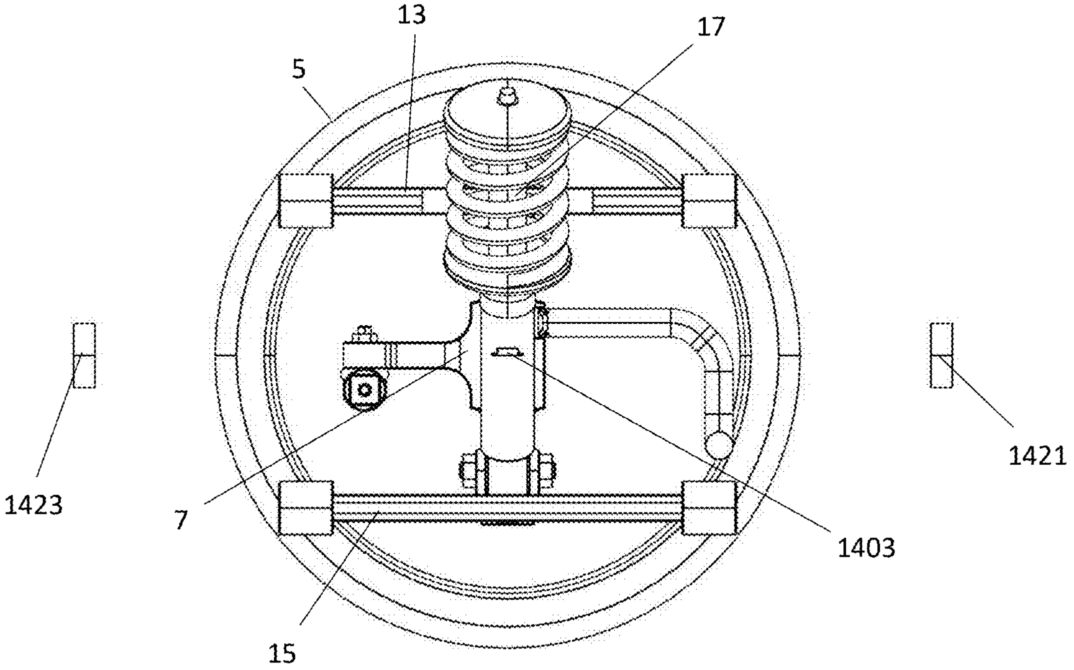
FIG. 2C shows a side view of the portion of the vehicle shown in FIG. 2A.
Figure 2D:
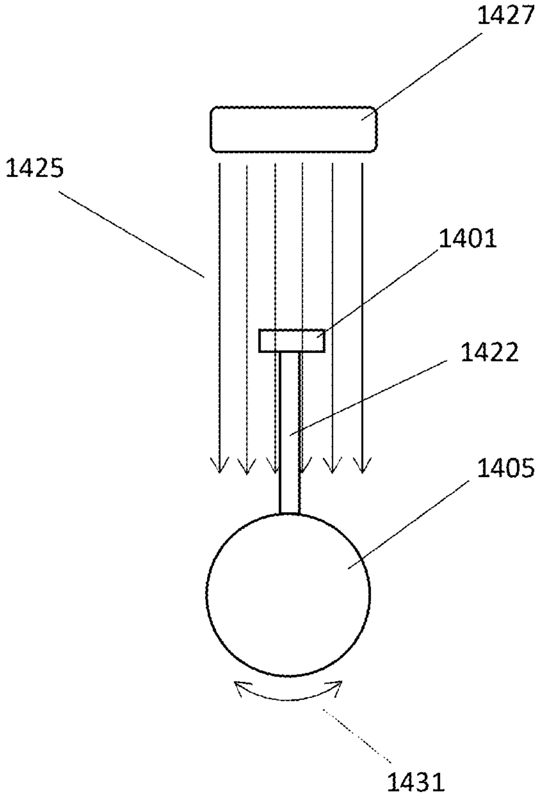
FIG. 2D schematically illustrates a portion of a wheel alignment monitoring system including a magnetometer within a reference electrical field in order to detect a wheel alignment parameter (e.g., toe).
Figure 2E:
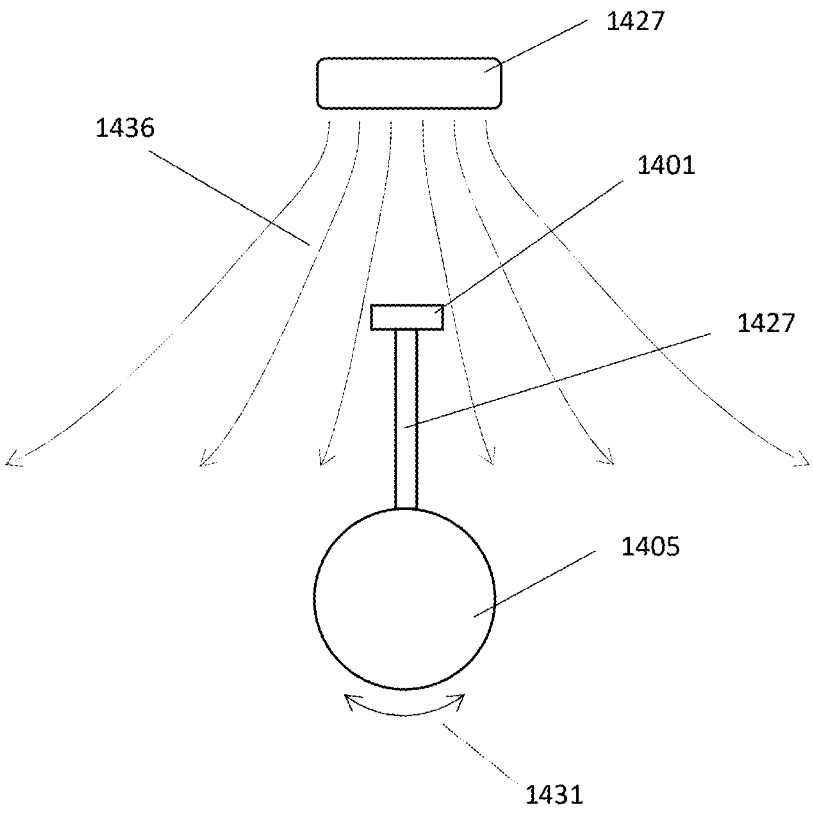
FIG. 2E schematically illustrates another example of a wheel alignment monitoring system similar to that shown in FIG. 2D using non-straight (e.g., expanded) magnetic field lines.

FIGS. 2A-2C illustrate another example of an apparatus including a central IMU 1403 and a wheel IMU 1401 mounted to each wheel to be monitored. In this example, an alignment parameter (e.g., toe) is measured using a local magnetic field provided near each wheel as reference from a magnet module, as mentioned above. In FIG. 2A, the wheel 5 is mounted to a non-rotating linkage coupled to the wheel that moves with the tread plane of the wheel (shown here as the knuckle 7), and to which the wheel IMU 1401 is coupled, so that the wheel IMU tilts with the wheel. As in FIGS. 1A-1B, the wheel IMU is mounted to other structures that also move with the tread plane of the wheel (e.g., the plan passing through the center of the tire treads around the circumference of the tire. As mentioned, an applied magnetic field may be provided as an external reference to the tire movement; in this example two magnets 1421, 1423 are attached to the vehicle's chassis/body (not shown) to establish a magnetic field across the wheel's IMU 1401. The magnetic field is stationary and fixed to the vehicle's chassis/body frame, so that whenever the wheel turns (e.g., changing the toe angle of the wheel) the magnetometer inside the wheel's IMU (e.g., a 3-axis magnetometer) will measure the relative change in magnetic field direction from the static magnetic field. The camber and caster of each wheel may be determined based on the roll and pitch of each wheel relative to the roll and pitch of the vehicle's chassis/body (i.e. using the gravity vector). Note that FIGS. 1C-1E illustrate an alternative in which the magnet module (the magnet(s) forming the static magnetic field as shown) is mounted to a rigid member extending from the body so that the magnetic field is substantially uniform transverse to the body of vehicle (e.g., parallel to the direction of the wheel axle(s).

Thus, in any of these variations a local magnetic field may be created by the application of an external magnetic field that is fixed relative to the vehicle body. In some variations this magnetic field may be modified so that the field lines are distributed in a predicable manner to maintain sensitivity of the magnetometer during use. This is described in greater detail below. In the example shown in FIGS. 2A-2C, two magnets 1423, 1421 are shown producing an external field through which the magnetometer (e.g., forming a portion of an IMU coupled to the wheel) may be moved and therefore may detect a predictable change. In FIGS. 2A-2C two magnets are positioned on the sides (in front and behind) the wheel. In some variations only a single magnet, or more than 2 magnets may be used. For example, a single magnet may be positioned, for example, in-line with the central axis of the wheel (e.g., perpendicular to the tread plane in the neutral position, in the central axis the disc axis), and behind the wheel. This position may allow the magnet to be positioned in close proximity to the magnetometer (e.g., in some variations, an IMU), which may permit a small, single magnet to be used.

For example, FIG. 2D illustrates an example of an IMU including a 3 axis magnetometer that is connected to a wheel assembly (e.g., a non-rotating portion of the wheel assembly that moves with the tread plane of the tire, such as the knuckle) via a rigid arm 1422. Note that this is viewing a vehicle wheel assembly from the top/plan view, where the circle represents the steering rotation axis of the wheel assembly. As the wheel assembly (e.g., strut) 1405 turns, either via steering input or via toe angle change 1431, the IMU 1401 both rotates with the wheel assembly and also translates due to the rigid lever arm (mounted off center of the rotation axis). The IMU in this example is used to measure the local magnetic field 1425 in all 3 axes and based on this the rotation angle can be measured as the IMU moves. Within a uniform, straight magnetic field 1425 applied by the stationary magnet 1427, only the rotation of the IMU about its own central axis can be detected, which may provide sufficient measurement sensitivity.

FIG. 2E shows another example of a wheel alignment monitoring system including a magnetometer as part of an IMU 1401. In some cases, the use of a magnet (reference or stationary magnet 1427) in a configuration such as the one shown in FIG. 2D may not provide sufficient measurement sensitivity. For example, the detectable IMU angle may only be, e.g., 0.3 degrees per millimeter of toe change. However, it may be desirable to detect down to about 0.1 mm of toe change, which would therefore result in only a 0.03-degree detectable IMU angle, which is within the noise floor of most such sensors. To overcome this, described herein are techniques for manipulating the magnetic field so that both the rotation of the IMU about its central axis and its translation with movement of the tire (e.g., due to a lever arm) can be detected magnetically. As shown in FIG. 2E, this may be achieved by providing non-straight magnetic field lines 1436, so that even translation alone of the magnetometer (e.g., IMU 1401) can be detected based on the angle of the magnetic field relative to the sensor. There are numerous ways of providing a non-straight magnetic field, as will be illustrated in FIGS. 2F and 2G, below, but in general the concept may include increasing the detection sensitivity to toe angle changes by measuring magnetic angle changes in the magnetometer (e.g., IMU) based on both the tire's rotation and its translation. The use of non-straight magnetic field lines 1436 has been found to reliably increase the detection sensitivity to over 1 degree per millimeter of toe, and even as high as greater than 5 degrees per millimeter of toe.

Figure 2F:
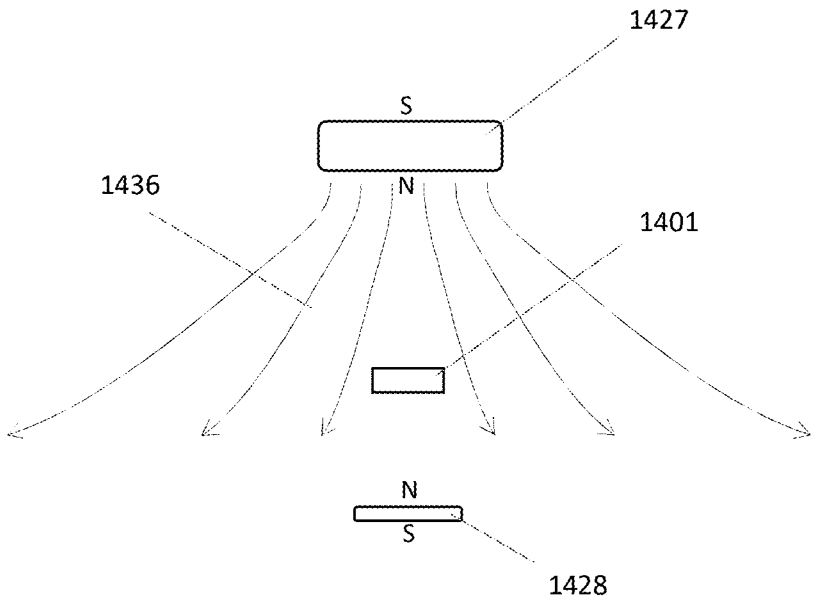
FIG. 2F schematically illustrates another example of a wheel alignment monitoring system similar to that shown in FIG. 2D but with a field-shaping magnet expanding the field lines of the reference magnetic field, in which a second magnet of the same polarity is placed behind the magnetometer.

For example, FIG. 2F shows one example of a method of manipulating the magnetic field of a magnet that may be used to provide a reference magnetic field 1428 to a magnetometer, in which the magnetic field is non-uniform (non-straight). A second magnet is placed behind the IMU in magnetic opposition to the first magnet. The second magnet 1428 may be a field-shaping magnet. The sizes, field strengths and positions of the magnets relative to each other and the IMU can be tuned to optimize the detection properties, including sensitivity, error, reliability, and the like. In some cases, the second magnet 1428 can be mounted on the wheel assembly so that it rotates and/or translates with the IMU. This may be useful in circumstances where there is no easy way of providing a rigid chassis or body mount in that location. During testing, having the second magnet rotating and/or translating does not hamper the system's ability to detect movement (e.g., an angle such as toe angle).

In any of the variations, a curved or arc magnet can also be used to replace the first magnet, e.g., the stationary, reference magnet, and potentially reduce or eliminate the need for a second, e.g., field-shaping, magnet. The first and second magnets can be a permanent magnet or one or both may be an electromagnet. In some variations it may be particularly helpful to use an electromagnet so that it may be turned off to prevent collecting metal particles from the road/environment during use.

Figure 2G:
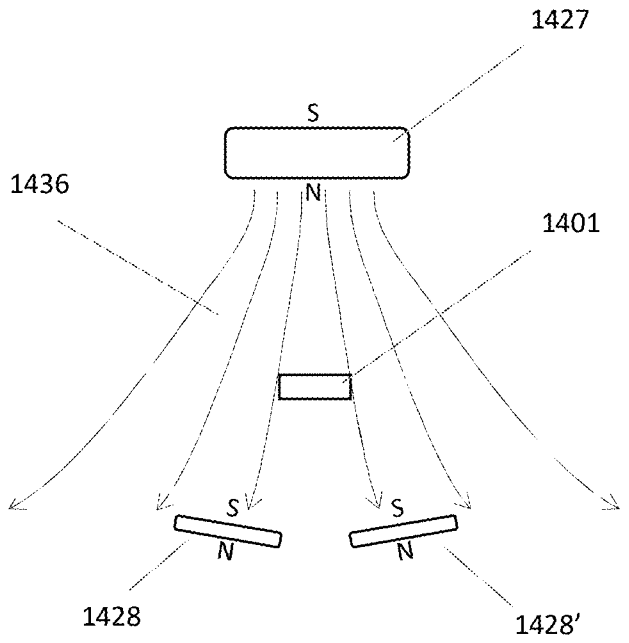
FIG. 2G schematically illustrates another example of a wheel alignment monitoring system similar to that shown in FIG. 2D-2F but with a pair of field-shaping magnets expanding the field lines of the reference magnetic field.

FIG. 2G illustrates another example of a wheel alignment monitoring system in which a primary (first) reference magnetic field is provided by a single (e.g., electromagnet) 1427 as shown, while a pair 1428, 1428' of field-shaping magnets are used. The two additional magnets may be used to "draw out" the field lines 1436, allowing for a larger dynamic range of sensing by the magnetometer (e.g., in the IMU 1405).

The use of a magnetometer and a reference magnet providing a reference magnetic field (and particularly a shaped reference magnetic field) may allow an accurate, non-contact technique for detecting wheel alignment, including toe.

Figure 2H:
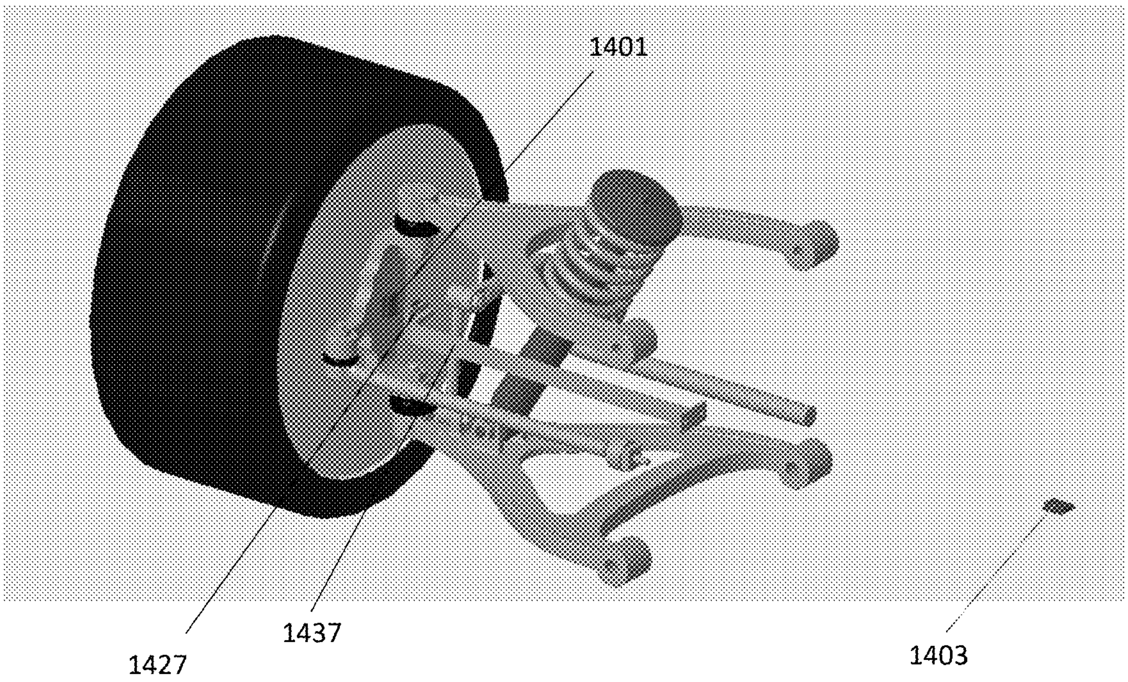
FIGS. 2H-2I illustrate an example of a wheel alignment monitoring system in which a sensor (e.g., an IMU including a magnetometer) is coupled to a non-rotating portion of a wheel assembly, such as the knuckle, a reference field magnet is mounted to the stationary frame of the vehicle, and a field-shaping electrode is mounted behind the magnetometer.
Figure 2I:
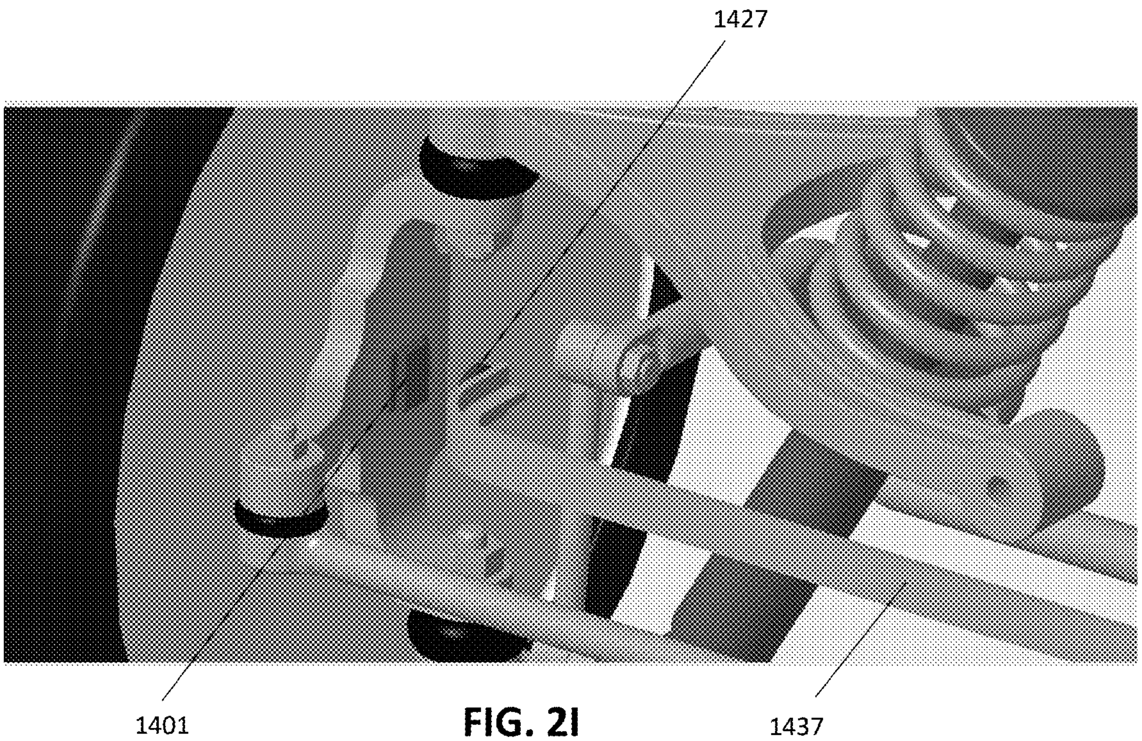

FIG. 2H illustrates another example of an embodiment of a wheel alignment monitoring system as described herein, using a magnetometer (which is shown as part of an IMU 1401) mounted on the non-rotating portion of the wheel assembly (e.g., the knuckle), similar to that shown in FIGS. 1C-1E. Both a wheel IMU (e.g., sensor module 1401) and a central IMU 1403 are shown, similar to FIGS. 2A-2C, and a primary magnet 1427 (e.g., magnet module) is used to create a local magnetic field (reference magnetic field). The primary magnet is mounted to holding bracket 1437 that is rigidly connected to the frame of the vehicle (not shown). The magnets are arranged in this example so that a non-straight magnetic field is created. The front magnet (shown in the images) is rigidly connected to a mounting bracket and rigidly connects to the vehicle's body/chassis. Thus, this front (reference) magnet does not move relative to the vehicle's body. A second, rear magnet (not visible) may sit directly behind the sensor (magnetometer) such as the wheel IMU 1401 and can be integrated into the packaging/housing of the wheel IMU. The magnets may be arranged so that they are magnetically opposing, thereby distorting the magnetic field lines as shown above. In this embodiment, both the wheel IMU and the rear magnet move relative to the vehicle's body, which is fine and has been found to produce good measurement sensitivity for detecting toe angle of the wheel. FIG. 2I shows an enlarged view of the wheel assembly including the wheel IMU 1401, reference magnet 1427 and mount for the reference magnet 1437.

In FIG. 2H, the relative size and magnetic strength of each magnet may be tuned to optimize the sensing performance, as well as the distance between each magnet and the IMU. Note also that this assembly can also be used for detecting camber angle (i.e. camber angle can be measured by the wheel IMU either via accelerometer readings or magnetometer readings, or both) and/or caster angle (i.e. caster angle can be measured by the wheel IMU). The mounting bracket can take any form.

In some variations the externally applied magnetic field may not be used, whereby the IMU may instead rely on the natural magnetic field of the earth as a reference. In other variations it may be beneficial to use a local, externally applied reference magnetic field. For example, the local magnetic field may provide an increased magnetic field (e.g., relative to the earth's magnetic field, which is relatively weak), which may prevent drift of the magnetometer sensor. Preliminary results show that the use of an applied magnetic field of about 0.25 mT (as compared to a native magnetic field, such as the field strength of the earth's magnetic field, which is about 0.025 mT) may improve the precision and sensitivity of the sensing of toe angle using a magnetic sensor as described herein. Using a local magnetic field, the local magnetic field strength was increased to well over 0.25 mT, even as high as 5.0 mT. This may make toe angle sensing more precise and reliable. Any type and number of magnets can be used to provide a static magnetic field. This may include permanent magnets and/or electromagnets. One or more magnets can be used to establish a local magnetic field, however in some variations it may be preferable to use more than one magnet as the field lines tend to be straighter and stronger using more than one magnet. The one or more magnets may be mounted in the vehicle's horizontal plane, or close thereto, so that the resulting magnetic field vectors across the wheel's IMU are close to perpendicular to the earth's gravity vector. In some cases, there is no need to monitor the yaw/heading of the vehicle's chassis/body.

Figure 2J:
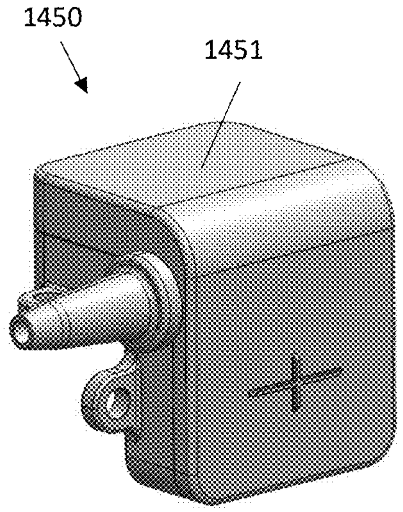
FIGS. 2J and 2K show perspective views of an example of a sensor module that may be used with a wheel alignment monitoring system.
Figure 2K:
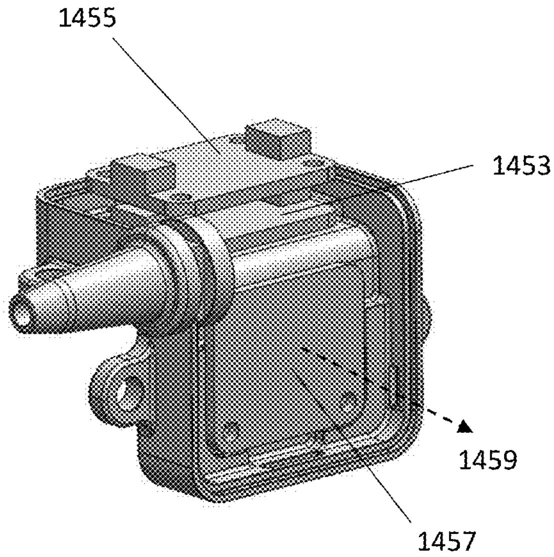

FIGS. 2J-2K illustrate an example of a sensor module 1450. The sensor model shown mounts to a non-rotating portion of the wheel (e.g., the knuckle, hub, axle, etc.). The sensor module may include an external housing that is configured to mount with low profile, and to protect the sensor components. In the example shown in FIG. 2J, the housing 1451 may be L-shaped, which may assist in mounting with low profile, while arranging the internal components in a specified orientation relative to the wheel and body of the vehicle, and also external fields such as gravity and magnetic fields. The sensor module may house one or more accelerometers, including for example, a first, e.g., low-range, accelerometer having a high-sensitivity, e.g. 2 g detection range, an optional second, e.g., high-range, accelerometer having a lower sensitivity (e.g., 100 g detection range), and a magnetometer for measuring toe angle based on the local magnetic field created by the magnet module. The first accelerometer may be configured for measuring camber and/or caster angles to better than 0.1 degrees, while the second accelerometer may be configured for suspension health monitoring, e.g. detecting potholes, curb impacts and suspension problems. The second accelerometer is an optional feature. In some examples a single accelerometer may be used for both measuring camber and/or caster angles and for detecting impacts (e.g., monitoring suspension health). In some examples the sensor module may include just a magnetometer and be configured for measuring toe angle based on the local magnetic field created by the locally mounted magnet(s) (e.g., in some examples a magnet module). In other examples the sensor module may include just a magnetometer and be configured for measuring camber, caster and/or toe angles based on the local magnetic field created by the locally mounted magnet(s) (e.g., in some examples a magnet module). The sensor module may be a single housing or may be two or more interconnected housings. In some examples the sensor module may be distributed between different housings. The sensor module may be battery powered, or it may be powered by a wired connection (e.g., to the car power) or both. For example, the sensor module may include a rechargeable power source (e.g., battery). The sensor module may include power control circuitry for applying and/or regulating power to the one or more sensors (e.g., magnetometer, accelerometers, etc.).

In general the sensor module may also contain communication and/or data storage (e.g., memory) for receiving signals from the one or more sensors and for passing the signals on to another IMU (e.g., a central IMU) or to an electronic control unit (ECU) on the vehicle. In some examples the sensor module is wired to the central IMU or an ECU; in some examples the sensor module wirelessly communicates with a central IMU or an ECU. In some examples the sensor module may include a local processor that regulates the sensing and/or data (sensed value) storing, processing and/or transmitting. For example the sensing module may include a local processor and/or local IMU (e.g., sensor module) that sets or determines the frequency that the sensor module reads sensor output from the one or more sensors. The frequency of sensing may be constant or adjustable (including variable). For example, the sensor module may be configured to read and/or process and/or transmit sensor data at a continuous frequency, such as a frequency between 0.1 Hz and 500 Hz (at any value within this range, e.g., at 0.5 Hz, 1 Hz, 2 Hz, 3 Hz, 4 Hz, 5 Hz, 6 Hz, 7 Hz, 8 Hz, 9 Hz, 10 Hz, 50 Hz, 100 Hz, 150 Hz, 200 Hz, etc.). Each sensor may be read at a specified frequency, which may be different or the same. In some examples the frequency that the sensor values are recorded may be variable. For example, the sensor may be read and/or processed and/or transmitted at a rate that is varied during operation. For example, the rate may be varied based on the speed of the vehicle; the faster that the vehicle is traveling, the more often that the sensor is read and/or processed and/or transmitted. Thus, at low speeds the sensor(s) may be interrogated at a lower frequency. In another example, the sensor may only be read and/or processed and/or data transmitted if certain preset conditions are met, for example if the vehicle is stationary and/or relatively level (e.g., on flat ground). In another example, when a sensor is read and/or processed and/or data transmitted, a plurality of measurements may be taken over time and averaged to provide a more reliable reading free of noise and vibration.

FIG. 2K illustrates an example of a sensor module showing the internal housing holding a first, low-range, accelerometer 1453 (for measuring camber and caster) and a second, high-range accelerometer 1455 (for monitoring suspension health). The sensor module also includes a magnetometer 1457 (for toe measurement). The magnetometer is oriented with the z-axis 1459 aligned as shown in this example.

Figure 2L:
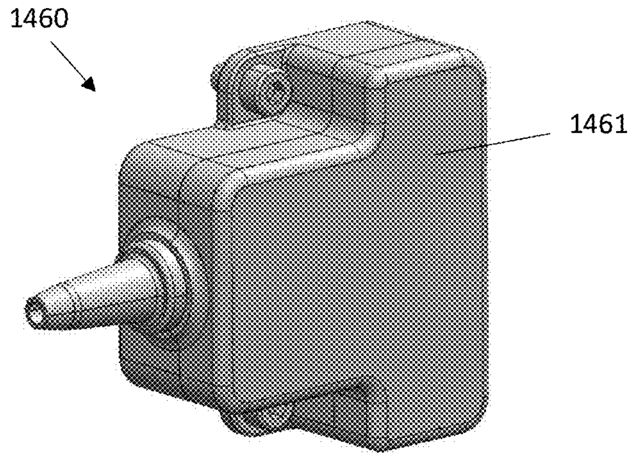
FIGS. 2L and 2M show perspective views of an example of a magnet module that may be used with a wheel alignment monitoring system.
Figure 2M:
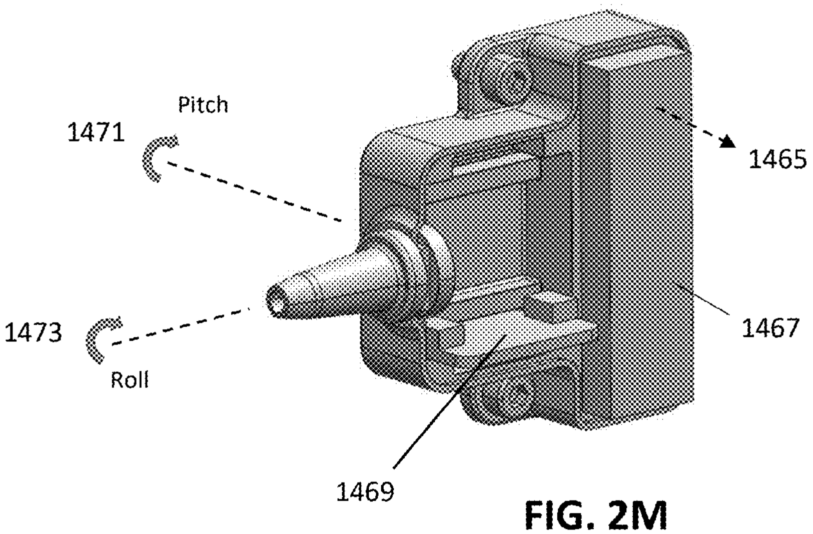

FIGS. 2L to 2M illustrate one example of a magnet module 1460. In general, a magnet module may include just a magnet, or it may include a housing 1461 and one or more other components, including mu metals. In FIG. 2L the magnet module 1460 is shown with a housing 1461 closed. The magnet module is configured to attach to the body (or an extension of the body, such as a bracket that is rigidly coupled to the body) with a relatively low profile. FIG. 2M illustrates the magnet module 1460 of FIG. 2L with the housing cover removed. In the example of FIG. 2M, the magnet module includes a bar magnet 1467 (e.g., in this example a 50 mm×15 mm×15 mm magnet, though the magnet may have different dimensions). The magnet in this example is oriented in a polarized direction 1465 (in a through-thickness direction) that is directed towards the sensor module when mounted to the vehicle. In some examples, the magnet may be oriented so that, when mounted to the vehicle it is directed in an opposite direction (e.g., flipping the north/south directions in FIG. 2M). The magnet module in this example also includes an accelerometer 1469 for use in sensing tilt of the magnet module. In this example, the accelerometer is a low-range accelerometer (having a high-sensitivity, e.g. 2 g detection range) for measuring the roll and pitch angles (e.g., 2-axis tilt) of the magnet to better than 0.1 degrees. FIG. 2M also illustrates the pitch 1471 and roll 1473 axes of the magnet module.

In use, the example sensor module shown in FIGS. 2J-2K and magnet module shown in FIGS. 2L-M may be configured in the vehicle similar the configuration shown in FIGS. 1C-1E, described above. The local magnetic field may be similar to that shown in FIG. 2E, e.g., the magnetic field may run in the direction between the magnet module 1427 and the sensor module 1401, in the horizontal plane and generally in-line with the axle. For example, the magnetic north may be on the wheel side of the magnet, and the south on the body side, or vice versa. In the example shown in FIG. 2M, arrow 1465 shows the direction of the magnetic field. This magnet arrangement may prevent spurious toe readings due to vehicle ride height changes. With reference to FIG. 2M, the bar magnet is long in the vertical direction, and is polarized through-thickness per the arrow. Towards the top and bottom ends of the magnet, the field lines will tend to curve around the ends of the magnet (e.g., up/down) to wrap around to the opposing magnetic pole. However, towards the middle of the magnet (in vertical travel), the field lines will be almost exclusively in the horizontal plane, as they wrap around the sides of the magnet rather than the ends. Toe measurement is achieved by detecting changes in magnetic field in the horizontal plane, which is the plane the wheel swings through when it turns and toe changes. A pure 2D horizontal field may therefore be seen regardless of vertical height by having a sufficiently long magnet and staying within the central region of the magnet, as described herein. The magnet in the magnet module may be rectangular and may be oriented so that the field is horizontal, as mentioned. Thus, the magnet may be configured to extend with the poles arranged when mounted to the body of the vehicle, as shown. The magnet may be configured so that the length of the magnet is greater than a minimum length (e.g., greater than 1 cm, greater than 2 cm, greater than 3 cm, greater than 4 cm, greater than 5 cm, greater than 6 cm, greater than 7 cm, greater than 8 cm, greater than 9 cm, greater than 10 cm, etc.). This may allow the toe angle to be measured accurately even when the vehicle wheels move up/down slightly relative to the body of the vehicle during operation (e.g. due to suspension travel). Thus the toe sensing may be relatively insensitive to change in the wheel height or ride height of the vehicle. Because the toe sensing depends upon the direction of the magnetic field, in some examples it may be beneficial to confirm that the angle of the applied magnetic field is oriented in the correct direction. For example, the magnet module may include an alignment sensor (e.g., tilt sensor). The system may include electronics to confirm the tilt and to adjust if the tilt is off and/or trigger an alert that the tilt is off, and that the system requires calibration.

The sensors described herein (e.g. wheel IMUs, central IMUs, accelerometers, gyroscopes, magnetometers, etc.) may also include temperature sensors that may calibrate and/or adjust the sensed data based on the detected temperature. For example, accelerometers, gyroscopes and/or magnetometers may be sensitive to temperature and readings from the these may be adjusted based on the sensed temperature (e.g. thermal calibration/offset).

Figure 3A:
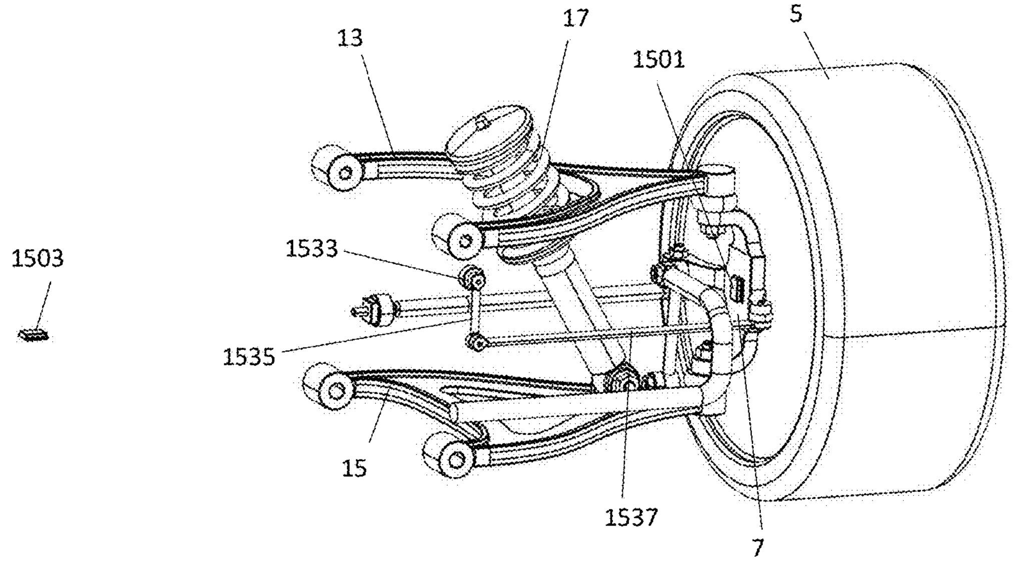
FIG. 3A illustrates a perspective view of a portion of a vehicle having another arrangement of sensors (IMUs) including a wheel IMU and a central IMU that may be used as described herein, as well as a contact-based position sensor.
Figure 3B:
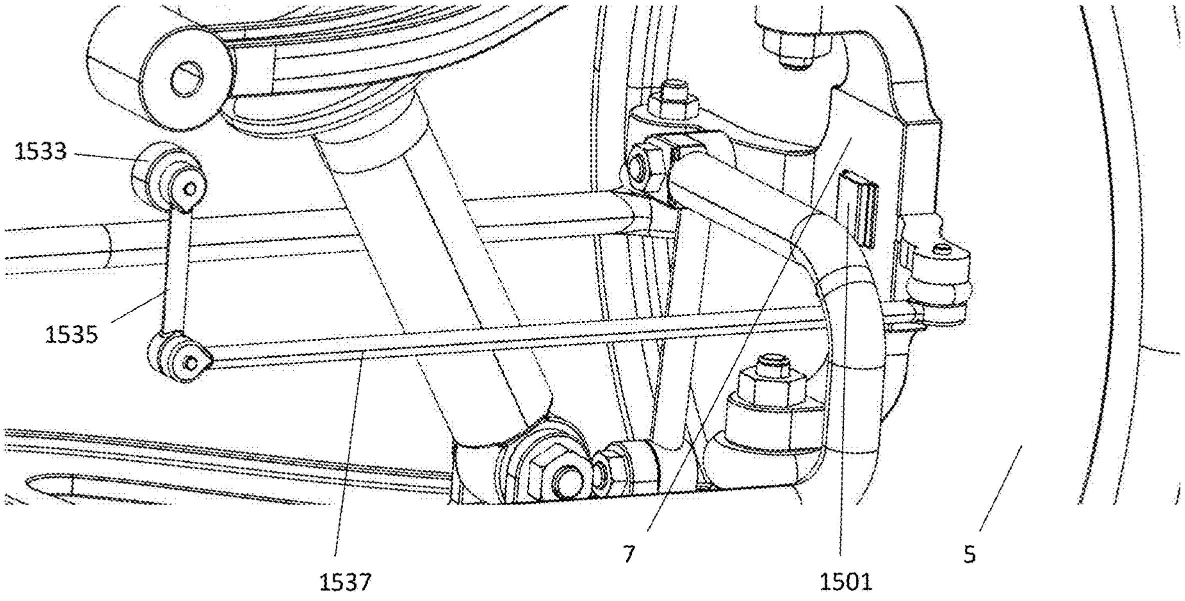
FIG. 3B shows a close-up view of the portion of the vehicle shown in FIG. 3A.

FIGS. 3A-3B illustrate another variation in which toe angle is measured via a physical connection to each wheel rather than via a magnetic field. Here, a physical link may be attached to the wheel (e.g. to the steering knuckle or hub), and at the other end (towards the vehicle's chassis/body) be connected to a measurement device, such as an encoder. Camber and caster of each wheel may be determined based on the roll and pitch of each wheel relative to the roll and pitch of the vehicle's chassis/body (i.e. using the gravity vector).

As shown in FIG. 3A, the wheel IMU 1501 (sensor module) is also coupled to the wheel 5 (via the knuckle 7, hub, etc.) as describe above, so that it tilts with the wheel, but does not necessarily rotate with the wheel. The physical link includes an encoder 1533 and one or more linkages, e.g. encoder links 1535, 1537, configured to encode toe angle. As shown in greater detail in FIG. 3B, when the angle of the wheel in the longitudinal axis of the vehicle (the toe) shifts in (negative toe) or out (positive toe), the linkage may be displaced, and this displacement is encoded by the toe encoder 1533. The linkage may be configured so that only movement of the plane of the wheel (perpendicular through the tread of the tire) relative to the longitudinal axis of the vehicle, and therefore just toe, is detected and encoded. The toe may be measured this way in a manner that may be more precise than measuring based on magnetic detection relative to the earth's magnetic field. As mentioned, because the earth's magnetic field is relatively weak the toe angle measurements may be less precise when measuring using a magnetic detector without a local, externally applied magnetic field. Monitoring the toe angle via a physical connection and measurement device (e.g. an encoder) may provide rapid, accurate and precise measurements. In other variations linear position sensors, using linear encoders, may be used to monitor the toe angle via a physical connection.

In some variations, all or some of the wheel alignment parameters may be measured via a physical connection to the wheel. Thus, for example, camber, caster and toe may all be measured via the direct connection to the wheel, not via an isolated IMU. Here, a physical position measurement device capable of 3-DOF measurement may be connected to the vehicle's chassis/body near each wheel (one device for each wheel), and one or more links connected to that wheel (e.g. to the steering knuckle or hub). An example of a 3-DOF measurement device has three rotary encoders arranged to enable encoding about all three axes in 3-space (x, y and z). This allows direct or indirect determination of the camber, caster and toe of each wheel. Physical contact measurement devices may be combined with other non-contact sensors, for example the IMUs for gravitational and/or magnetic sensing as in the other concepts. In general, this may provide safety redundancy and/or improved accuracy/reliability.

Any of these configurations may include one or more sensing technologies, types or systems which may be used or combined to achieve the desired outcome. These configurations may be combined or used in any combination. For example, toe may be measured magnetically in the presence of an applied magnetic field, while one or both of castor and camber may be measured by direct linkage using an encoder.

Connections to a wheel (whether for a physical contact sensor such as an encoder, or for a non-contact sensor such as an IMU) may typically be to non-rotating parts of the wheel, such as to the steering knuckle, hub, axle, wishbone, link, strut, tie rod, or other suitable component to reference to for the purpose of determining as reliably as possible one or more wheel alignment parameters.

In some variations, the apparatus (e.g., system) may monitor certain wheel alignment parameters of interest for certain wheels, for example camber and toe only (not caster). As a further example, only toe may be monitored, for example in fixed axle vehicles like trucks. Both steered and non-steered wheels can be monitored. Alternatively, or additionally, the apparatuses and methods may monitor some wheel alignment parameters for a given wheel and infer or calculate the other wheel alignment parameter(s) for that wheel based on modelling, known geometry and/or vehicle dynamics. For example, in some cases it may be possible to monitor the camber and caster of a wheel using IMUs, and to calculate the toe angle based on the camber and caster and the known geometry of the suspension.

The wheel alignment monitoring systems and methods described herein can be used with any suspension geometry, including but not limited to MacPherson strut, double-wishbone, multi-link, fixed-axle, and independent suspension systems, as mentioned above.

Alignment Adjustment

Figure 4:
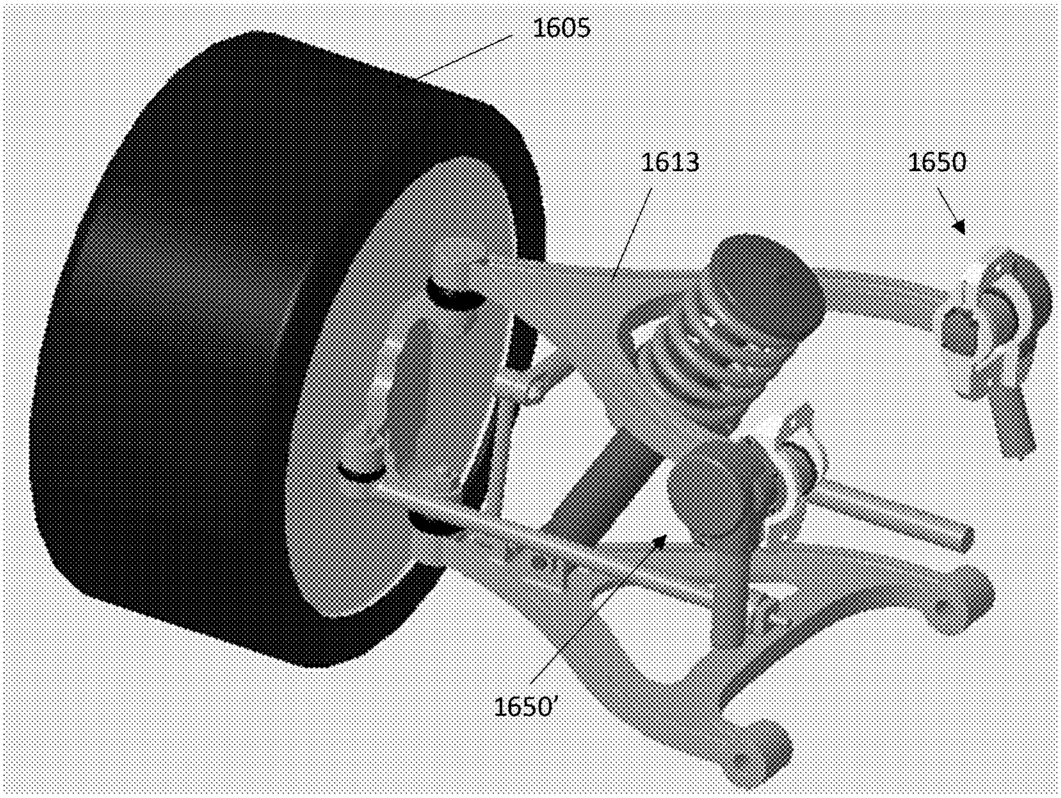
FIG. 4 illustrates one example of an alignment adjustment unit, shown configured as a camber adjustment unit, coupled to both ends of an upper control arm.

Also described herein are alignment adjustment apparatuses, including camber, toe and/or castor adjustment apparatuses. These apparatuses may be used with any of the systems described herein. For example, FIGS. 4-5D illustrate one example of an alignment adjusting apparatus (configured as a camber and/or castor adjustment apparatus) that is shown mounted at the inner pivot points of the upper wishbone to actuate the wishbone in and out relative to the car body via an offset camshaft (e.g., offset bush pivot). As the alignment adjustment motor turns the shaft, the offset in the shaft moves the wishbone in and out. This system is highly space efficient for double-wishbone and multi-link suspension systems. FIGS. 4 and 5A-5D illustrate the cam adjustment apparatus as part of a double-wishbone suspension that may run adaptively (i.e. automatic adjustment of wheel alignment while driving).

An alignment adjustment apparatus may include a motor (alignment adjustment motor) and an offset bushing and shaft for displacing at least a portion of the suspension (e.g., wishbone, double wishbone, multi-link, etc.). The motor rotation may be translated via the shaft into the movement of the offset bushing to adjust the position of wheel. The motor may be part of a motor assembly that is mounted to a frame, and in particular, may be coupled to the suspension, e.g. the control arm of a wishbone or double wishbone suspension, so that the motor extends approximately perpendicularly from the control arm. Any of the alignment adjustment apparatuses described herein may be configured to have a relatively small footprint, so that they may fit into the undercarriage, and in particular in the wheel well and around the suspension, without interfering with the operation of the existing components, allowing them to be retrofitted into existing automotive vehicle designs. Thus, the motor (e.g., the drive) of the alignment adjustment apparatus may be positioned away from the control arm of the suspension and may be coupled to an offset bushing by a shaft and/or gear. This shaft and/or gear may also be self-locking so that when the alignment adjustment apparatus motor or drive is not operating, the alignment adjustment apparatus remains fixed in position (e.g., the last selected position).

For example, in FIG. 4, the ends of the upper control arm (wishbone) are each coupled to an alignment adjustment unit, configured here as a camber and/or castor adjustment unit, that includes a frame coupled to a drive (motor assembly) including a spiral bevel gear, or in some variations a hypoid gear in which the mating gears' axes do not intersect (shown in greater detail in FIG. 5D, below). Thus, the larger gear of the alignment adjustment unit may be the offset bushing or offset gear (driving offset of the upper control arm), which is mated to the smaller drive gear (the hypoid gear). This smaller hypoid gear (drive gear) is offset from the gear center of the larger gear. This spiral bevel gear forming the drive gear is configured to have a high torque, self-locking mechanism, similar to a worm drive, such that the smaller drive gear is in the front, with the larger offset gear in the back. The smaller gear may also be referred to as a pinon. The drive itself (including a motor) may operate by rotating when driven, to controllably move and offset the ends of the upper control arm. The offset gear that is coupled to the end of the upper control arm is rotatably mounted to the frame so that rotational movement of the drive gear results in an offsetting movement of the end of the upper control arm to which the offset gear is coupled. This allows both positive and negative movement, which may be controlled with precision, as the motor of the alignment adjustment unit (not shown) may be configured to rotate the drive gear for multiple turns (e.g., 50 turns of motor) to drive a single turn of the larger offset gear. For example, this may allow very precise and synchronized movement of both ends of the upper (or alternatively in some variations the lower) control arm of the wishbone, thereby changing the camber (or in some variations caster) of the tire.

Although FIGS. 4 and 5A-5D show only the ends of the upper control arm coupled to a camber adjustment unit, in some variations the camber adjustment unit may instead or additionally be on the lower control arm; if both the upper and lower control arms including camber adjustment units, those on the upper control arm may be operated to offset in an opposite direction from those on the lower control arm (e.g., reciprocally).

In some variations the alignment adjustment units may be configured to operate out of synch, and may therefore adjust caster; for convenience, these units may still be referred to herein as camber adjustment units, though they may be operated so as to adjust camber and/or caster.

The alignment adjustment units described herein may provide advantages not possible in other systems for adjusting alignment (e.g., camber). In particular, these units may be compact, and are inherently self-locking; for example, cutting power to the motor may result in securely locking the wheel alignment in its current position. In addition, the drive gear and motor may be positioned away from the body of the vehicle and the tires, in one of a variety of angles that may allow the motor and drive gear to avoid other, potentially more crowded regions of the vehicle.

For example, FIG. 4 shows an assembly including a camber adjustment unit 1650 as described herein. In FIG. 4, both ends of the upper control arm 1613 (wishbone) opposite from the tire 1605 are coupled to a camber adjustment unit 1650, 1650' and may be each be driven by a motor driving the drive gear to rotate an offset gear as described above.

Figure 5A:
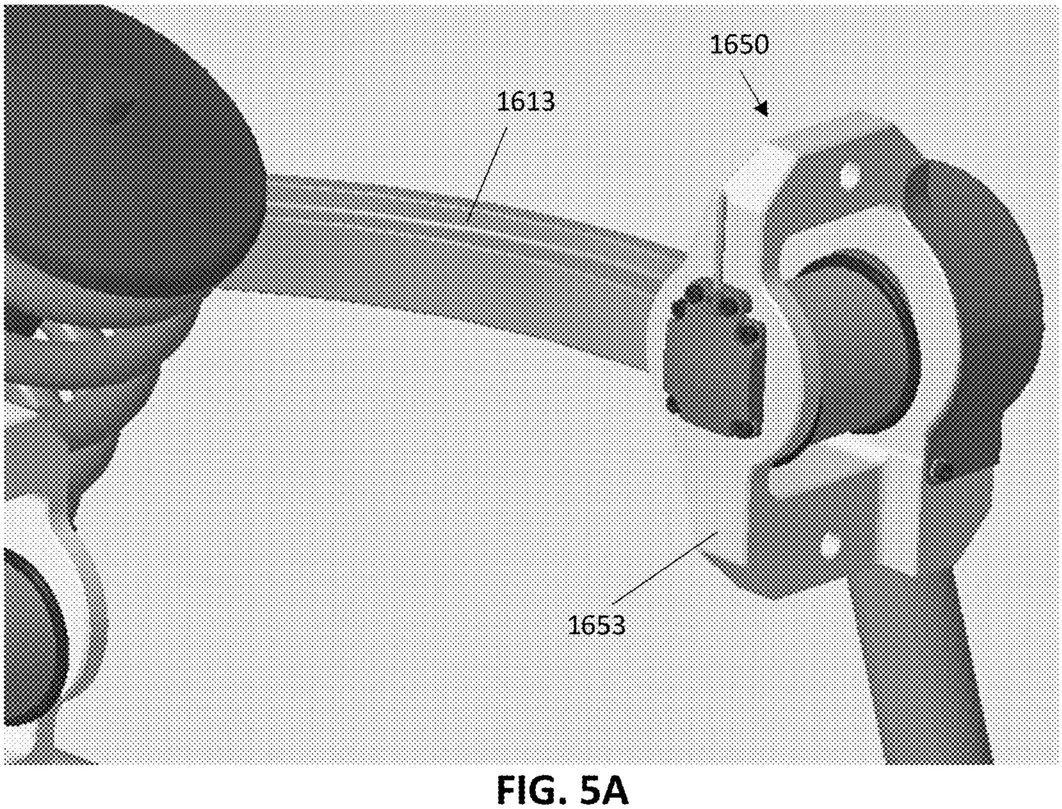
FIG. 5A shows an enlarged view of the alignment adjustment unit of FIG. 4.
Figure 5B:
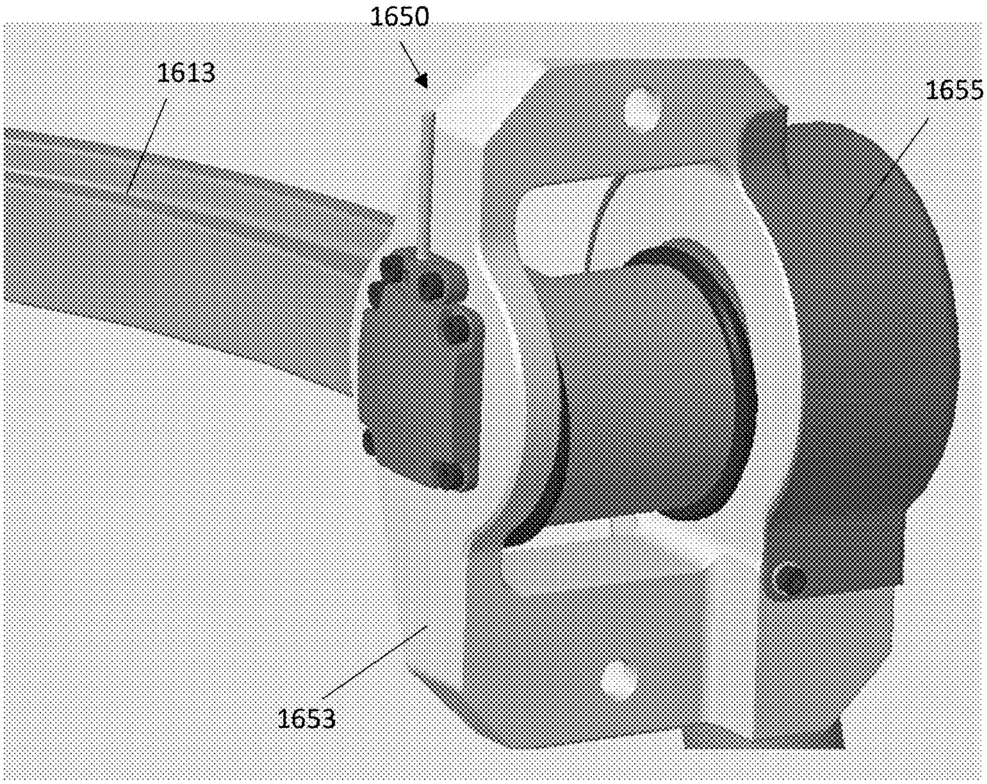
FIG. 5B is a second enlarged view of the alignment adjustment unit shown in FIG. 5A.
Figure 5C:
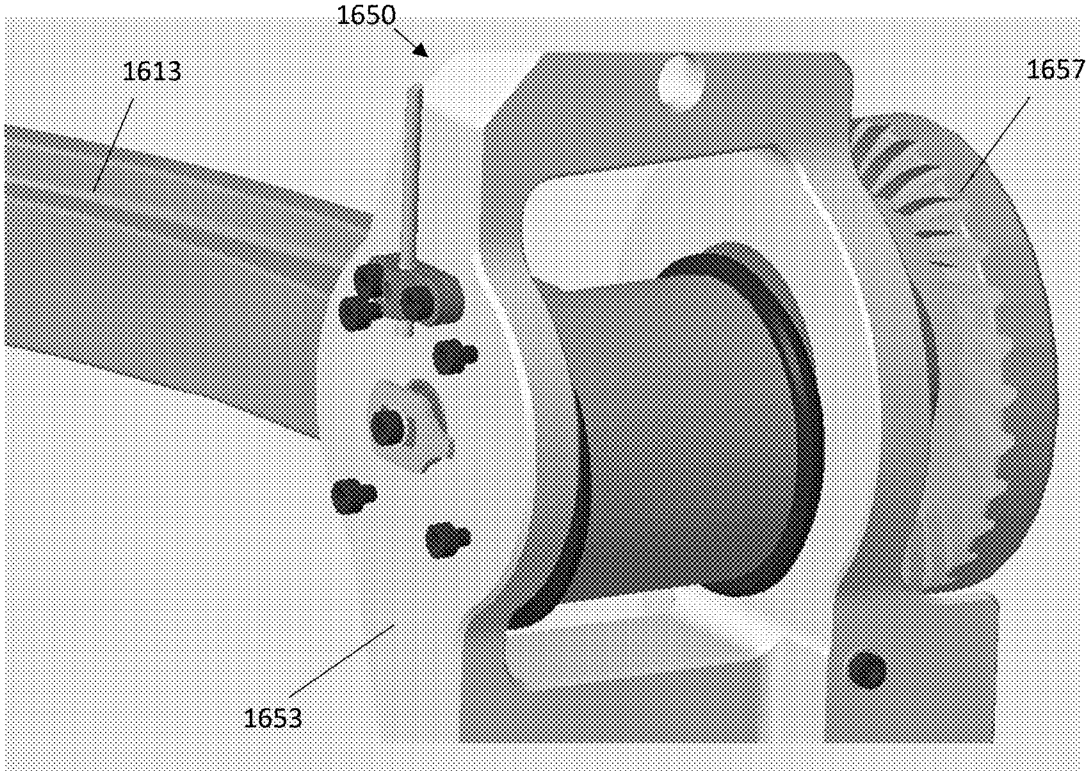
FIG. 5C shows the alignment adjustment unit of FIG. 5B with the cover removed.
Figure 5D:
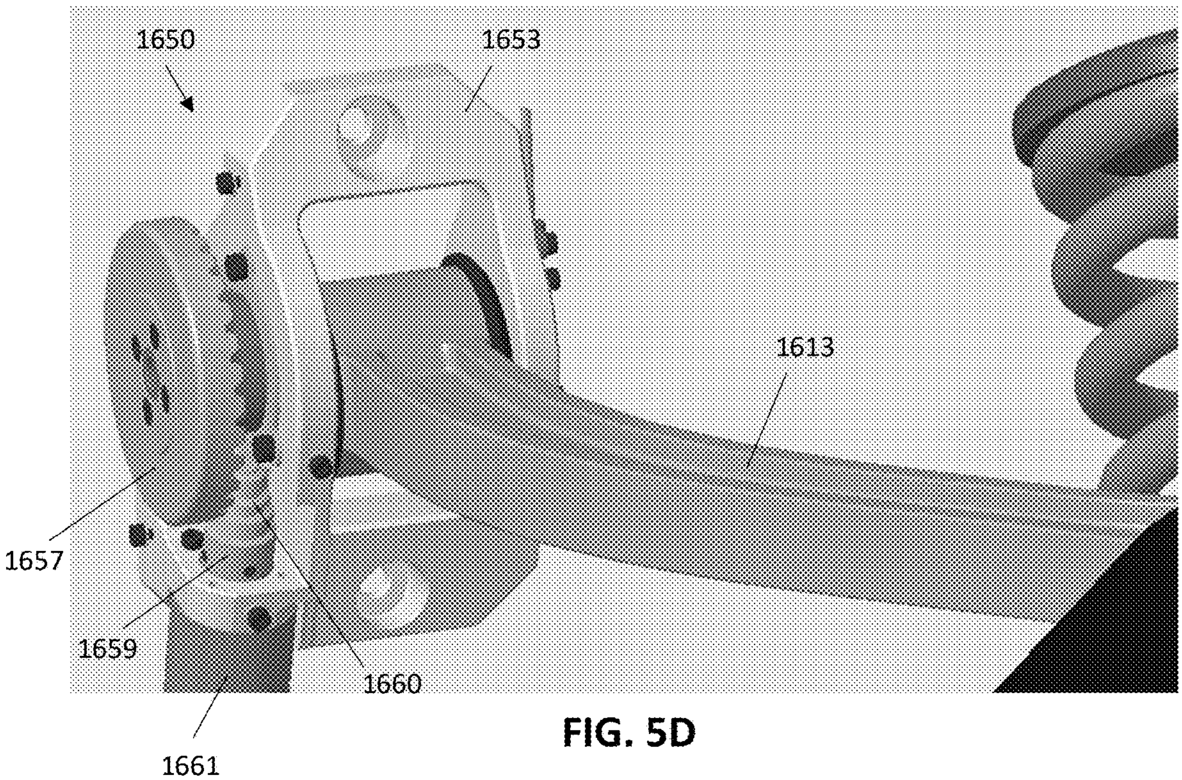
FIG. 5D shows another perspective view of the alignment adjustment unit of FIG. 5C, showing the drive gear and offset gear.

FIGS. 5A and 5B shows an enlarged view of one end of the upper control arm 1613 coupled to a frame 1653 to which an offset gear (not visible in FIG. 5A) is also coupled. In FIGS. 5A and 5B a cover 1655 covers the larger offset gear 1657, which is visible in FIG. 5C, in which the cover has been removed. Rotation of the offset gear by the smaller drive gear (not visible in FIGS. 5A-5C) moves the end of the upper control arm relative to the mount to adjust camber and/or caster, as described above.

FIG. 5D shows the camber adjustment unit 1650 with the cover off, so that the gears are visible. In FIG. 5D, the upper control arm 1613 is coupled to the larger offset gear 1657 which is mounted to the frame 1653. The smaller drive gear 1660 is part of a drive shaft 1659 that is driven by a motor 1661 that is also mounted to the frame. The motor may be controlled by a wired or wireless communication to drive movement of the motor (e.g., forward/clockwise, and/or reverse/counterclockwise).

Any of the systems described herein may be controlled by a central processor or a distributed processor (e.g., specific to one aspect, e.g., camber) of the wheel alignment. In some variations these systems may be adaptive (e.g., closed-loop) and/or user-driven (e.g. open-loop), as when a driver/user switches a button or control when driving. The sensor systems described above, including the body and wheel IMUs, may be used to detect and control wheel alignment, including camber, castor and/or toe. For example, multiple sensors, e.g., IMUS as described above, may be used to detect and provide feedback for adjusting camber, castor and/or toe using an algorithm that receives inputs from the sensors of the IMUs to determine wheel alignment settings.

Figure 6A:
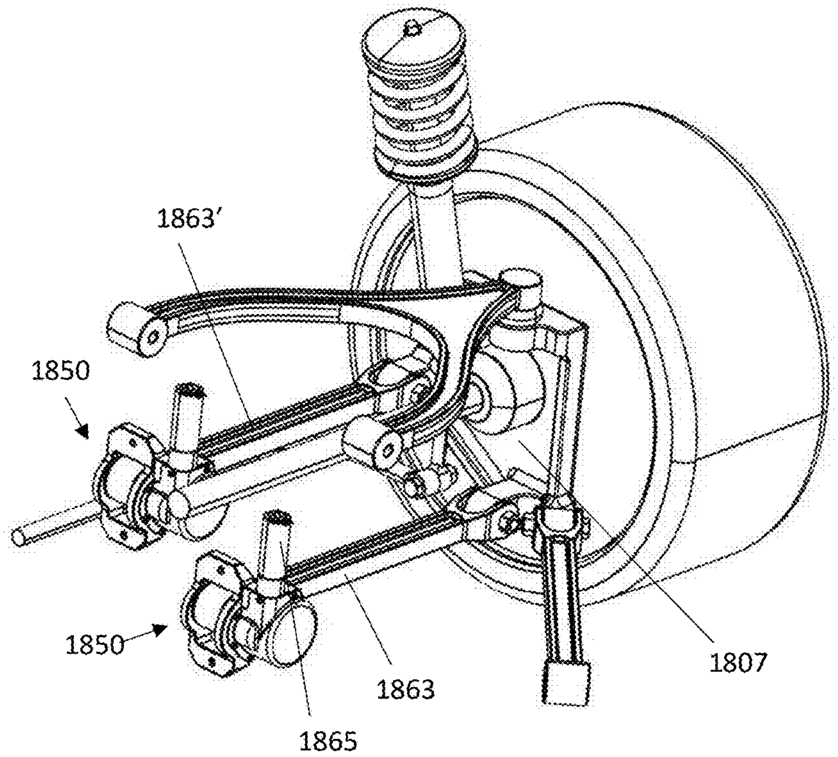
FIG. 6A is a perspective view of a multi-link system including two alignment adjusting units.
Figure 6B:
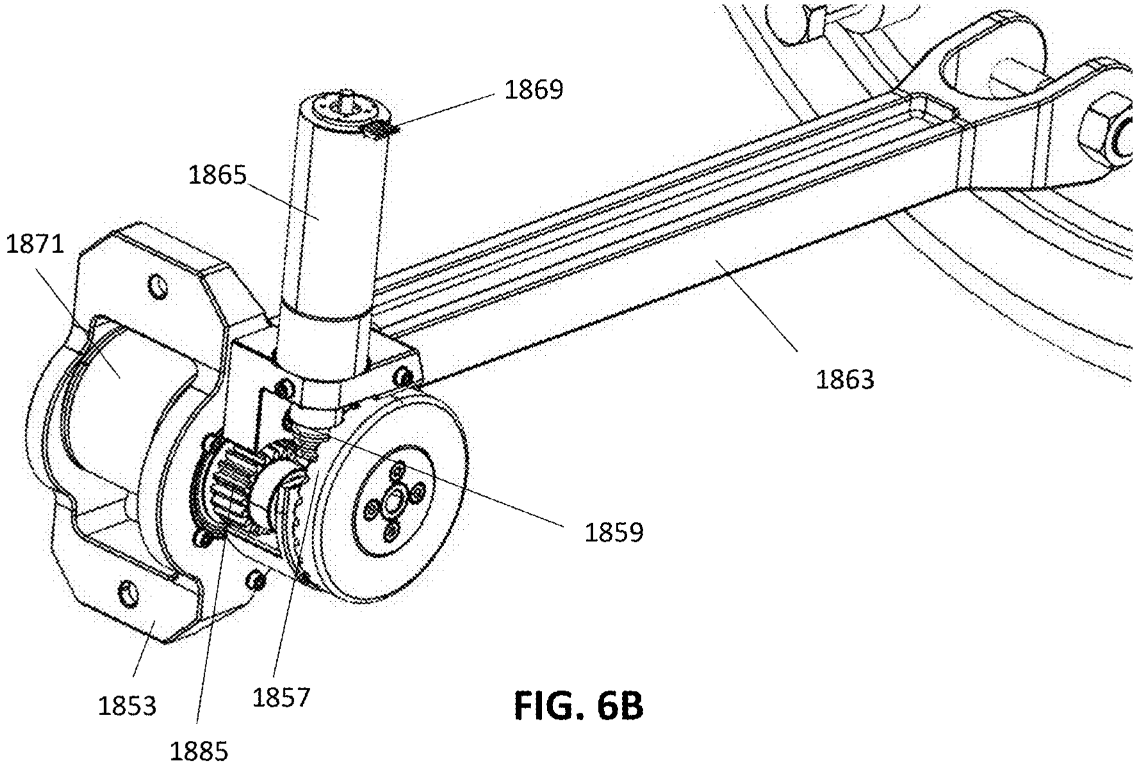
FIG. 6B shows an enlarged view of the alignment adjusting units of FIG. 6A, with the cover removed to expose the drive gear and offset gear.

FIGS. 6A-6B illustrate another example of an alignment adjusting system configured as part of a multi-link system including a pair of alignment adjusting units 1850 similar to those described above, including a frame coupled to a spiral bevel gear having an offset gear (driving offset of the straight arm 1863 coupled to the knuckle 1807 of the tire), which is mated to the smaller drive gear (the hypoid gear). This smaller hypoid (drive) gear is offset from the gear center of the larger (offset) gear. This spiral bevel gear forming the drive gear is configured to have a high torque, self-locking mechanism, similar to a worm drive, such that the smaller drive gear is in the front, with the larger offset gear in the back. The drive itself (including a motor 1865) may operate by rotating when driven, to controllably move and offset the straight arm, thereby moving the tire (e.g., the knuckle) so that angle of the tire relative to the body of the vehicle changes. The offset gear that is coupled to the end of the straight arm 1863 is rotatably mounted to the frame of the alignment adjusting unit so that rotational movement of the drive gear results in an offsetting movement of the end of the straight arm to which the offset gear is coupled. This may allow both positive and negative movement, which may be controlled with precision, as the motor of the alignment adjustment unit may be configured to rotate the drive gear for multiple turns (e.g., 50 turns of motor) to drive a single turn of the larger offset gear. In the multi-link system shown in FIG. 6A two straight arms 1863, 1863' each connected to an alignment adjusting unit 1850, are shown.

FIG. 6B shows an enlarged view of the alignment adjusting unit described herein. In FIG. 6B, the cover of the alignment adjusting unit has been removed, exposing the drive gear 1859 and the offset gear 1857 as well as a frame 1853 to which the gears and the drive motor 1865 are attached. The drive motor includes an encoder 1869. The straight arm is linked to the offset gear 1857 so that as the drive gear rotates and drives rotation of the offset gear, the linkage to the straight arm 1863 pulls or pushes the straight arm perpendicular to the knuckle (e.g., hub) of the tire, adjusting the alignment of the wheel. The offset gear is configured as (or in some variations, coupled to) an offset bushing 1871. As shown in FIG. 6B the straight arm 1863 is moves in and out along its long axis (perpendicular to the knuckle) as the offset gear rotates, which in turn rotates an intermediate gear 1885 to which the straight arm is rotatably coupled. By positioning one or more straight arms coupled to the wheel (e.g., the knuckle hub of the wheel), at different regions, movement of the straight arms may result in changing the alignment of the wheel. Depending on the placement of the straight arm relative to the wheel (e.g., the knuckle or hub), one or more of camber, toe and/or caster may be adjusted.

The intermediate gear 1858 in FIG. 6B may help transfer the rotational movement of the drive (motor 1865) into the precise movement of the offset bushing, to allow the alignment adjustment (e.g., of camber, caster, and/or toe, depending upon the placement of the straight arm/control arm(s)). In some variations an intermediate gear is not needed to couple the alignment adjustment drive (also referred to as alignment adjustment motor) to the movement of the offset bushing. However, the use of one or more intermediate gears may permit the alignment adjustment drive to be positioned in any arbitrary direction, so that it may readily avoid interference with other components of the alignment or undercarriage. In the examples shown above, the alignment adjustment drive is a cylindrical motor.

As mentioned above, other gearing systems may be used to couple the alignment adjustment drive (motor) to an offset bushing. For example, a worm drive may be used, e.g., the rotational shaft of the motor may mesh with a gear (worm wheel) rotationally coupled to the offset bushing. One or more spur gears may be used, creating the majority of the reduction in the gearing system (e.g., an attached gearbox), which may use a brake built into the motor. This may allow mounting of the motor longitudinally under or above the eccentric shaft. In some variations one or more bevel, miter, or screw gears may be used, creating the majority of the reduction in the gearing system (e.g., an attached gearbox), using a brake built into the motor. This may allow mounting of the motor vertically, similar to that shown in FIGS. 5-6B. Alternatively, in some variations the apparatus may include a rotary hydraulic. In some variations a linear hydraulic or ball screw, e.g., a lever arm off of the shaft rather than a gear, which may include a telescoping mechanism mounted between the end of the lever arm and a pivot on the chassis. This may be more used with a reduced rotation angle of the eccentric shaft.

Control Systems

Any of the apparatuses described herein may be operated as "mode select" systems, whereby the user selects a desired driving mode, and the computer sets the wheel alignment parameters accordingly. While the mode select system is preferred in some applications, for other applications it is desirable to have the computer automatically adjust the wheel alignment parameters for the user while the vehicle is being operated, referred to herein as an adaptive system. The adaptive systems for adjusting alignment described herein may optimize the wheel alignment at all times, thereby optimizing the contact patch between the tires and the road at all times.

Thus, described herein are adaptive control systems for active wheel alignment systems (AWASs). The AWAS described herein may include additional electronics components, sensors and uprated motors/gearboxes (to facilitate higher adjustment speeds). An adaptive control system for active wheel alignment as described herein may receive input data from a number of sources, including from the vehicle's engine control unit (ECU), from the user, and from other sensors in the present system, including the IMUS described above. All this input data may then be processed by an ECU, where it may be combined and used to determine what the wheel alignment settings should be for each wheel. These wheel alignment settings are then converted to position settings for the electric motors and are sent out to the motors.

These systems may use a wide range of input data that could potentially be used for adaptive and even predictive determination of wheel alignment settings. Examples from the vehicle may include (accessible via the vehicle's CAN bus network in modern vehicles) any one or more of: steering angle, vehicle speed, throttle position/percentage, brake position/percentage, engine RPM, gear, driving mode (user input, via vehicle's existing mode selector), etc. Examples from external sensors (that is, additional sensors provided by the systems described herein), or from the vehicle where available may include one or more of: 3-axis accelerometer (lateral, lineal and vertical g-force), 3-axis gyro (yaw rate, roll rate, pitch rate), 3-axis magnetometer, inclinometers, heading (direction of travel, e.g. via Euler angles or quaternion), GPS signals for trajectory mapping, cameras for forward looking and/or road mapping (including surface mapping), tire temperatures, tire pressures, etc. More than one of the same sensor type can be fitted to a single vehicle, e.g. multiple accelerometers could be fitted around a vehicle to map its behavior at different points on the vehicle. Note that input data can be used for different purposes, and the input signals for each vehicle can be very different (even with identical sensors) due to different vehicle dynamics. Some input data may be used to characterize the dynamics of the vehicle and calibrate/tune the computing algorithms (see below for further details). Other data may be used all the time in order to determine target wheel alignment settings on-the-fly. Furthermore, input data may be prioritized and/or weighted according to its importance level, and some data may be used as a backup signal for crosschecking.

The input data may be converted into output wheel alignment settings. For example, a major need for adaptive control takes place during the cornering of a vehicle. Here, one of the most important variables is body roll. As the body rolls, it displaces the suspension and causes roll towards/onto the outer edges of the outer tires. If a vehicle turns left, the body rolls towards the right, causing roll onto the outer edges of the right-hand side tires. To maximize the tire contact patch, more negative camber is needed on the outer/right wheels (and more positive camber on the inner/left wheels), and corresponding changes are needed to the other wheel alignment parameters (e.g. toe and/or caster). Also, the body roll rate is correlated with the yaw rate and the lateral g-force of the vehicle (i.e. the more quickly a vehicle changes direction or turns (yaw rate), the greater the lateral g-force, and the greater the body roll (roll rate)).

During cornering, it may be helpful to maintain as much of the tire in contact with the road as possible. A prototype test vehicle was outfitted with tire temperature sensors on all wheels, measuring the temperature profile across the face of the tire at 16 points. A number of cornering tests with different wheel alignment settings were performed to determine the optimum settings as a function of vehicle dynamic properties (i.e. roll rate, yaw rate and lateral g-force). The optimum wheel alignment settings at a given lateral g-force were determined when the temperature profile across the tire was flat/uniform, and the peak temperature in the tire was minimized. For example, at a lateral g-force of about 1 g the tire temperature profile of the front outer wheel was optimized at a camber value of about −2.5 degrees in the test vehicle.

This information and other data points were used to build algorithms to map the target wheel alignment settings to one or more of the input data streams mentioned above. A detailed example is below. The methods and apparatuses described herein may include one or more algorithms that relate input data streams to target wheel alignment parameters and may operate primarily using two principal components: vehicle dynamics parameters and maps. The vehicle dynamics parameters allow the input data streams to be fused together in a meaningful way, which ultimately provides a reliable assessment of the vehicle's momentary behavior (free of bump error, etc.). The maps then allow that assessment of the vehicle's behavior to be converted into appropriate target wheel alignment settings. Any appropriate map may be used, such as (but not limited to) stepwise, linear, non-linear, S-shaped, data-fits, etc. These may map the vehicle behavior to the most appropriate target wheel alignment settings at a given moment in time. Different maps can be used for different scenarios, e.g. different maps for cornering, braking, accelerating, parking, etc. Also, more than one map can be used for a single driving activity, for example via the mode select switch/dial in modern cars, there can be one set of maps for Normal or Economy mode, another set of maps for Sport mode, and again another set of maps for Sport+ or Race mode.

Figure 7:
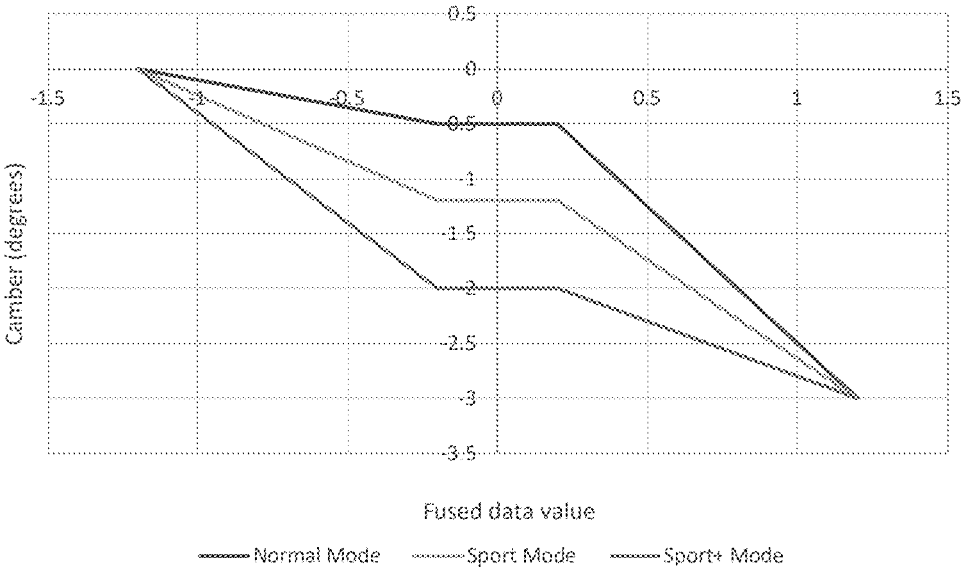
FIG. 7 shows one example of three maps used for an adaptive wheel alignment control system for normal mode, sport mode and sport+ mode.

For example, one set of cornering maps for three different driving modes is shown in FIG. 7. In this example, three modes (normal, sport and sport+) are shown. The maps (each line in the graph of FIG. 7) shown may be used to determine the target camber setting of a single wheel. In this example, for all three maps, when the fused data value is between −0.3 and 0.3, the target camber setting may remain fixed: −0.5 degrees for Normal mode, −1.2 degrees for Sport mode, and −2.0 degrees for Sport+ mode. As the fused data value exceeds 0.3 and increases towards 1.2, the target camber setting for all three maps linearly tends towards −3.0 degrees. In the opposite direction, as the fused data value drops below −0.3 and decreases towards −1.2, the target camber setting for all three maps linearly tends towards 0.0 degrees. Again, beyond this example any number of maps can be used for different driving scenarios, and any form of trend can be used, including non-linear trends.

Based on information in these maps, which may be determined empirically or computationally, an output drive signal may be determined. For example, the target wheel alignment settings may be converted into an appropriate form for transmission to each of the electric motors that controls the vehicle's wheel alignment settings (including, e.g., a camber adjustment unit such as shown and described above).

The generalized description for an adaptive wheel alignment control system described above may use any of all of the input data streams mentioned above, and any number of algorithms. In some variations the number of input data streams may be limited to a subset of these. For example, in one embodiment the dynamics of a test vehicle were mapped, via a number of controlled tests, to determine optimum wheel alignment settings (i.e. potential target outputs for the system) as a function of select input data streams. Optimum wheel alignment was determined largely based on optimized tire temperature profiles in this example, along with some objective-driven design. The input data streams initially targeted were roll rate, yaw rate, lateral g-force, and a number of sensor inputs from the vehicle's CAN bus network.

Roll rate, yaw rate and lateral g-force are all mathematically related in a cornering maneuver, and in a cause-and-effect equation are all "effects" of cornering. While they are good measures of actual vehicle behavior, they can be very noisy signals in the real world due to bumps, potholes and the like. The "causes" in this equation are the sensor signals from the vehicle's CAN bus, as they are derived from user (driver) input commands and the vehicle's ECU. Again, examples include steering angle, vehicle speed, throttle position, brake position, engine RPM, gear and driving mode. Through extensive testing these vehicle data streams have been identified (as described herein) and may provide clean signals that can be used to reliably predict roll rate, yaw rate and lateral g-force without noise. In other words, mapping the cause to a predicted effect based on vehicle dynamics.

As a result, in one method and apparatus (e.g., including a primary algorithm) a number of input data streams from the vehicle's CAN bus, along with multipliers and offsets derived from the vehicle's own dynamics, have been combined to calculate a "predicted lateral g-force" (i.e. what the measured lateral g-force will be without noise error). The methods and apparatuses may then use this predicted lateral g-force to compute target wheel alignment settings. As a secondary check, the measured lateral g-force (and also the roll and yaw rates) can be compared to the predicted lateral g-force to ensure there is no gross error, calculation drift or the like.

Figure 8:
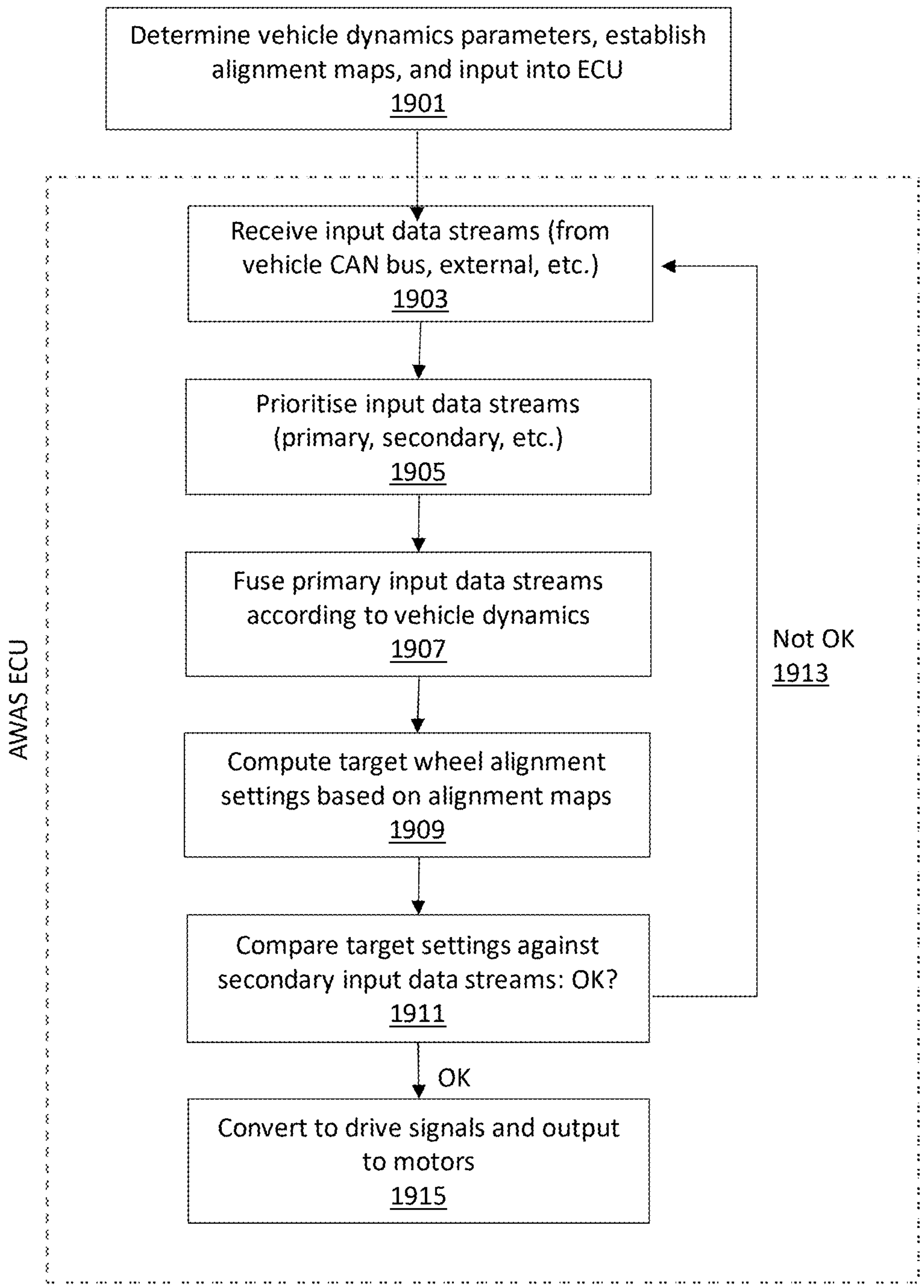
FIG. 8 schematically illustrates one method of automatically adjusting the alignment of a vehicle using an AWAS system as described herein.

FIG. 8 shows a flow diagram depicting the general process described above. Note that these steps may be performed inside a specifically modified ECU (or separate control unit), after the vehicle dynamics have been determined and inputted. With reference to FIG. 8 and the specific example above, in some variations the primary input data streams may be derived from the vehicle's CAN bus, while the secondary input data streams may include the roll rate, yaw rate and lateral g-force. However, it should be noted that other input data streams could be used/incorporated in the algorithm as either primary or secondary inputs, e.g. lateral g-force could be smoothed and used as a primary input.

For example, in FIG. 8, the apparatus or method may receive, access and/or determine vehicle dynamics parameters and/or alignment maps from the ECU or a comparable/connected processor, 1901. For example, the ECU may be configured to access vehicle dynamics parameters and alignment maps, as described above. This information may be stored locally or remotely, including in a memory, buffer, etc., accessible by the AWAS/AWAS ECU. The ECU in this example may be an ECU adapted to include the active wheel alignment systems (AWAS) and is shown schematically in FIG. 19 as the dashed box ("AWAS ECU"). Alternatively in some variations a separate active wheel alignment system (AWAS) unit may be included and may connect to the ECU.

The AWAS or AWAS ECU ("AWAS/AWAS ECU") may then receive input data streams, such as from the vehicle CAN bus, from one or more external sensors (e.g., any of the IMU sensors described above, etc.) 1903. The input data may then be prioritized (e.g., primary, secondary, tertiary, etc.) 1905, and some or all of the primary data may be combined (fused) 1907 according to the vehicle dynamics, accessed as described above (e.g., from a memory accessible by the AWAS/AWAS ECU).

A target wheel alignment may then be computed 1909 based on the alignment maps accessed by the AWAS/AWAS ECU. The target settings determined from the maps may then be compared 1911 to the secondary input data streams to determine if the comparison is close ("OK") or different by greater than some threshold ("Not OK") 1913. If the comparison is sufficiently close ("OK") the determined settings (e.g., from the map) may be converted to drive signals and outputs to the alignment controlling motors (e.g., the camber adjustment unit or other electromechanical adjustment units, such as those described below) 1915.

Note also that while the above examples describe cornering, any of these methods and/or systems (including one or more algorithms) may follow the same basic flow structure for other objectives, for example for optimizing wheel alignment during braking, acceleration, parking, etc.

The active wheel alignment systems (AWASs) described herein may provide improved handling performance, which impacts cornering performance, safety and obstacle avoidance; may lower rolling resistance, which impacts fuel efficiency, emissions, noise, vibration and harshness (NVH), and tire life; and may lower peak tire temperatures, which impacts tire life and uneven tire wear.

EXAMPLE

Figure 9A:
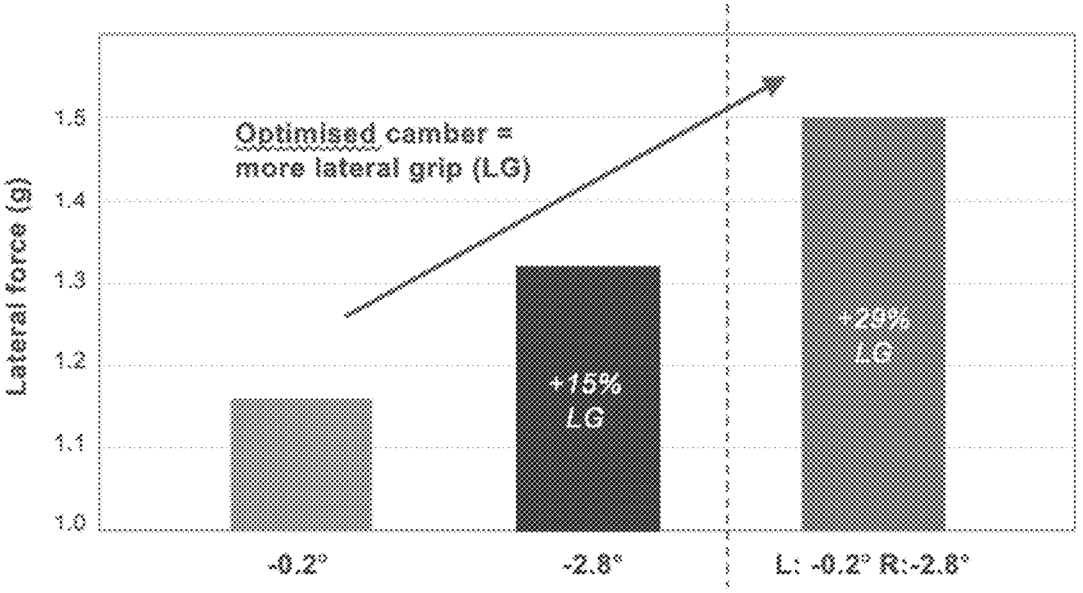
FIG. 9A illustrates the results of a set of tests from a test vehicle fitted with an active wheel alignment system (AWAS), in which camber is adjusted to compare the achievable lateral force (g) (e.g., lateral grip).

In one example, a 2012 Audi TTRS test vehicle was fitted with front axle active camber and toe control as part of an AWAS, as described herein. In terms of handling performance, in a standard circle test (25 m diameter) it was found that changing the camber of both front wheels equally from −0.2 degrees to −2.8 degrees increased the achievable maximum lateral grip (g-force) by 15%. Furthermore, when testing using "differential camber" (different camber on the left and right wheels), with the front left wheel at −0.2 degrees and the front right wheel at −2.8 degrees (turning left), a 29% improvement in lateral grip was seen versus having both wheels at −0.2 degrees. This is shown in the graph of FIG. 9A. In FIG. 9A, the differential camber result shows the potential of adaptive wheel alignment (i.e. automatic, on-the-fly changes) for improving cornering, handling and stability.

Figure 9B:
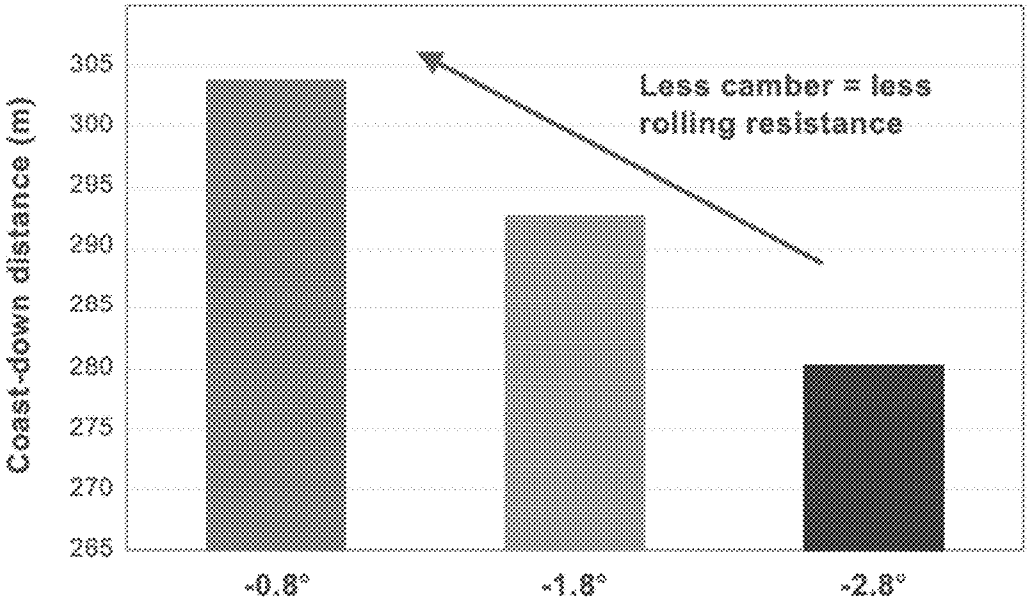
FIG. 9B illustrates the results of a set of tests from a test vehicle in which camber is automatically adjusted in a closed-loop manner, examining rolling resistance.

In terms of rolling resistance, in a standard coast-down test (40 km/h to 15 km/h) changing the camber of the front wheels from −2.8 degrees to −0.8 degrees reduced the rolling resistance by 8%. See FIG. 9B. Further testing with camber values closer to zero degrees showed a greater than 10% reduction in rolling resistance. Reduced rolling resistance translates to lower fuel consumption, emissions, NHV and tire wear.

Figure 10:
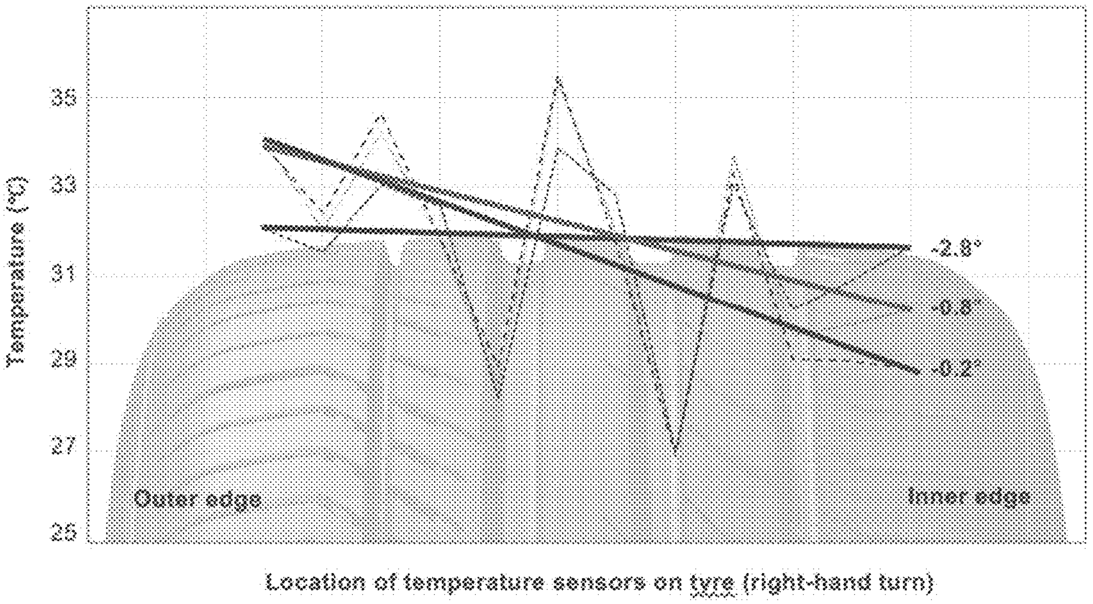
FIG. 10 graphically illustrates the temperature detected across a tire at different camber values during cornering.

In terms of tire temperatures, in a standard circle test (25 m diameter at a fixed speed of 40 km/h) changing the camber of the front wheels from −0.2 degrees to −2.8 degrees resulted in a 90% reduction in temperate variation across the surface of the tire (for the outer wheel). Furthermore, the peak temperature in the tire dropped by over 10%, as shown in FIG. 10.

While the above sample data is just for front wheel camber, further benefits can be achieved by adjusting other wheel alignment parameters including toe and caster, either independently or in combination with camber, for front axles, rear axles, steered axles, and non-steered axles.

In general, applications of the AWAS described herein include improving one or more of handling, safety, braking, fuel efficiency, emissions, NVH, comfort and/or tire life in vehicles, including but not limited to passenger vehicles, light commercial vehicles, heavy commercial vehicles, and other passenger and goods transport vehicles. More specifically, some examples of applications include (but are not limited to): improving handling and safety in sports and luxury vehicles; reducing tire wear and fuel consumption in heavy commercial vehicles; improving turning circles in trucks; Ackerman steering compensation in heavy vehicles, including twin-steer vehicles; extending battery range for electric vehicles; novel steering systems for autonomous vehicles, including rack-less steering and independent wheel steering; redundant braking systems for autonomous vehicles, using wheel alignment to increase rolling resistance and therefore slow the vehicle; adaptive suspension systems for rolling chassis and new mobility platforms; providing steering to currently non-steered axles, including rear wheel steering; automatically adjusting for road camber, for example when changing from left-hand to right-hand drive environments; improving handling and traction in off-road vehicles; providing switchable wheel alignment for different driving environments or vehicle configurations; and enhancing vehicle dynamics, whether fitted by the original equipment manufacturer or as an aftermarket accessory.

In addition to the alignment adjusting apparatuses and alignment adjusting units described herein, the methods and apparatuses including control systems and AWAS described herein may be used with and may control one or more other electromechanical apparatuses (devices, systems, assemblies, etc.) that may be used to adjust or control a vehicle suspension, in addition to the alignment adjusting apparatuses described herein. In some embodiments, these apparatuses may be apparatuses for electrically adjusting wheel alignment (e.g., camber, toe, and/or castor). In some variations these apparatuses may be specific to one or more of camber, toe and/or caster; multiple apparatuses may be combined into a system, which may share a common controller (e.g. processor) that coordinates their operation.

Some of the apparatuses described herein, and particularly the camber-adjusting apparatuses, may couple between the frame of the vehicle and the suspension that is in turn coupled to the wheel. Thus a camber-adjusting apparatus may include a mount body that securely couples to the frame of the vehicle, and a holder (e.g., an arm holder) that couples to a portion of the suspension that is preferably close to the frame and further from the hub of the wheel. For example, the holder may be an arm holder that is configured to hold an end of an upper arm of the suspension, such as the strut of a MacPherson-type suspension, or an end of an upper wishbone of a double-wishbone type suspension. The holder may be coupled with or part of a linear stage; in general, the holder is configured to move in a first, e.g., linear, translational axis and may be constrained from moving in other linear directions. Movement is typically through a translational bearing surface over which the holder moves, and an electromechanical actuator is coupled directly or indirectly (e.g., through the linear stage) to the holder to move it backwards and forwards along the translational bearing surface in a first translational axis into a desired position, thereby adjusting the camber of the wheel.

The mount body may include two or more parts that connect together, such as a first (e.g., upper) mount body and a second (e.g., lower) mount body; the different portions may be configured to support different loads. For example, the second mount body may be configured to support high loads, while the first mount body may only have to support lighter loads and may include the electromechanical actuator. Dividing the load carrying functions of the mount body may help isolate the electromechanical actuator from the otherwise larger load applied through the apparatus, so that the load seen by the actuator may be much smaller and more uniform.

Similarly, a toe-adjusting apparatus generally includes an elongate body having a telescoping rod that is coupled in-line with the tie rod (e.g., between the tie rod and the steering rack of the vehicle). The telescoping rod includes a mechanical linear actuator (such as a ball screw/ball nut) that is actuated by an electromechanical actuator. The elongate body forming the apparatus may also have two or more parts that connect together and separate out the loads on the apparatus. For example, the first part of the elongate body may connect to the electromechanical actuator and the second part of the elongate body includes the telescoping rod, connects in-line with the tie rod, and is configured to support much higher loads that the first part of the elongate body. For example, the first part of the elongate body may include a tie rod mount at one end and a steering link mount at the second end.

Other electromechanical apparatuses for controlling vehicle suspension settings are also described herein and may be included as part of a system for modifying or controlling vehicle alignment (including alignment of one or more wheels). These apparatuses may share all or some features. For example, also described herein are apparatuses configured to control the stiffness settings of an anti-roll bar, and apparatuses configured to control the roll center settings of a vehicle, as well as methods of making and using them, processors for controlling them, and systems including them. In general, these apparatuses may include one or more structural members configured to support the relevant static and dynamic loads of a vehicle, one or more adjustment members configured to control and alter suspension settings, and one or more drivers configured to drive translation of the adjustment member(s). In some cases adjustment members may also be configured as structural members, thereby both supporting the relevant loads of the vehicle and also controlling the suspension settings. In general, these apparatuses may be controlled via open-loop control or closed-loop control, or semi-closed loop (e.g., including user input, confirmation or selection). Any of these apparatuses may further include one or more sensors to monitor variables that may be useful for controlling suspension settings.

Figure 11A:
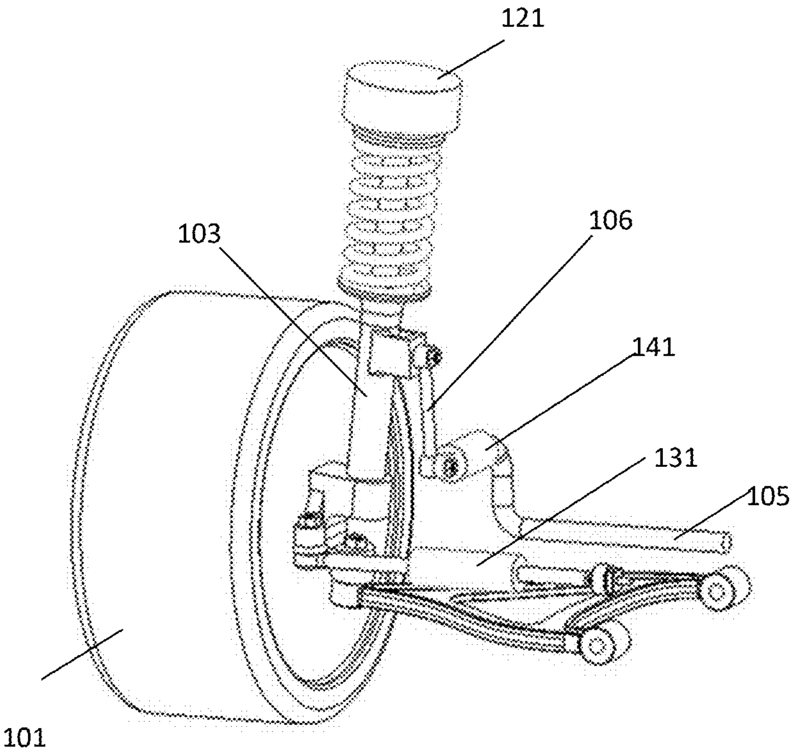
FIG. 11A shows an example of an apparatus (system) fitted to a MacPherson strut suspension system on a single wheel, configured as three devices.

FIGS. 11A-1C illustrate variations of electromechanical apparatuses for controlling vehicle suspension settings, the apparatuses shown are configured to be compatible with MacPherson strut suspension geometry. In this example, three electromechanical apparatus (e.g., devices) 121, 131, 141 control the suspension settings of one wheel 101 of a vehicle. The first electromechanical device 121 locates atop the strut 103 and is configured to control the camber and/or castor of the wheel 101. The second electromechanical device 131 locates between the outer tie rod 107 and the inner tie rod 109 (e.g., between the tie rod and the linkage of a steering rack) and is configured to control the toe of the wheel 101. The third electromechanical device 141 locates between the anti-roll bar 105 and a link 106 and is configured to control the stiffness of the anti-roll bar 105. In general, the toe adjusting apparatuses described herein may be used to replace a traditional tie rod with the electrically controlled (e.g., telescoping) apparatus that includes an anterior tie rod portion and a distal attachment and/or posterior tie rod portion. This is described in greater detail in FIGS. 23A-23H, below.

Figure 11B:
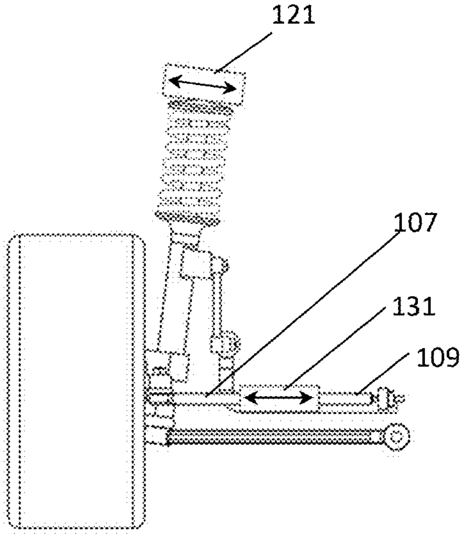
FIG. 11B shows a side view of the apparatus (system) shown in FIG. 11A.
Figure 11C:
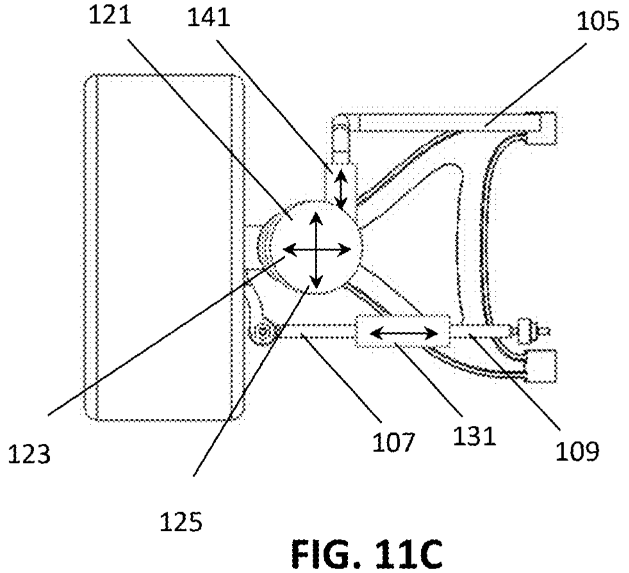
FIG. 11C shows a top view of the apparatus (system) shown in FIG. 11A.

FIGS. 11B and 11C illustrate the axes in which the electromechanical devices 121, 131, 141 in this example control and adjust suspension settings. Electromechanical device 121 controls the camber and castor of the wheel 101 by translating the top of the strut 103 in two axes: one axis for camber 123, and one axis for castor 125. Electromechanical device 131 controls the toe of the wheel 101 by altering the distance between the outer tie rod 107 and the inner tie rod 109, thereby effectively altering the total length of the tie rod. Electromechanical device 141 controls the stiffness of the anti-roll bar 105 by altering the distance between the anti-roll bar 105 and the link 106, thereby effectively altering the length of the anti-roll bar 105.

Any of the electromechanical devices described herein may control one or more than one suspension setting, for one or more than one wheel. Any number of electromechanical devices may be used to control suspension settings for one or more than one wheel. A vehicle may be fitted with one or more electromechanical devices configured to control any number of suspension settings for any number of wheels. For a given wheel, one or more electromechanical devices may be configured to control all or only some suspension settings.

Any of the electromechanical devices described herein may be configured to be compatible with any suspension geometry or version of a suspension geometry, including (but not limited to) fixed axle, independent, MacPherson strut, wishbone, double-wishbone, multi-link, air suspension, leaf spring, and torsion bar suspension.

Figure 12A:
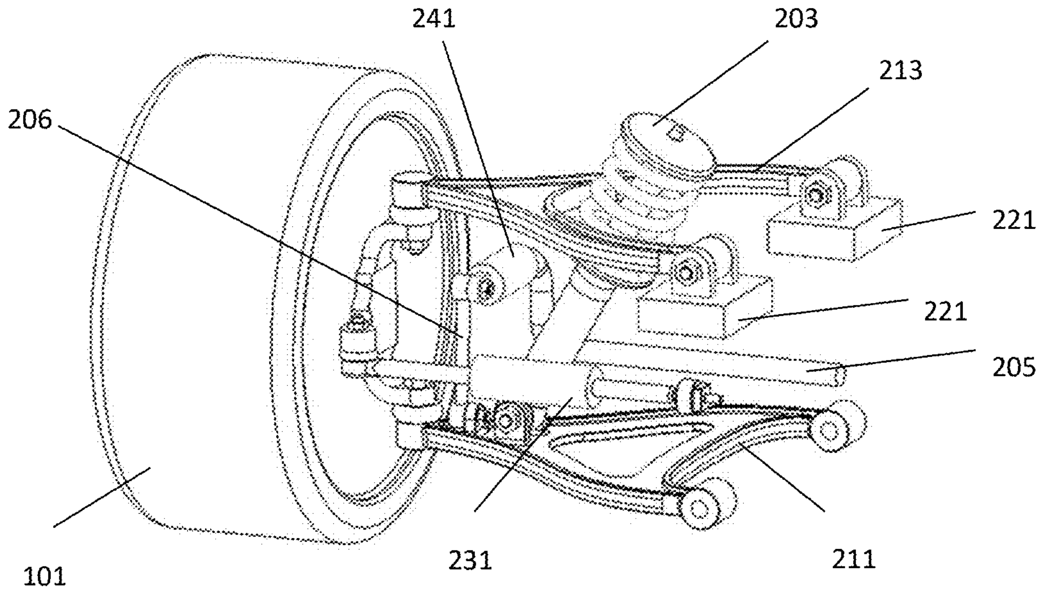
FIG. 12A shows an example of an apparatus (system) fitted to a double-wishbone suspension system on a single wheel, configured as four devices.

FIGS. 12A-2C illustrate variations of electromechanical apparatuses for controlling vehicle suspension settings, the devices configured to be compatible with a double-wishbone type suspension geometry. In this example, four electromechanical devices 221, 231, 241 control the suspension settings of one wheel 101 of a vehicle. The first two electromechanical devices 221 are identical and locate at the inner pivot points of the upper wishbone 213 and are configured to control the camber and castor of the wheel 101. The third electromechanical device 231 locates between the outer tie rod 207 and the inner tie rod 209 and is configured to control the toe of the wheel 101. The fourth electromechanical device 241 locates between the anti-roll bar 205 and a link 206 and is configured to control the stiffness of the anti-roll bar 205.

Figure 12B:
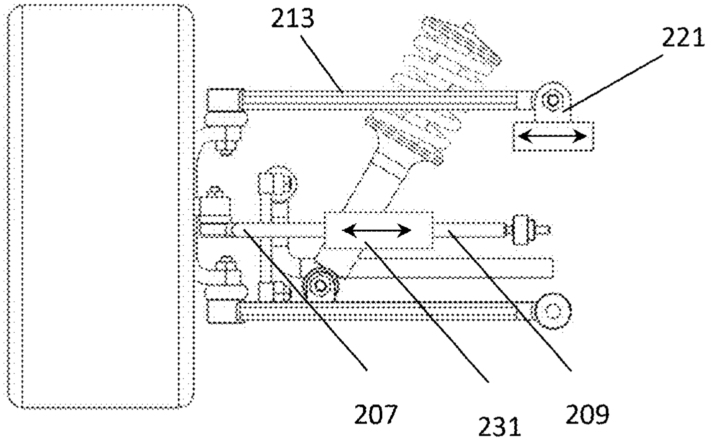
FIG. 12B shows a side view of the apparatus (system) shown in FIG. 12A.
Figure 12C:
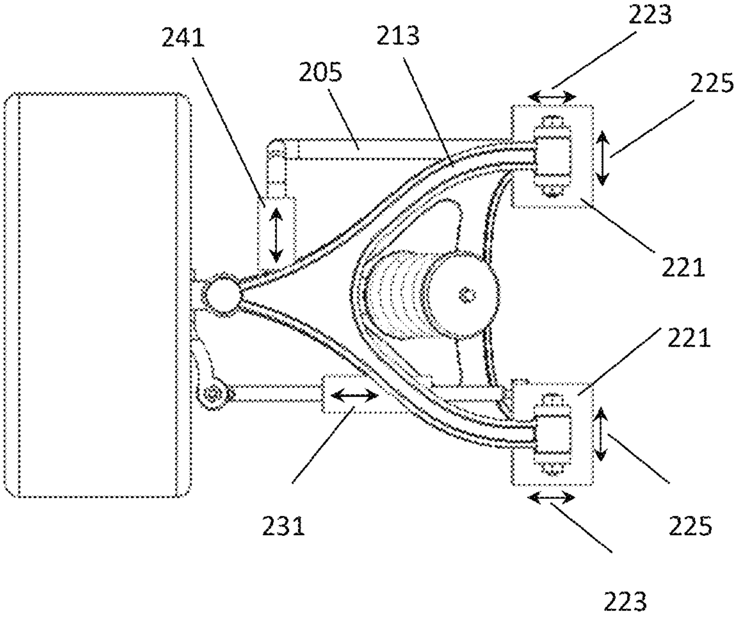
FIG. 12C shows a top view of the apparatus (system) shown in FIG. 12A.

FIGS. 12B and 12C illustrate the axes in which the electromechanical devices 221, 231, 241 in this example control and adjust suspension settings. Electromechanical devices 221 control the camber and castor of the wheel 101 by translating the upper wishbone 213 in two axes: one axis for camber 223, and one axis for castor 225. Electromechanical device 231 controls the toe of the wheel 101 by altering the distance between the outer tie rod 207 and the inner tie rod 209, thereby effectively altering the total length of the tie rod. Electromechanical device 241 controls the stiffness of the anti-roll bar 205 by altering the distance between the anti-roll bar 205 and the link 206, thereby effectively altering the length of the anti-roll bar 205.

Figure 13A:
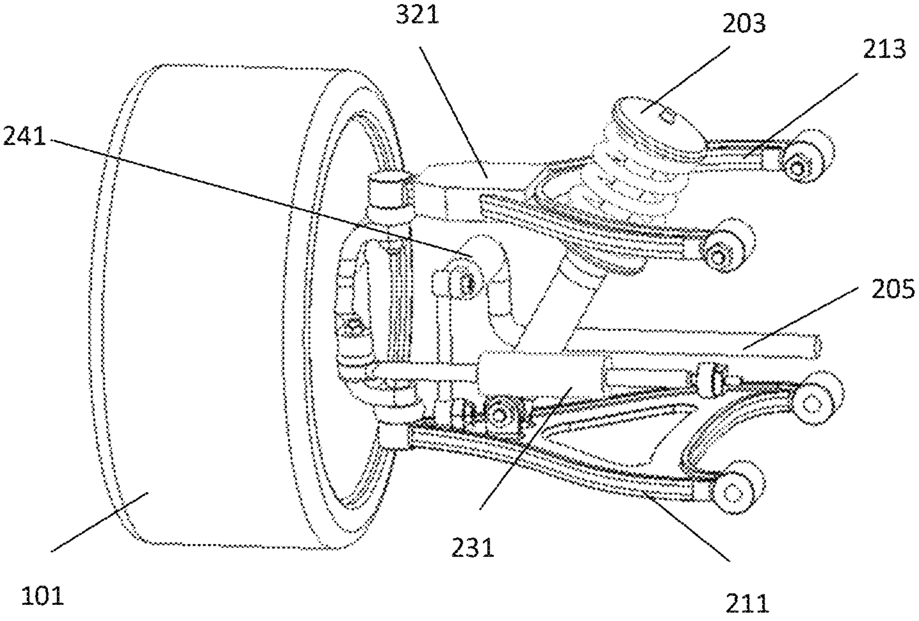
FIG. 13A shows another example of an apparatus (system) fitted to a double-wishbone suspension system on a single wheel, configured as three devices.

FIGS. 13A-3C illustrate other variations of electromechanical devices for controlling vehicle suspension settings, the devices configured to be compatible with double-wishbone suspension geometry. In this example, three electromechanical devices 321, 231, 241 control the suspension settings of one wheel 101 of a vehicle. The first electromechanical device 321 locates near the outer pivot point of the upper wishbone 213 and is configured to control the camber of the wheel 101. The other two electromechanical devices 231, 241 are identical to those described in FIGS. 12A-2C. In this example, no control over the castor of the wheel 101 is provided.

Figure 13B:
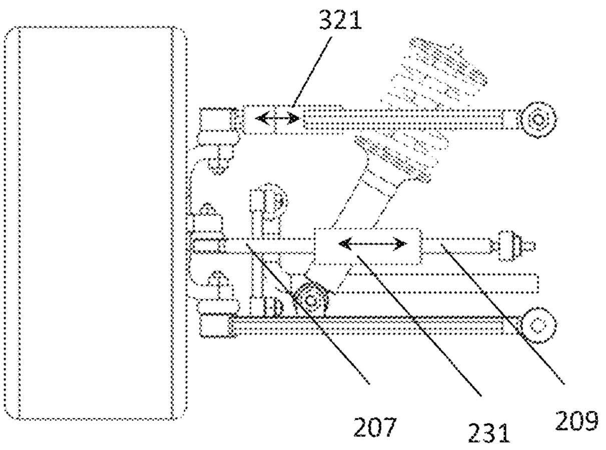
FIG. 13B shows a side view of the apparatus (system) shown in FIG. 13A.
Figure 13C:
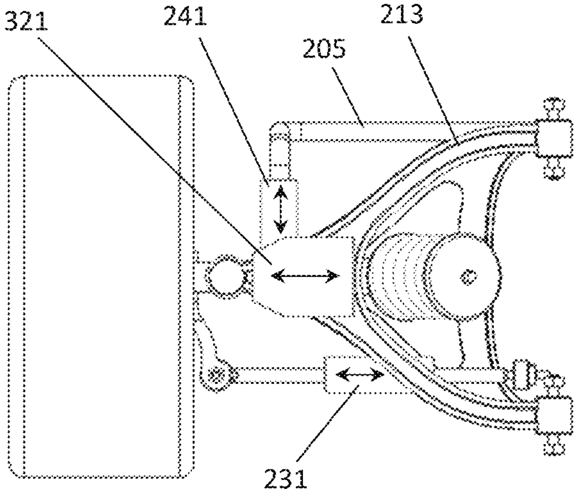
FIG. 13C shows a top view of the apparatus (system) shown in FIG. 13A.

FIGS. 13B and 13C illustrate the axes in which the electromechanical devices 321, 231, 241 in this example control and adjust suspension settings. Electromechanical device 321 controls the camber of the wheel 101 by translating the outer pivot point of the upper wishbone 213, thereby effectively altering the length of the upper wishbone 213. Electromechanical devices 231, 241 control the toe of the wheel 101 and stiffness of the anti-roll bar 205 as described in FIGS. 12B and 12C.

Any of the electromechanical devices described herein may be configured or located differently than illustrated in the herein examples provided they enable the control of one or more suspension settings. As illustrated in the example of FIGS. 13A-3C, a vehicle may be configured such that not all suspension settings are electromechanically controlled. In the example of FIGS. 13A-3C, the castor of the wheel is not controlled, while camber, toe and anti-roll bar stiffness are controlled.

In general, the electromechanical devices described herein may be configured to be compatible with the vehicle's original suspension system, or with an aftermarket suspension system, as desired, with minimal modification to the native geometry of the suspension system. This minimizes the potential for side-effects caused by introducing the electromechanical devices to an original suspension system (e.g. increased unsprung mass, reduced stiffness or rigidity, etc.). In general, the electromechanical devices described herein may be configured to be lightweight and strong and may be located in locations that minimize potential increases in unsprung mass (for example, further from the hub of the wheel, closer to the vehicle frame, etc.).

Figure 14A:
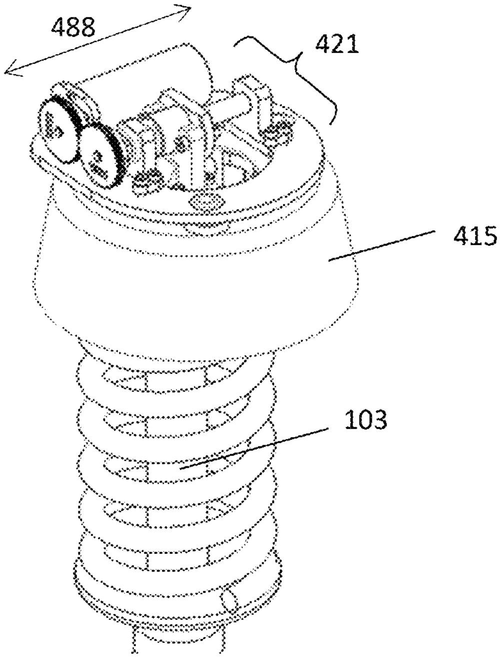
FIG. 14A is an example of an electromechanical device for controlling wheel alignment, the device configured to control the camber or castor of a MacPherson strut suspension system.
Figure 14B:
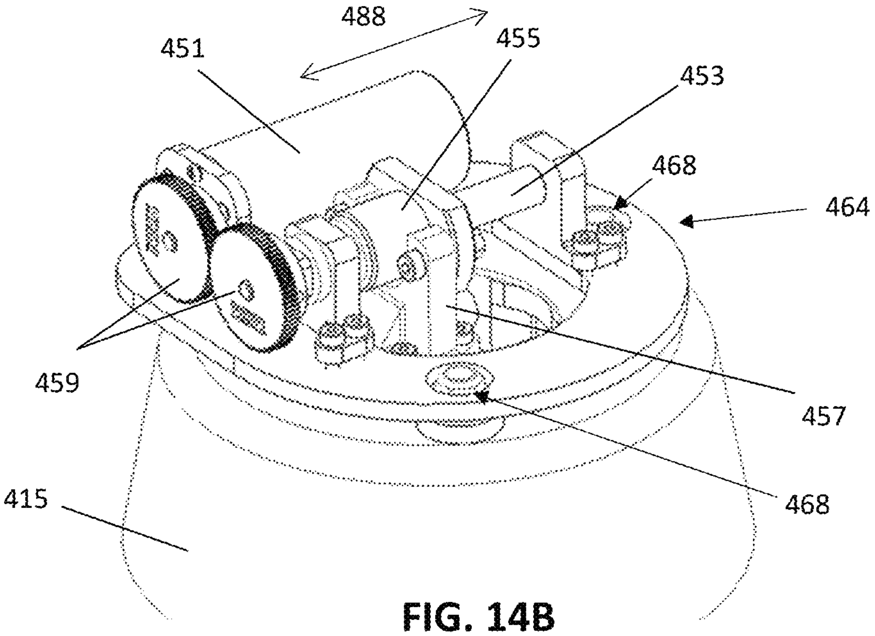
FIG. 14B is a close-up of the electromechanical device shown in FIG. 14A.
Figure 14C:
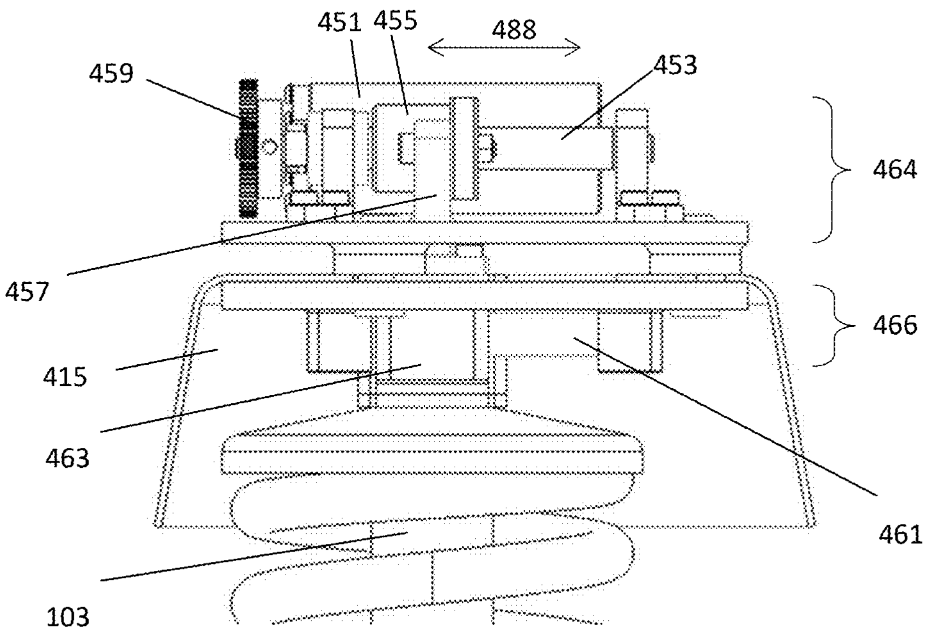
FIG. 14C is a side view of the electromechanical device shown in FIG. 13A, with the strut tower sectioned to show the device.
Figure 14D:
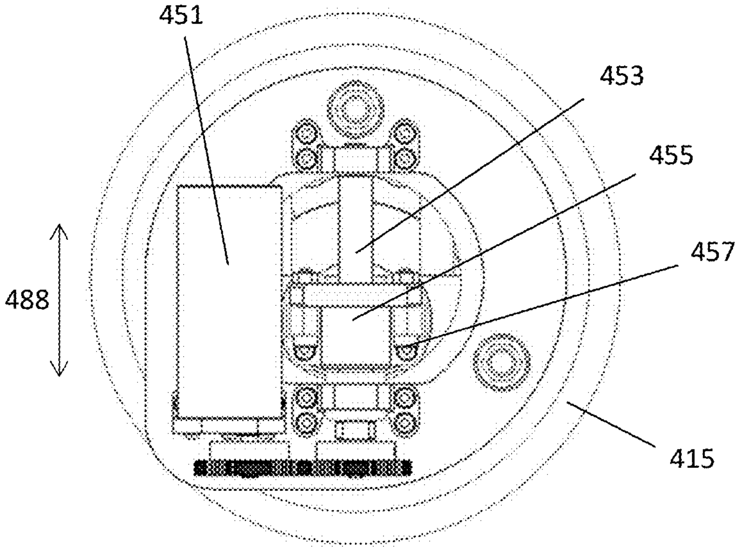
FIG. 14D is a top view of the electromechanical device shown in FIG. 14A.
Figure 14E:
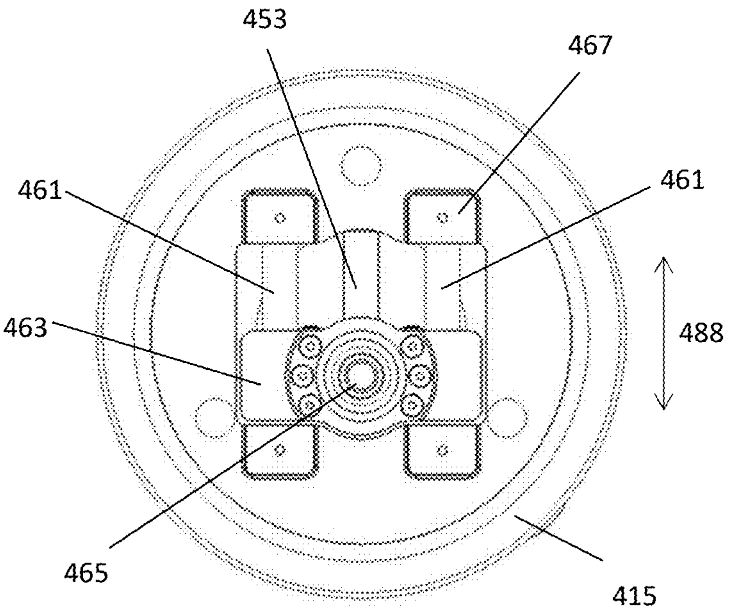
FIG. 14E is a bottom view of the electromechanical device shown in FIG. 14A.

FIGS. 14A-14E illustrate a variation of an electromechanical device for controlling vehicle suspension settings, the device configured to control the camber of a MacPherson strut suspension system. In FIG. 14A the apparatus (configured as an electromechanical device) 421 is located atop a strut 103 and mounts to a vehicle's strut tower 415, which is part of or connected to the vehicle frame. FIG. 14B is a close-up of the electromechanical device 421 illustrated in FIG. 14A. The apparatus includes a mount body having two parts that are secured to the vehicle frame (e.g., secured to the strut tower 415); in this example, the upper portion 464 of the mount body is connected above the frame 415 and the lower portion 466 is connected below the frame, bolts 468 are used to secure the two parts together with the frame rigidly held between the two parts. The apparatus also includes a strut holder 465 (configured as a spherical bearing) that is part of a lower translation stage 463. The strut holder can therefore move with the lower translation stage along a first translational axis 488 by translating back and forth over a translational bearing surface formed by the outer longitudinal surface of each of a pair of shafts configured as linear rails 461 on either side of the holder. The holder (strut holder) may be rigidly connected to one or more linear bearings (not shown) that ride on these linear rails. The electromagnetic actuator (including electric motor 451, spur gears 459, and a linear actuator including ball screw 453, and a ball nut 455) drive the holder back and forth in the first translational axis 488 to adjust the camber. FIGS. 14C, 14D and 14E are a partially sectioned side view, top view and bottom view, respectively, of the electromechanical device 421 illustrated in FIG. 14A.

Thus, the electromechanical device 421 includes an electric motor 451, two spur gears 459, a ball screw 453, a ball nut 455, an upper translation stage 457, a lower translation stage 463 (the lower translation stage may be fixed to the upper translation stage and the two, along with the strut holder, move relative to the upper mount body portion), two linear rails 461 (forming the translational bearing surface, and may be part of the lower mount body portion) and a spherical bearing 465 (the strut holder in this example). The strut holder 465 may be rigidly or movably coupled to the top (e.g., the top end, also referred to as simply the end) of the strut 103. The top of the strut 103 in this example secures inside the holder (spherical bearing) 465, which is coupled with (e.g., housed within) the lower translation stage 463. The lower translation stage 463 slides along the linear rails 461 on linear bearings (not shown) with low sliding friction. Thus, the lower translation stage 463 rigidly connects to the upper translation stage 457, and the upper translation stage 457 rigidly connects to the ball nut 455. The ball nut 455 is configured to be driven back and forth along the ball screw

453 with low friction, thereby translating the upper translation stage 457, lower translation stage 463, strut holder (spherical bearing) 465 and top of the strut 103. As the bottom of the strut is secured to the wheel assembly (see FIG. 11A), translating the top of the strut 103 alters its angle and thereby alters the camber angle of the wheel 101. The ball screw 453 is supported by bearings capable of supporting radial and thrust loads (not shown), the ball screw 453 driven to rotate about its central axis by the spur gears 459, which are driven by the electric motor 451. In the variation shown in FIGS. 14A-14E, the strut holder is able to move in the first translational axis 488 (e.g., x), but is constrained from moving in any other translational axis relative to the mount body; specifically, a translational axis that is perpendicular to the first translational axis (z or y).

The electric motor 451 may be driven to rotate clockwise or counterclockwise, thereby translating the top of the strut 103 back and forth along the line of the ball screw 453. The electric motor 451 may be controlled by an electronic controller (e.g., processor, not shown), and may include an encoder (not shown) to monitor the position of the motor 451 and/or the top of the strut 103. The electromechanical actuator or other portion of the apparatus may also include a lock that is releasable and, when engaged, locks the position of the strut holder relative to the mount body and therefore the vehicle frame. The lock may be a mechanical lock and the electronic controller controlling the electromechanical actuator may control engaging/disengaging (e.g., locking/unlocking) of the lock.

Although the examples shown above include an electric motor, any of the electromechanical devices described herein may include any one or more of any appropriate drivers, which may be (but not limited to) a mechanical actuator (e.g. motor, etc.), a pneumatic actuator, a hydraulic actuator, or an electrical actuator. Any driver may translate in rotation or in linear dimensions, or in rotation and in linear dimensions, and the translation may be reversible. Any driver may include a position sensor (e.g. encoder, etc.).

Any of the electromechanical devices described herein, and particularly the mount body, may include one or more structural members, which may be any appropriate type of structural member, including (but not limited to) a beam, flange, support, shaft, rail, rod, housing, stage, mount, bracket, bolt, nut, or screw (e.g. power screw, lead screw, ball screw, etc.). Structural members may remain stationary or may translate in rotation or in linear dimensions, or in rotation and linear dimensions.

Any of the electromechanical devices described herein may include one or more adjustment members, e.g., linear actuators, which may be any appropriate type of adjustment member, including (but not limited to) a screw (e.g. power screw, lead screw, ball screw, etc.), gear (e.g. spur gear, helical gear, worm gear, etc.), pulley, belt, shaft, slide, pivot, lever-arm, connecting rod, cam, translation stage, carriage, or nut (e.g. ball nut, etc.). The adjustment members may translate in rotation or in linear dimensions, or in rotation and linear dimensions.

Figure 15A:
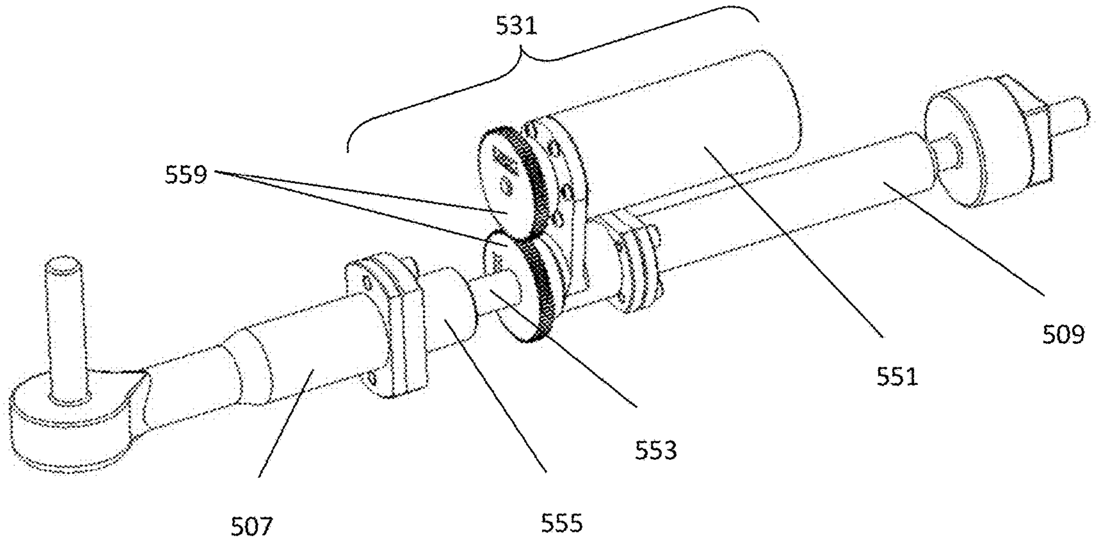
FIG. 15A is an example of an electromechanical device for controlling wheel alignment, the device configured to control the toe of a wheel.
Figure 15B:
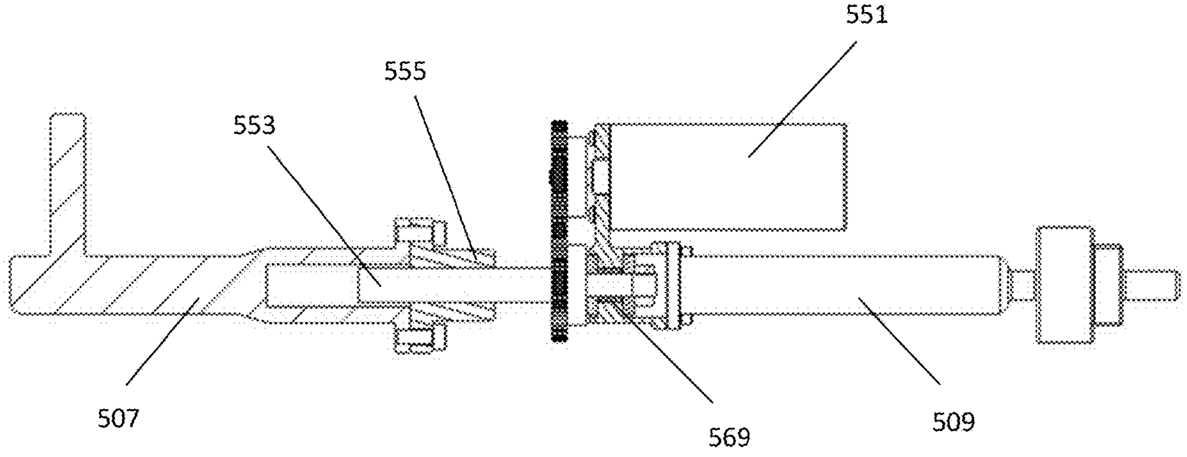
FIG. 15B is a partially sectioned side view of the electromechanical device in FIG. 15A.

FIGS. 15A and 15B illustrate a variation of an electromechanical device for controlling vehicle suspension settings, the device configured to control the toe of a wheel 101. In this example, an electromechanical device 531 locates between an outer tie rod 507 and an inner tie rod 509. The electromechanical device 531 includes an electric motor 551, two spur gears 559, a ball screw 553, a ball nut 555 and a bearing pack 569. The outer tie rod 507 connects to the ball nut 555, which is configured to be driven back and forth along the ball screw 553 with low friction, thereby translating the outer tie rod 507. As the outer tie rod 507 connects to the wheel assembly (see FIGS. 11A, 12A and 13A), translating the outer tie rod 507 alters the toe angle of the wheel 101. The ball screw 553 is supported by a bearing pack 569 capable of supporting radial and thrust loads, the ball screw 553 driven to rotate about its central axis by the spur gears 559, which are driven by the electric motor 551.

Any of the electromechanical devices configured to control the toe of a wheel described herein may be configured to locate at any location between the steering box and the wheel of a vehicle. For example, an electromechanical device may locate at the outer end of an outer tie rod, between the outer tie rod and the wheel assembly. In another example, an electromechanical device may locate at the inner end of an inner tie rod, between the inner tie rod and the steering box. The electromechanical apparatus (e.g., the toe adjusting apparatus) may completely replace the tie rod, extending between the steering box and the wheel assembly, and may (as shown in FIGS. 23A-23H below) include one or more 'partial' tie-rods that are connected in line with a telescoping region. In general, an electromechanical device configured to control the toe of a wheel will alter the distance between the outer end of an outer tie rod and the inner end of an inner tie rod.

Thus, any of the electromechanical devices configured to control the toe of a wheel described herein may be configured to control the toe of a steered wheel or a non-steered wheel. For a non-steered wheel, an electromechanical device may be located at any location on a toe-arm. For example, an electromechanical device may locate at the outer end of a toe-arm, between the toe-arm and the wheel assembly. In another example, an electromechanical device may locate at the inner end of a toe-arm, between the toe-arm and the mounting point on the vehicle's body or chassis. In another example, an electromechanical device may completely replace the toe arm, extending between the mounting point on the vehicle's body or chassis and the wheel assembly. In general, an electromechanical device configured to control the toe of a non-steered wheel will alter the effective total length of a toe-arm.

Figure 16A:
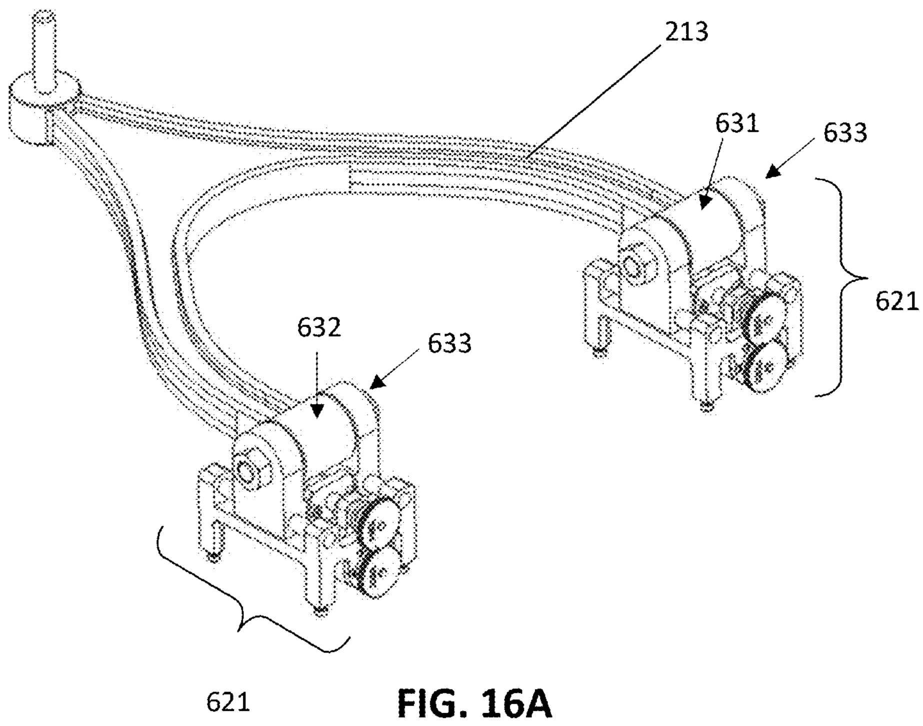
FIG. 16A is an example of an apparatus (system) for controlling wheel alignment, the system configured as two (identical) electromechanical devices to control the camber of a double-wishbone suspension system.
Figure 16B:
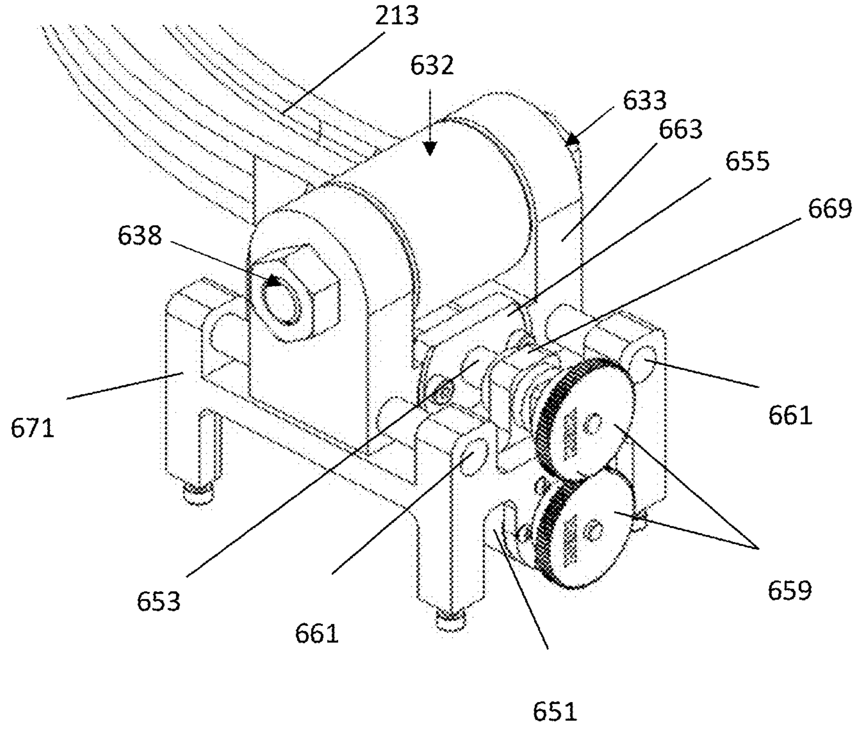
FIG. 16B is a close-up of one of the electromechanical devices shown in FIG. 16A.

FIGS. 16A and 16B illustrate a variation of an electromechanical device for controlling vehicle suspension settings, the device configured to control the camber of a double-wishbone suspension system. In this example, two identical electromechanical devices 621 locate at the inner pivot points of the upper wishbone 213, on the first 631 and second 632 ends, respectively of the upper wishbone 213. The ends of the wishbone are pivotably attached to the camber-adjusting apparatus through a pivoting joint with the wishbone arm holder 633 of the translation stage 633 of the apparatus, so that the wishbone arm may pivot relative to the wishbone arm holder. Each electromechanical device 621 includes an electromechanical actuator including an electric motor 651, two spur gears 659, a ball screw 653, and a ball nut 655. The apparatus also includes a translation stage 663 to which the wishbone arm holder 633 is connected (or in this example, integral with). The mount body 671 may couple to the frame (not shown) directly or indirectly and may include or be rigidly connected to two linear rails 661 that form a translational bearing surface. The device also includes a bearing pack 669. The translational stage including the wishbone arm holder may also include a linear bearing (not shown) that rides on the translational bearing surface formed by the parallel pair of rails (shafts 661).

In this example, the wishbone arm holder of the translation stage is configured to hold an end of the upper wishbone arm; in this example the upper wishbone arm includes a channel into which a bolt or screw 638 may be attached to secure it in the wishbone arm holder. The upper wishbone 213 connects to the translation stage 663, which connects to the ball nut 655. The ball nut 655 is configured to be driven back and forth along the ball screw 653 with low friction, thereby translating the translation stage 663. As the upper wishbone 213 connects to the wheel assembly (see FIGS. 12A and 13A), translating the upper wishbone 213 alters the camber angle of the wheel 101. The ball screw 653 is supported by the bearing pack 669 capable of supporting radial and thrust loads, the ball screw 653 driven to rotate about its central axis by the spur gears 659, which are driven by the electric motor 651. In this example, the mount body, the shafts and the wishbone arm holder are configured to support a relatively high load (e.g., above a load threshold), while the electromechanical controller is mounted to the mount body and couples to the translation frame (e.g., wishbone arm holder) and does not need to support these high loads.

Figure 17A:
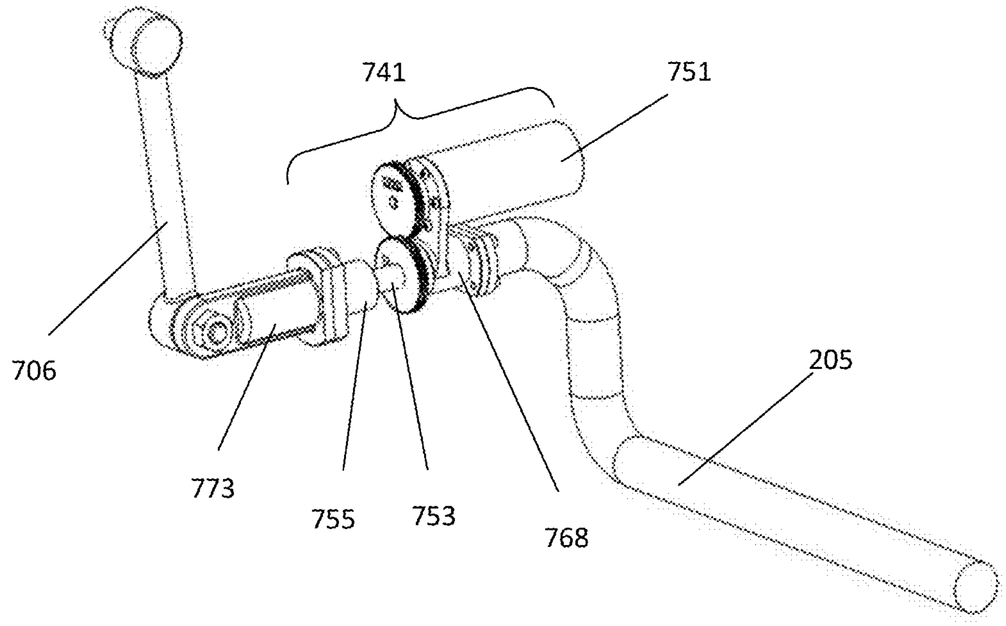
FIG. 17A is an example of an electromechanical device for controlling anti-roll bar stiffness.
Figure 17B:
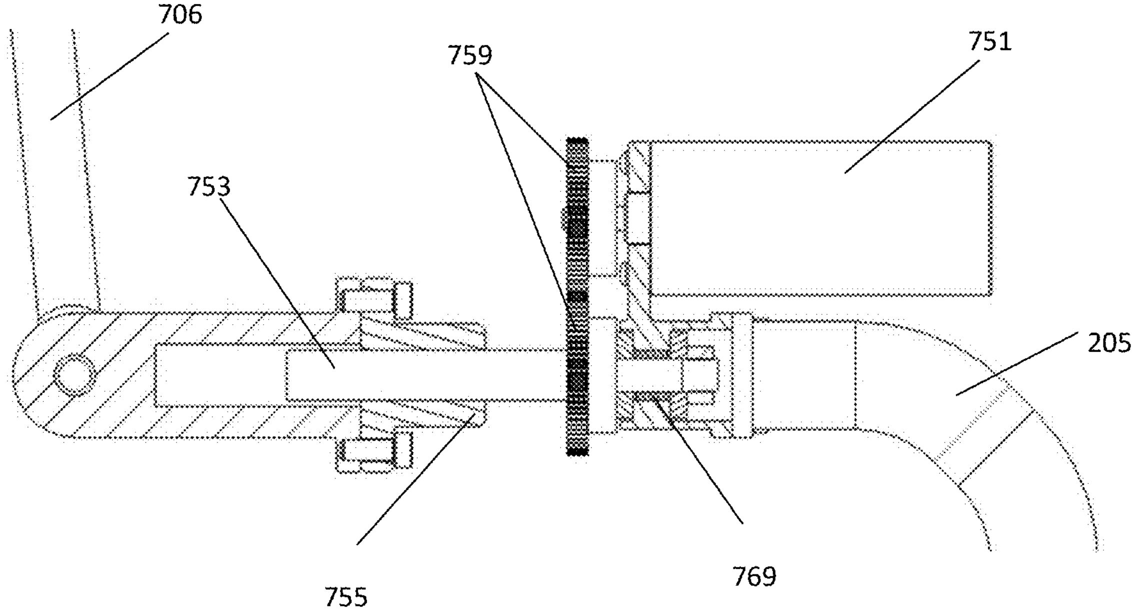
FIG. 17B is a partially sectioned side view of the electromechanical device in FIG. 17A.

FIGS. 17A and 17B illustrate a variation of an electromechanical device for controlling vehicle suspension settings, the device configured to control the stiffness of an anti-roll bar. In this example, an electromechanical device 741 locates between an anti-roll bar 205 and a link 706. The electromechanical device includes an electric motor 751, two spur gears 759, a ball screw 753, a ball nut 755, a connecting flange 773, a mount 768 and a bearing pack 769. The mount 768 connects to the end of the anti-roll bar 205, the mount 768 housing the bearing pack 769. The ball screw 753 is supported by the bearing pack 769, which is capable of supporting radial and thrust loads. The ball screw 753 is driven to rotate about its central axis by the spur gears 759, which are driven by the electric motor 751. The ball nut 755 is configured to be driven back and forth along the ball screw 753 with low friction, thereby translating the connecting flange 773 and altering the distance between the end of the anti-roll bar 205 and the link 706. This distance between the end of the anti-roll bar 205 and the link 706 represents an effective length of the anti-roll bar 205. If the effective length of the anti-roll bar 205 is higher, the stiffness of the anti-roll bar 205 will be lower. In contrast, if the effective length of the anti-roll bar 205 is lower, the stiffness of the anti-roll bar 205 will be higher.

Any of the electromechanical devices configured to control the stiffness of an anti-roll bar described herein may be configured to locate at any location on an anti-roll bar, or at any location between an anti-roll bar and a wheel or suspension assembly. An electromechanical device may connect indirectly to a wheel or suspension assembly (e.g. via a link, etc.), or may connect directly to a wheel or suspension assembly.

Any of the electromechanical devices configured to control the stiffness of an anti-roll bar described herein may be configured to control the stiffness of any anti-roll bar, including (but not limited to) a front anti-roll bar or a rear anti-roll bar.

Figure 18A:
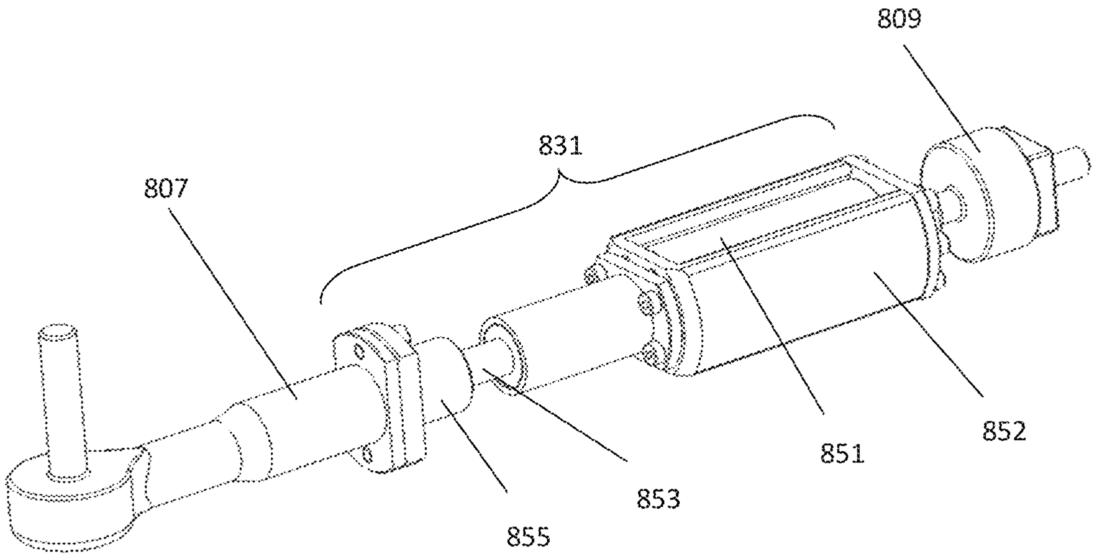
FIG. 18A is another example of an electromechanical device for controlling wheel alignment, the device configured to control the toe of a wheel.
Figure 18B:
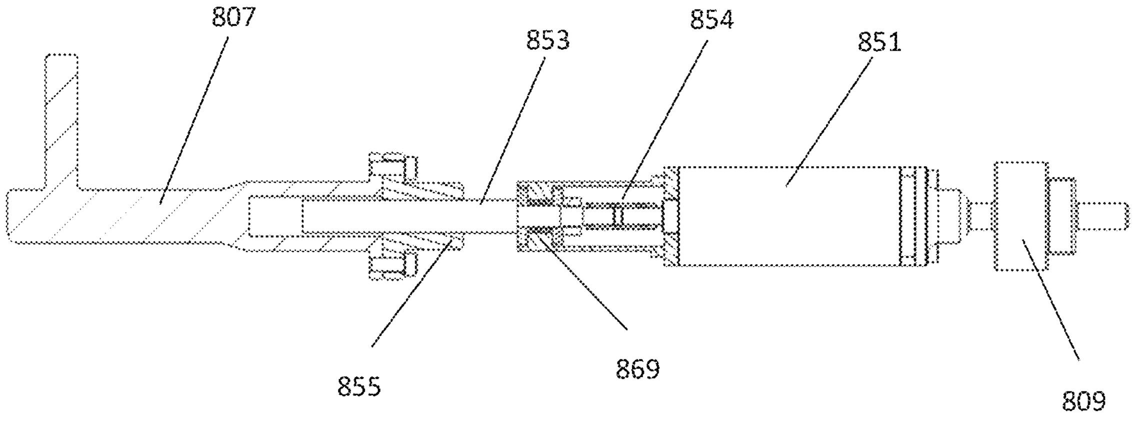
FIG. 18B is a partially sectioned side view of the electromechanical device in FIG. 18A.

FIGS. 18A and 18B illustrate another variation of an electromechanical device for controlling vehicle suspension settings, the device configured to control the toe of a wheel 101. In this example, an electromechanical device 831 locates between an outer tie rod 807 and an inner tie rod 809. The electromechanical device includes an electric motor 851, a motor housing 852, a ball screw 853, a shaft coupler 854, a ball nut 855 and a bearing pack 869. The outer tie rod 807 connects to the ball nut 855, which is configured to be driven back and forth along the ball screw 853 with low friction, thereby translating the outer tie rod 807. As the outer tie rod 807 connects to the wheel assembly (see FIGS. 11A, 12A and 13A), translating the outer tie rod 807 alters the toe angle of the wheel 101. The ball screw 853 is supported by a bearing pack 869 capable of supporting radial and thrust loads, the ball screw 853 driven to rotate about its central axis by the electric motor 851 via a shaft coupler 854. In this example, as the electric motor 851 output shaft couples directly to the ball screw 853 via a shaft coupler 854, no gears or the like are needed.

Any of the electromechanical devices described herein may or may not include gears for driving adjustment members to adjust suspension settings. Where gears are used, they may have any gearing ratio (e.g. 1:1, 1:2, 2:1, 1:3, 1:4, etc.). The output shaft of any driver of any electromechanical device described herein may be coupled directly to any adjustment member. Where a screw (e.g. ball screw, lead screw, etc.) is included in any electromechanical device described herein, the output shaft of the at least one driver may be coupled directly or indirectly to the screw, and furthermore the output shaft of the at least one driver may take any spatial orientation relative to the screw, including being parallel, perpendicular, co-linear, coincident, or at any angle to the screw.

As mentioned above, any of the units for adjusting alignment described herein (e.g., an electromechanical devices) may be controlled by an electronic controller. Each electromechanical device may be controlled by its own control system, by another device's control system, by a common, centralized control system, or by a combination of control systems.

Figure 19:
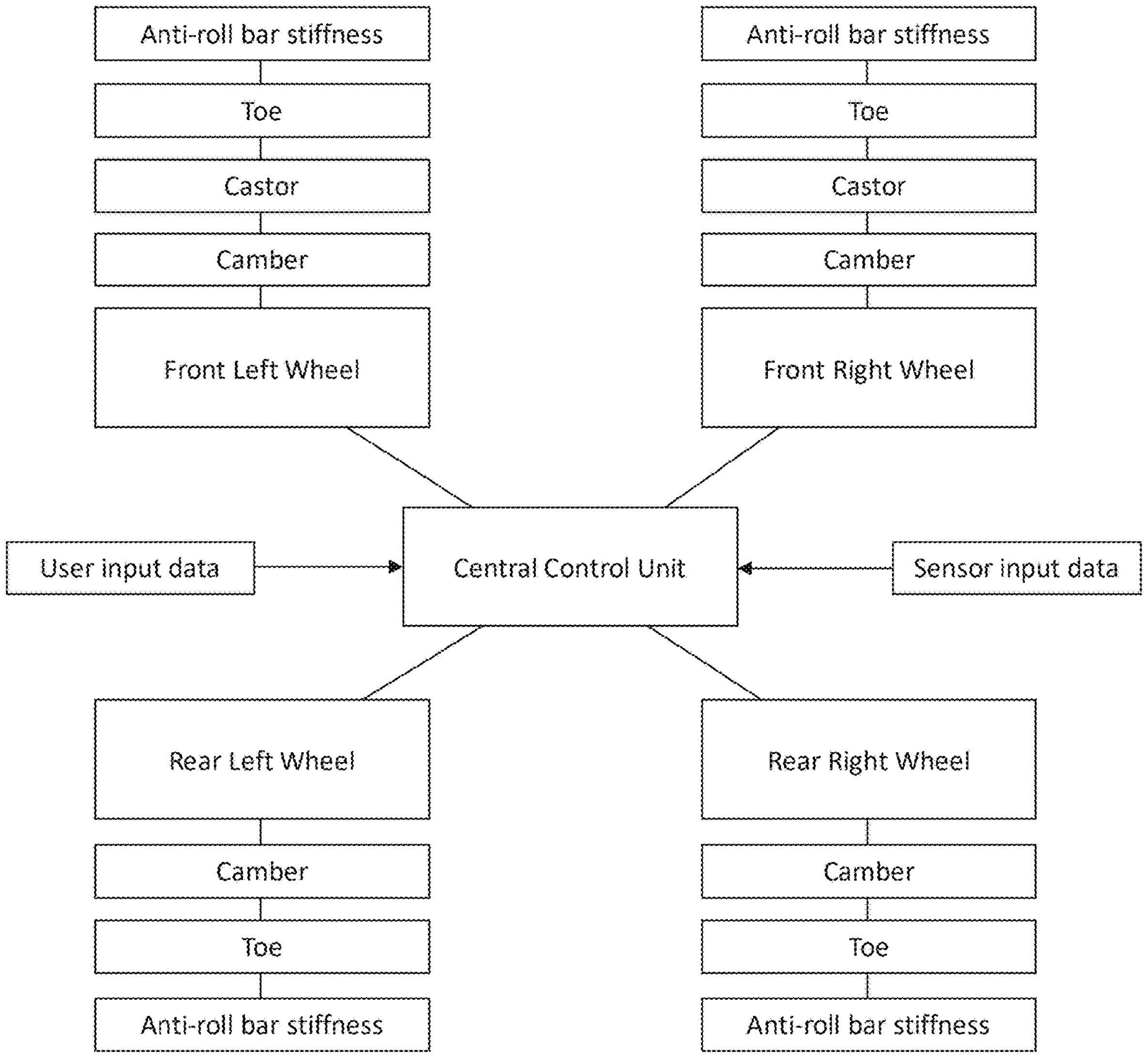
FIG. 19 is an example of a central control unit, configured to control multiple devices fitted to a vehicle.

FIG. 19 illustrates a variation of a control unit configured to control electromechanical devices for controlling vehicle suspension settings. In this example, a central control unit is used to control all electromechanical devices fitted to all four wheels of a vehicle. One or more electromechanical devices are fitted to each of the front left wheel and front right wheel to control the camber, castor, toe and anti-roll bar stiffness of each front wheel. Further, one or more electromechanical devices are fitted to each of the rear left wheel and rear right wheel to control the camber, toe and anti-roll bar stiffness of each rear wheel. The central control unit is configured to receive user input data and sensor input data, and output control signals to all electromechanical devices in order to control and alter suspension settings as appropriate.

In some variations the control unit may be a control system for active wheel alignment systems (AWASs) as described above. The AWAS may be integrated into the central control unit.

Any control unit described herein may additionally control other suspension or vehicle functions not relating to the electromechanical devices described herein, including (but not limited to) magnetic dampers, adaptive dampers, spring rates, and roll centers.

Any of the electromechanical devices described herein may include one or more sensors (including in particular, the IMUs described above), and may further include closed-loop control.

Figure 20A:
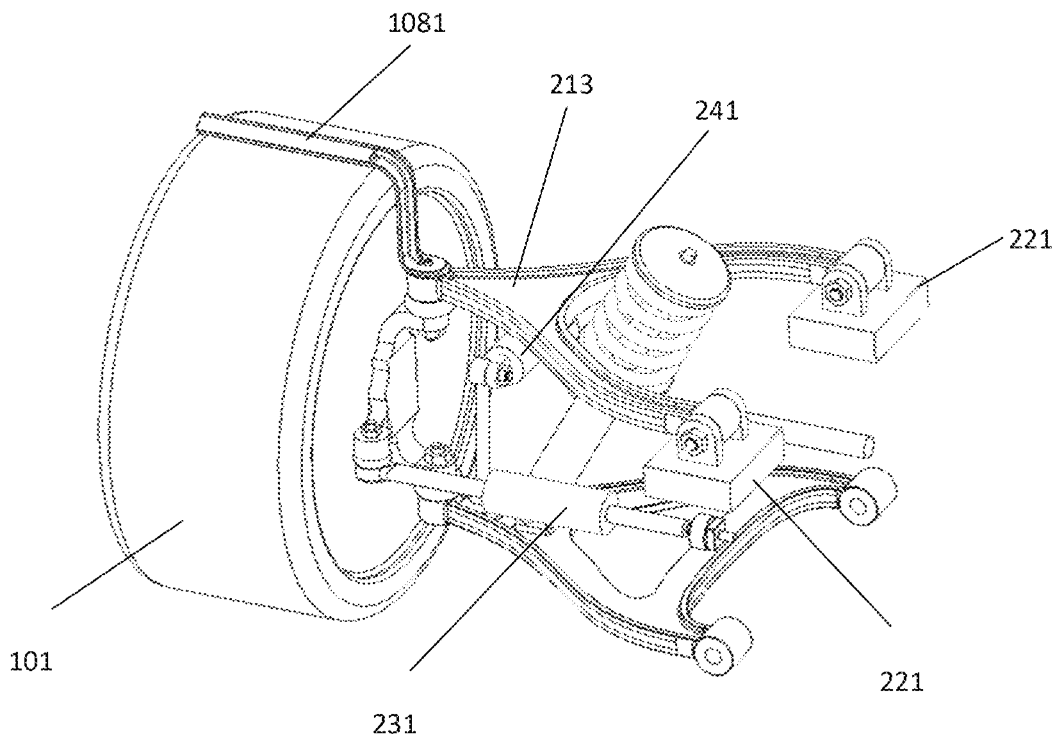
FIG. 20A is an example of an apparatus (system) fitted to a single wheel, including a sensor array to measure tire temperature.
Figure 20B:
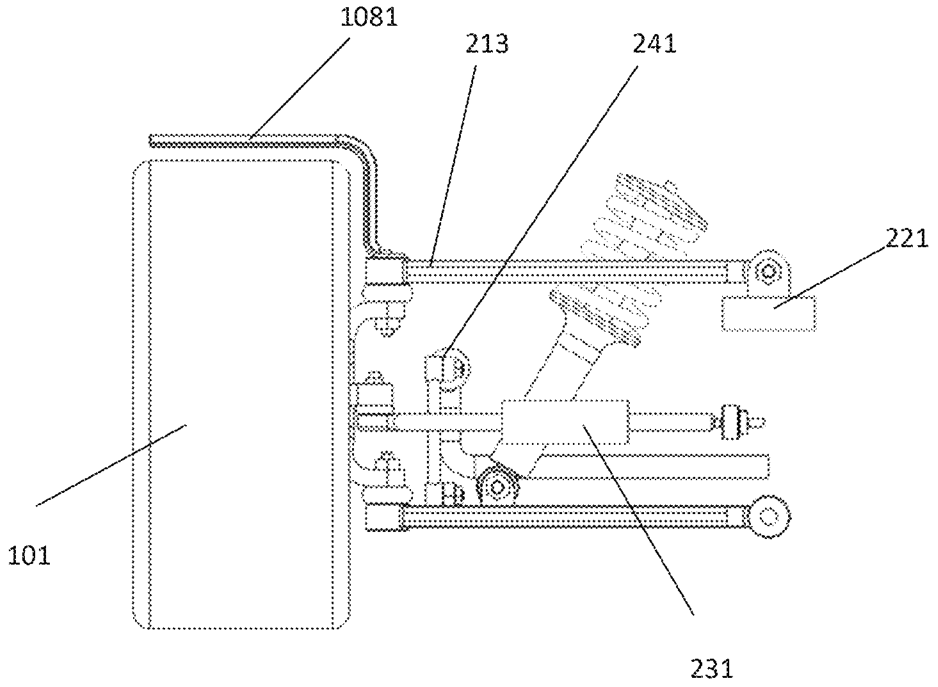
FIG. 20B shows a side view of the apparatus (system) shown in FIG. 20A.

FIGS. 20A and 20B illustrate variations of electromechanical devices for controlling vehicle suspension settings, configured with feedback sensors. Four electromechanical devices 221, 231, 241 control the suspension settings of one wheel 101 of a vehicle, as described in FIGS. 12A-2C. In this example, a temperature sensor array 1081 mounts to the upper wishbone 213 and locates above the surface of the tire on the wheel 101 to monitor the temperature of the tire. The temperature sensor array 1081 includes one or more temperature sensors along its length to monitor the temperature of the tire from the inner edge to the outer edge, or from the outer edge to the inner edge.

In one example, the temperature sensor array 1081 may include two discrete sensors, one located above the inner edge of the tire to monitor the temperature of the inner edge, and one located above the outer edge of the tire to monitor the temperature of the outer edge.

In another example, the temperature sensor array 1081 may include three discrete sensors, one located above the inner edge of the tire to monitor the temperature of the inner edge, one located above the center of the tire to monitor the temperature of the center, and one located above the outer edge of the tire to monitor the temperature of the outer edge.

In yet another example, the temperature sensor array 1081 may include one continuous sensor bar to monitor the temperature at all points across the tire and provide a complete temperature profile.

Any of the electromechanical devices or systems of devices described herein may include one or more temperature sensors. In particular, temperature sensors may be used to assess the appropriateness of a given set of suspension settings. In particular, temperature sensors may be used to monitor the temperature of the tire surface and thereby assess the appropriateness of a given camber setting. For example, if the temperature of the outer edge of a tire is higher than the temperature of the inner edge, an electromechanical device configured to control camber can be commanded to provide more negative (or less positive) camber. In another example, if the temperature of the inner edge of a tire is higher than the temperature of the outer edge, an electromechanical device configured to control camber can be commanded to provide less negative (or more positive) camber.

Figure 21A:
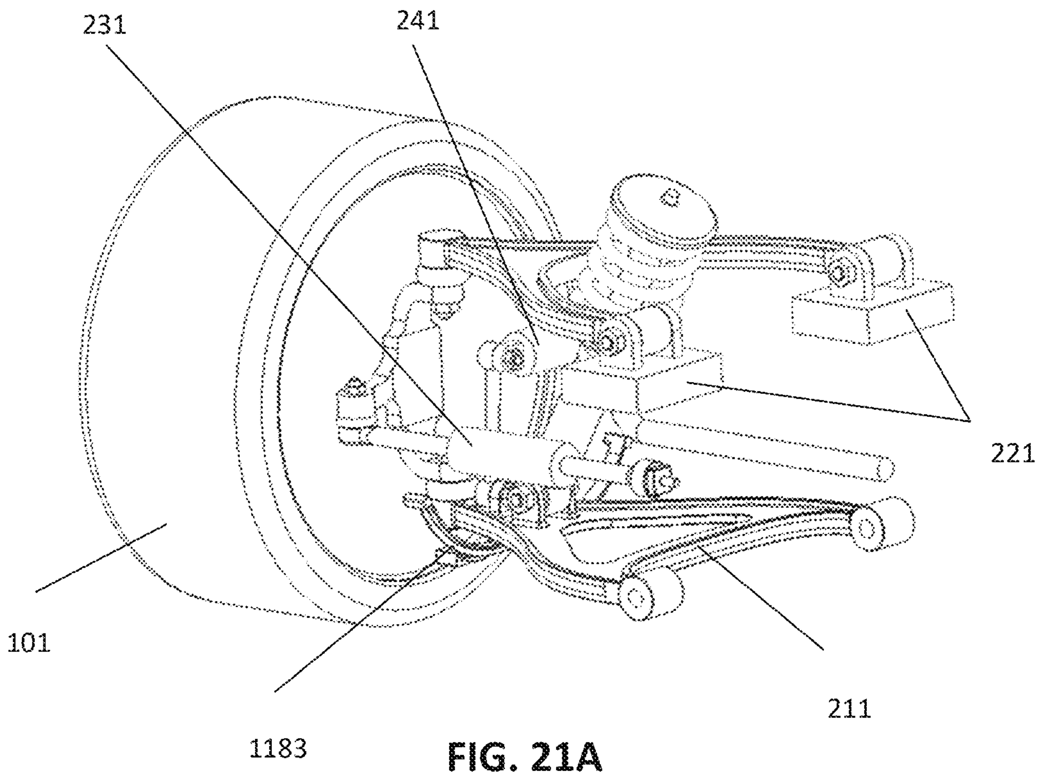
FIG. 21A shows an example of an apparatus (system) fitted to a single wheel, including a sensor array to measure wheel angles.
Figure 21B:
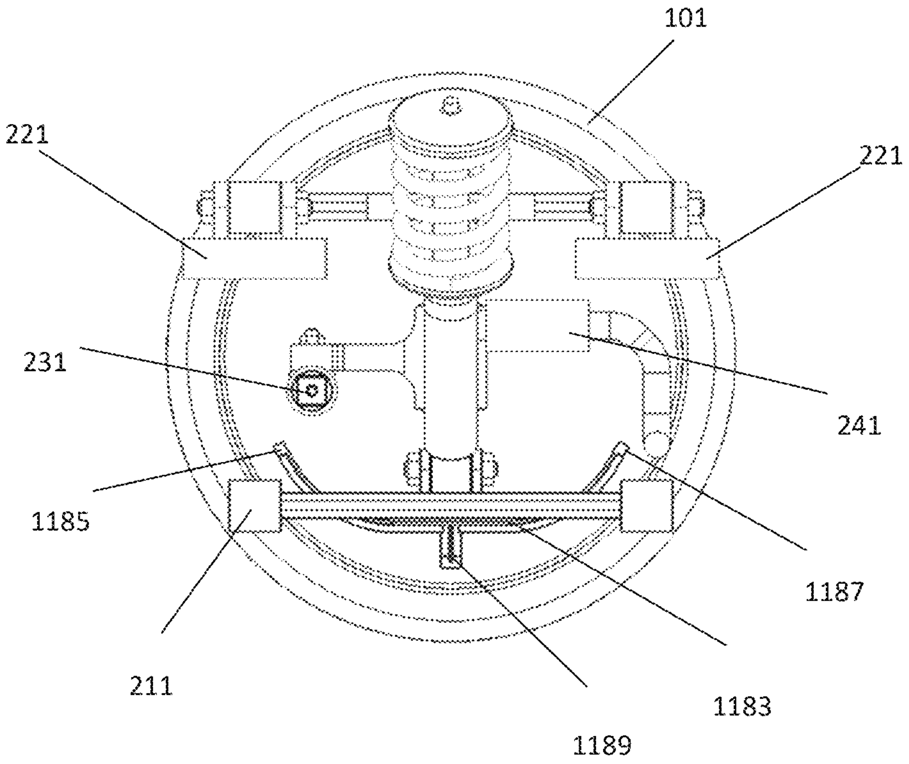
FIG. 21B shows a side view of the apparatus (system) shown in FIG. 21A.

FIGS. 21A and 21B illustrate variations of electromechanical devices for controlling vehicle suspension settings, configured with feedback sensors. Four electromechanical devices 221, 231, 241 control the suspension settings of one wheel 101 of a vehicle, as described in FIGS. 12A-2C. In this example, a position sensor array 1183 mounts to the lower wishbone 211 and locates behind the wheel 101 to monitor the angle or position of the wheel 101. The position sensor array 1183 in this example includes three position sensors 1185, 1187, 1189. The position sensors 1185, 1187, 1189 are configured to monitor the camber angle and toe angle of the wheel 101.

In one example, a position sensor array may include one or more discrete sensors. In another example, a position sensor array may include one continuous sensor bar to provide a position profile.

Any of the electromechanical devices or systems of devices described herein may include one or more position sensors. In particular, position sensors may be used to assess the appropriateness of a given set of suspension settings. In particular, position sensors may be used to monitor the toe angle of a wheel.

Any of the electromechanical devices or systems of devices described herein may include one or more sensors of one or more types, including (but not limited to) position sensors, encoders (e.g. linear, rotary, optical, etc.), limit switches, proximity sensors, temperature (thermal) sensors, reed switches, light sensors (e.g. ultraviolet, infrared, etc.), and accelerometers. For example, an electromechanical device may include one or more position sensors and one or more temperature sensors.

For any of the electromechanical devices or systems of devices including one or more sensors described herein, open-loop, partial closed-loop, full closed-loop, intermittent closed-loop, continuous closed-loop, semi-automatic, or fully-automatic control may be provided.

For any of the electromechanical devices or systems of devices including one or more sensors described herein, automatic, continuous, real-time control of suspension settings may be provided.

Figure 22A:
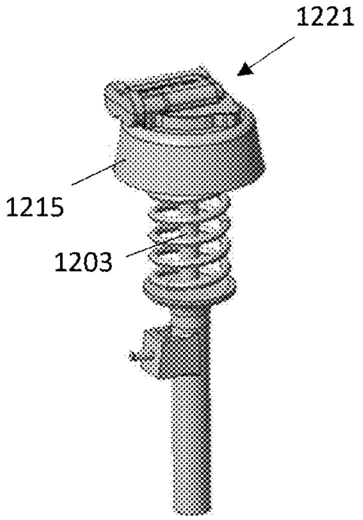
FIGS. 22A-22G show an example of an electromechanical apparatus for controlling wheel alignment similar to that shown in FIGS. 14A-E. Specifically the apparatus of FIGS. 22A-12H is an apparatus for adjusting camber of a vehicle having a suspension with a strut.
Figure 22B:
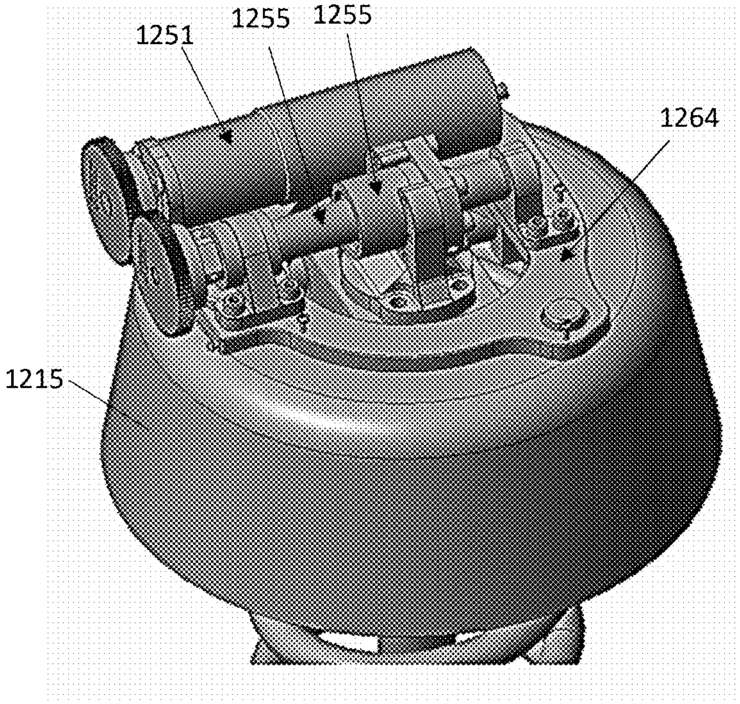
Figure 22C:
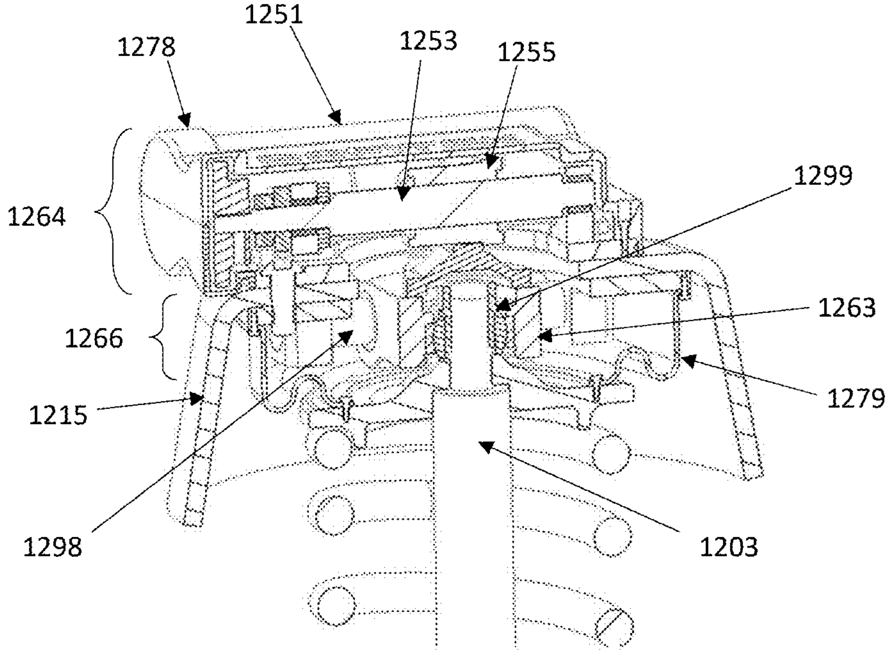
Figure 22D:
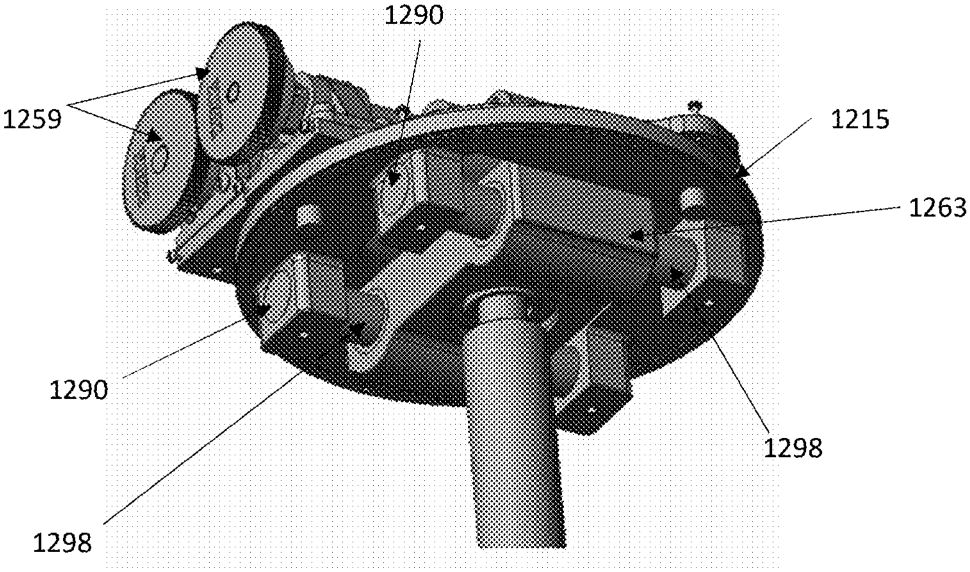
Figure 22E:
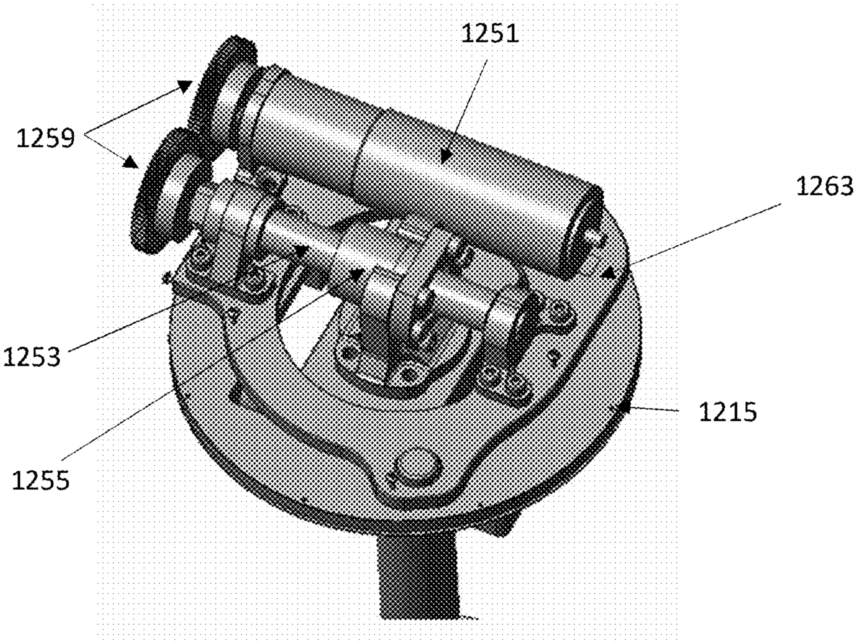
Figure 22F:
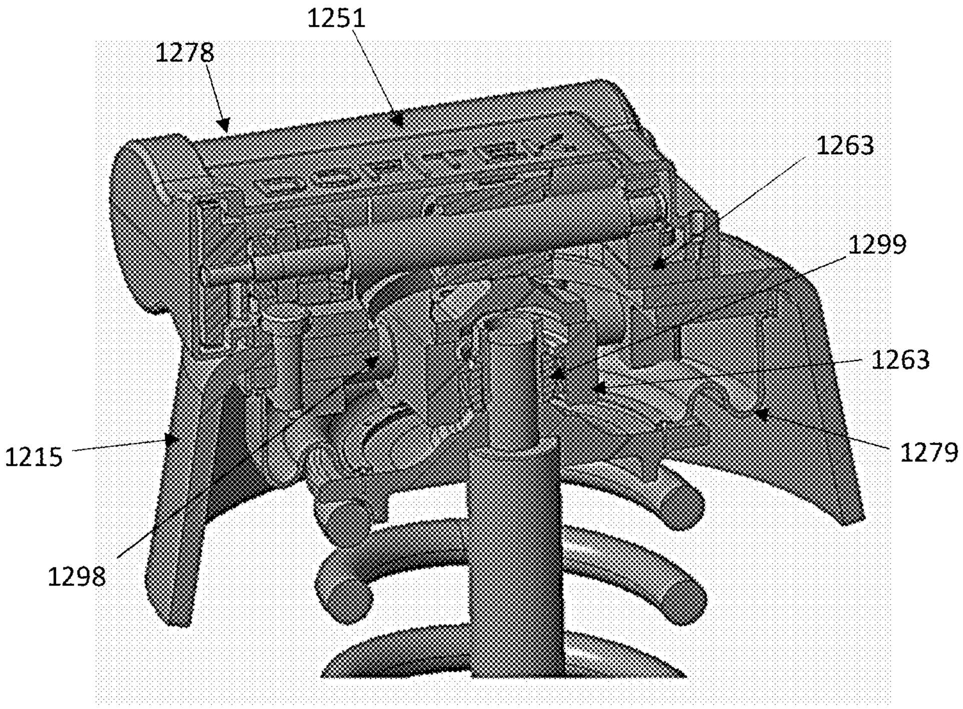
Figure 22G:
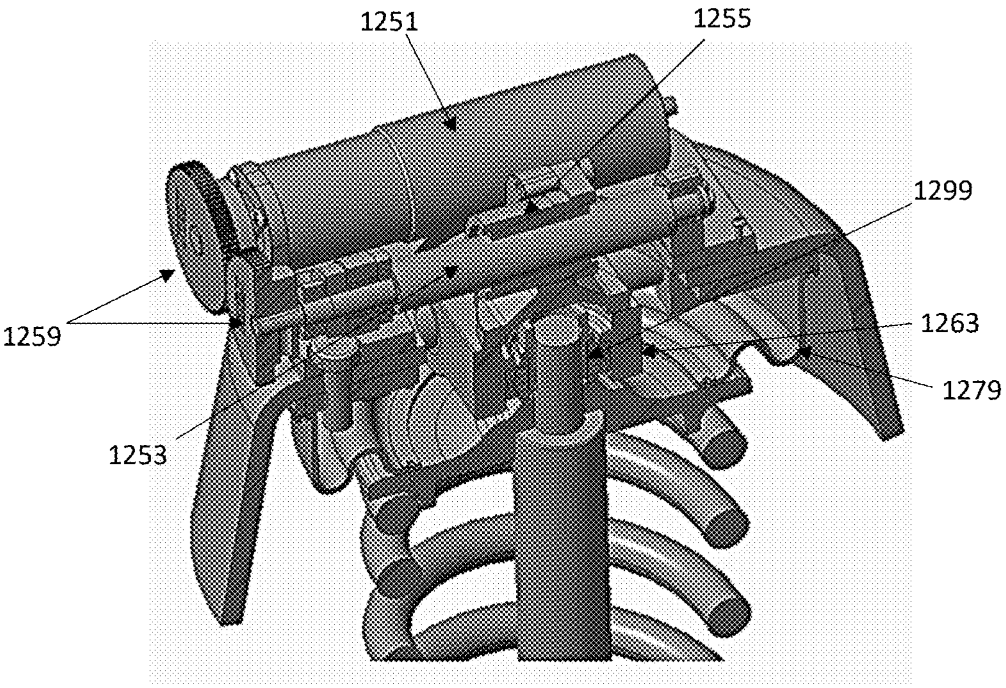

FIGS. 22A-22G show another variation of an apparatus 1221 (e.g., device, system, etc.) for adjusting camber of a vehicle having a suspension that includes a strut 1203, such as a MacPherson-type suspension. In this example, similar to the apparatus shown in FIGS. 14A-14E, the apparatus includes a mount body that rigidly connects to the vehicle frame (e.g., a strut tower 1215). The mount body includes an upper mount body 1264 and a lower mount body 1266. The upper mount body is configured to connect to the lower mount body, in this example, to hold the frame of the vehicle 1215 between the two, so that the two portions of the mount body are rigidly connected, as shown in FIG. 22C. An opening on each of the upper and lower mount bodies aligns with an opening through the frame (strut tower 1215). The lower mount body spans across this opening and the strut holder 1299, which is connected or formed as part of a movable translation stage 1263, moves in a single translational axis on a translational bearing surface 1298 that forms part of the lower mount body. In this example, the translational bearing surface is the cylindrical outer surface of each of two shafts 1290 that extend in parallel across the opening. The translational axis extends in parallel to the direction of these shafts. In FIGS. 22A, 22C and 22F, a housing 1278 covers the upper mount body, and a flexible sleeve 1279 covers the lower mount body, allowing movement of the strut holder and protecting the apparatus from debris.

The upper housing 1278 in this example covers the electromechanical actuator; in FIGS. 22B, 22D, 22E and 22G, the upper cover has been removed (though the lower, flexible, cover 1279 is still in place). The electromechanical actuator in this example includes an electric motor 1251 that drives rotation of a pair of gears 1259, which couple with the linear actuator, configured here as a ball screw 1253 and ball nut 1255. The ball screw is rotated by the gears, so that the ball nut may travel forwards and backwards along the ball screw; since the ball nut is connected (e.g., rigidly connected) to the translation stage/strut holder, rotation of the ball screw drives movement of the strut holder. An electric controller (e.g., processor, not shown) communicates with and controls operation of the electromechanical actuator.

In operation, the strut holder is driven by the electromechanical actuator so that it moves on the translational bearing surface 1298 of the pair of shafts (e.g., by action of a bush/linear bearing on/in or part of the translation stage) when the electric motor of the electromechanical actuator rotates the ball screw and moves the ball nut forwards or backwards in the first translational axis. In this example, this first translational axis is generally aligned into the plane of the wheel (e.g., in some variations within +/−30 degrees of the rotational axis of the wheel). The apparatus is constrained so that the translation stage, and therefore the strut holder, is constrained in all other translational directions (e.g., axes perpendicular to the first translational axis). An encoder (not shown) may monitor the position of the holder/translation stage and may provide feedback to the electrical controller.

As described above, the apparatus shown in FIGS. 22A-22G is configured so that the high loads paced on the apparatus by, e.g., the strut of the suspension are transferred to the frame body through a separate portion of the mount body that is isolated from the portion of the mount body supporting or including the electromechanical actuator. In this example, the upper mount body 1263 supports the electromechanical actuator, and does not need to support a high load; the electromechanical actuator does not need to operate under the high load conditions that the lower mount body 1266 does. The lower mount body 1266 supports the load from the strut 1203, and this load is transmitted through the strut holder 1299 and translation stage 1263 to the pair of shafts forming the translational bearing surface 1298 of the lower mount body 1266. The lower mount body is configured to mount under the vehicle frame (e.g., the strut tower 1215), and thus this load is transferred through the device to the frame without passing through the electromechanical actuator. Thus, the lower mount body may be configured to handle a minimum load threshold of greater than about 1000 kilograms (kg) (e.g., about 1500 kg or more, about 2000 kg or more, about 2500 kg or more, about 3000 kg or more about 3200 kg or more, about 3500 kg or more, about 4000 kg or more, etc.).

Figure 23A:
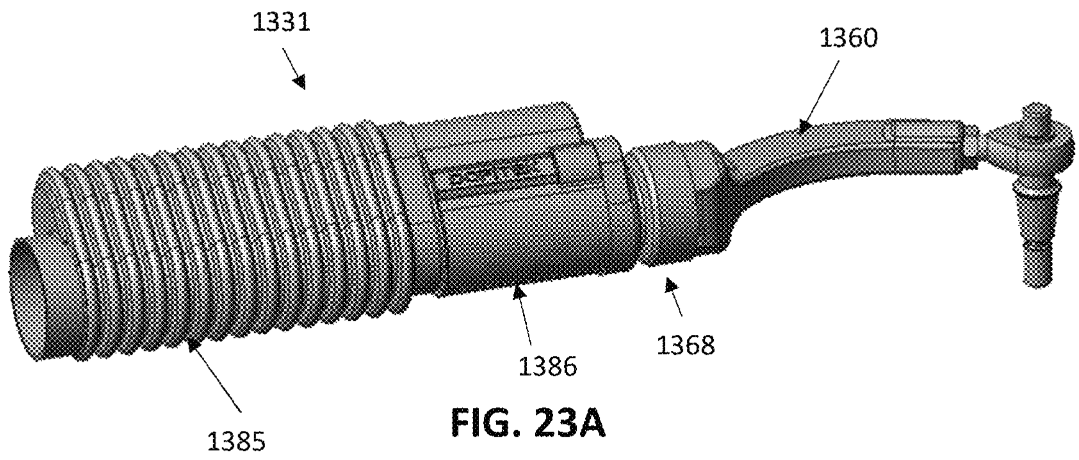
FIGS. 23A-23H illustrate an example of an electromechanical apparatus for controlling wheel alignment, similar to that shown in FIG. 15A-15B.
Figure 23B:
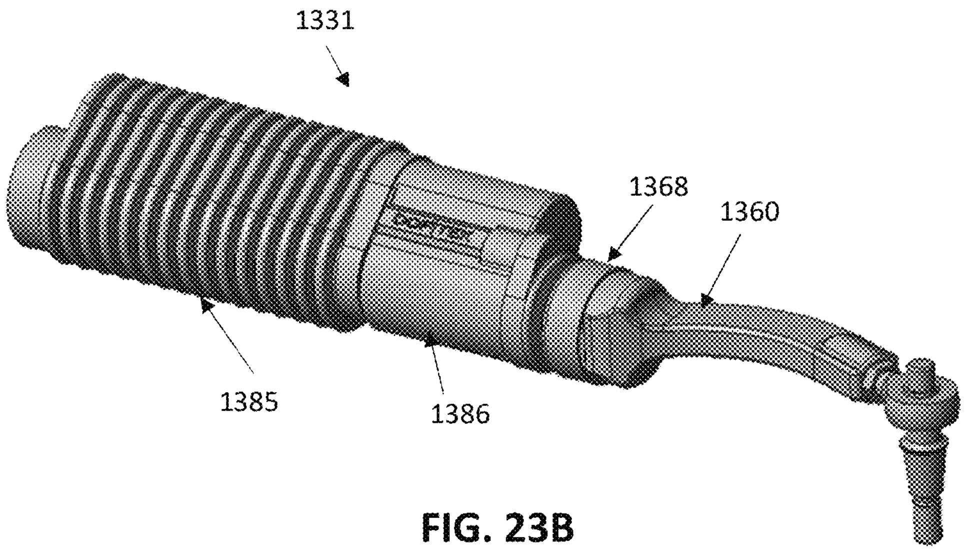
Figure 23C:
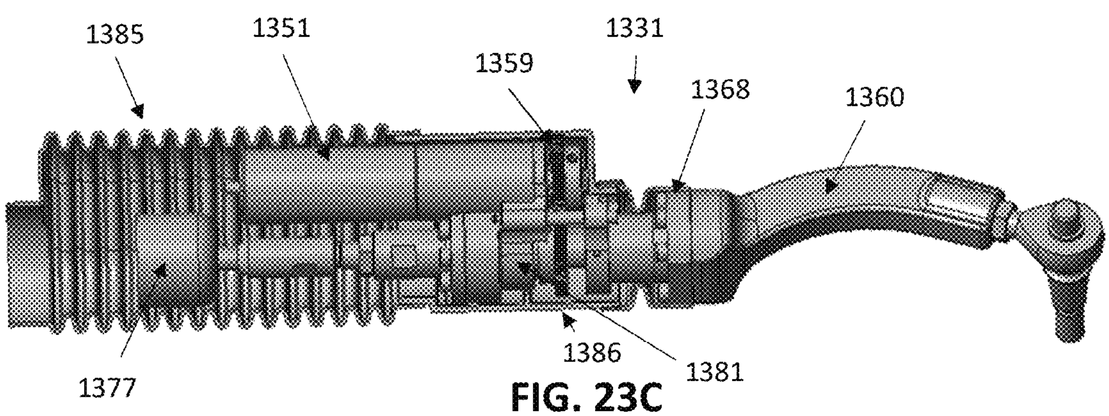
Figure 23D:
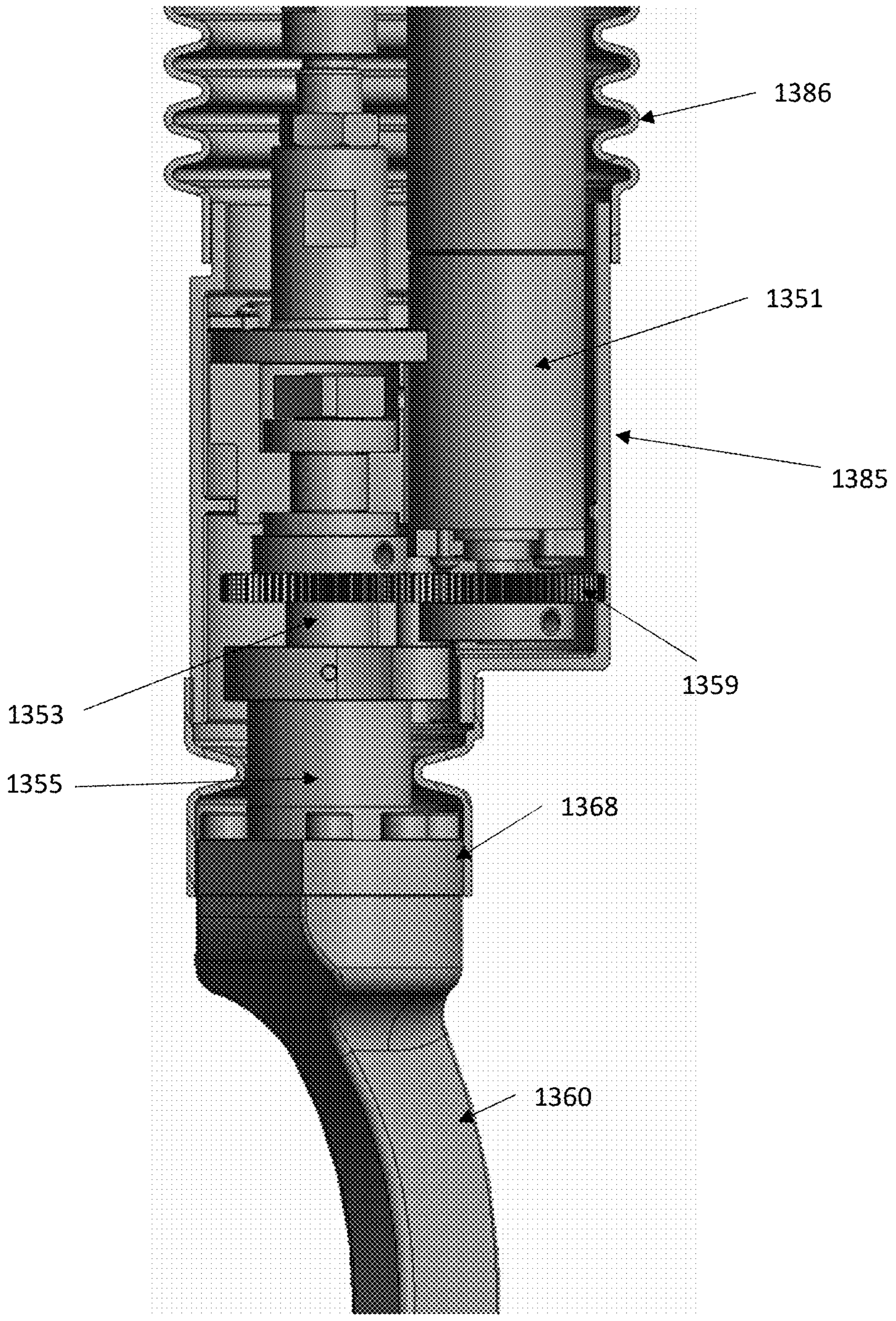
Figure 23E:
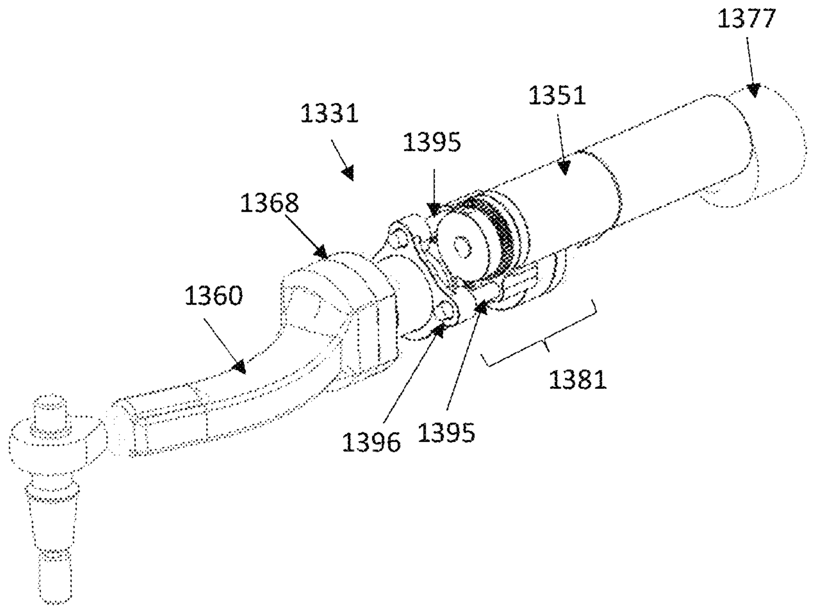
Figure 23F:
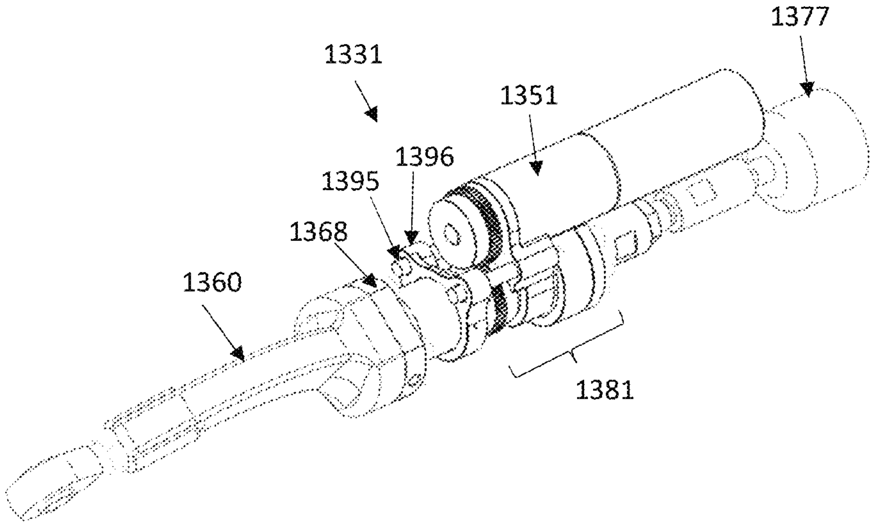

FIGS. 23A-23H illustrate another example of a toe adjusting apparatus (e.g., toe adjusting unit) that may electrically adjust the toe of the vehicle (e.g., a wheel of the vehicle), similar to that shown and described above for FIGS. 15A-15B and 18A-18B. In FIG. 23A, the toe adjusting unit 1331 includes a tie rod mount 1368 at a distal end, configured to connect to an end of the tie rod 1360. In some variations, the tie rod (anterior tie rod 1360) forms a part of the apparatus. In FIGS. 23A-23H, the tie rod mount rigidly mount the anterior tie rod to ball nut 1355 of the telescoping rod; a ball screw (not visible) is held within the ball nut and through the ball nut and partially into the distal end of the anterior toe rod. The telescoping rod portion 1381 is configured to extend or retract in the distal-to-proximal direction. The telescopic rod may include the linear actuator (e.g., in this example, a ball screw 1353 and ball nut; the ball nut may be the same feature as the tie rod mount 1368) that is acted on by the electromechanical actuator (e.g., electric motor 1351, gears 1359, etc.). The electromechanical actuator is coupled to the telescoping arm through the ball screw and ball nut (in this example, the tie rod mount), and drives rotation of the telescoping arm to extend or retract the telescoping arm relative to the tie rod. A housing 1386 (including a flexible portion 1385) may cover the electromechanical actuator and telescoping arm portion.

In this example, the telescoping rod portion 1381 is coupled in-line with a partial (e.g., truncated) tie rod, shown here as an anterior tie rod portion 1360. The posterior end of the apparatus includes a steering link mount 1377. In some variations a second tie rod portion (posterior tie rod portion) may be included between the telescoping rod and the steering link mount. The steering link mount in this example is a ball joint, allowing pivoting. The telescoping rod portion may lengthen or shorten by rotation driven by the electric motor (the rotation of which is transmitted by the gears) to rotate the ball screw, which rotates in the one or more ball nuts that are rigidly secured through the anterior tie rod portion to the rest of the alignment (and therefore to the frame of the vehicle). The electromechanical actuator is positioned out of line with the load-bearing path of the tie rod; in FIGS. 23A-23F, the electromechanical actuator (e.g., the motor) is position in parallel with the rest of the tie rod's load bearing path. This may conserve space and also protect the electromechanical actuator.

In FIG. 23A-23H, a steering link mount 1377 is located at a proximal end and is configured to connect to a linkage of a steering rack of the vehicle (not shown). This steering link mount may be a ball joint.

The toe adjusting unit also includes one or more (two are shown in FIGS. 23E-23H) stays (stay rods 1395) that connect the electromechanical actuator (e.g., electric motor 1351) to the main body frame of the apparatus. The stay rods are slidably connected to a bearing 1396 (shown in this example as an alignment collar) that is rigidly connected to the tie rod mount (directly or, as shown, indirectly) to prevent rotation of the electromechanical actuator relative to the tie rod mount during operation.

Figure 23G:
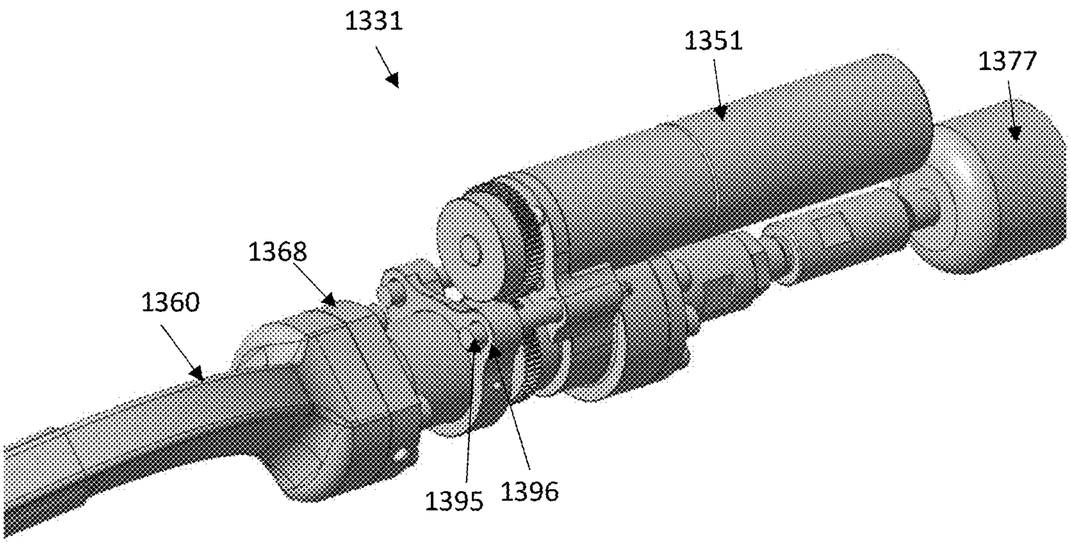
Figure 23H:
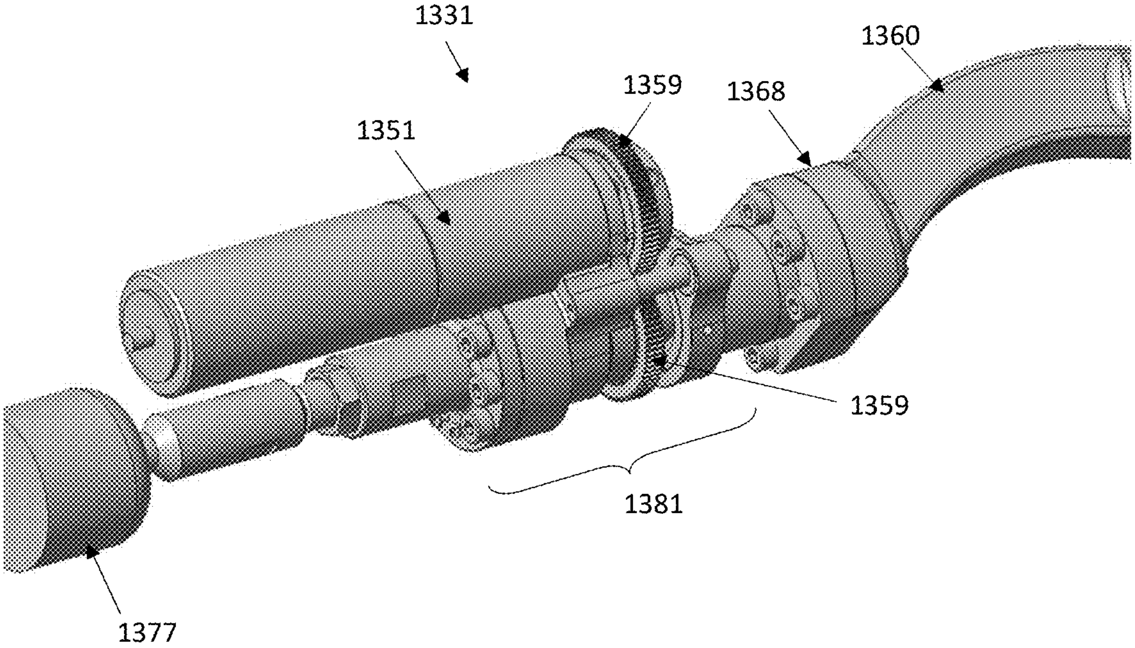

In FIGS. 23-23G, the alignment collar 1396 is rigidly mounted (keyed) onto the ball nut 1368. It is guided and prevented from rotating by the two shafts/stays 1395, which are rigidly mounted into the bearing housing. This apparatus may, in particular, allow toe control for front or rear wheel steering, as it provides a compact form.

For example, the toe actuator in this example includes a soft (e.g., non-metallic) outer housing to reduce the weight and size of the housing. The use of the alignment collar may provide significant strength and rigidity even in the absence of a rigid housing. The toe actuators described herein may instead use a plastic outer housing to prevent dust or other contamination but does not need to provide structural support (e.g., to prevent the outer link, which connects to the wheel, from rotating with respect to the actuator housing).

Electromechanical (EM) Brake

Any of the wheel alignment control apparatuses described herein, including those configured to electronically adjusting camber, caster and/or toe, may include, as a safety component, a redundant braking/locking mechanism including an electromechanical brake. These electromechanical brakes may prevent changes to wheel alignment (e.g., camber, castor and/or toe) in the event of power outage or other malfunction. These apparatuses have numerous advantages over friction-type EM brakes, which are typically more expensive, heavy and bulky.

In general, these apparatuses may include a notched disk coupled to a moving element of the motor that they are configured to brake/lock, such as the shaft of the motor. The apparatus also includes a brake arm (e.g., a shaft, lever, etc.) that is coupled to a solenoid or linear actuator and configured so that in the powered state the solenoid or linear actuator holds the brake arm away from the notched disk. If the solenoid or linear actuator is disengaged, e.g., by loss of power or otherwise turning off of the solenoid or linear actuator, the brake arm is allowed to engage with the one or more notches on the notched disk, forcing the motor to brake and lock in position. In some examples the brake may also include one or more supports on either side of the brake arm, to prevent bending or damage to the brake arm. The one or more supports may be mounted to the body of the motor, as part of a housing at least partially holding the brake arm, and in some cases the solenoid.

Figure 24:
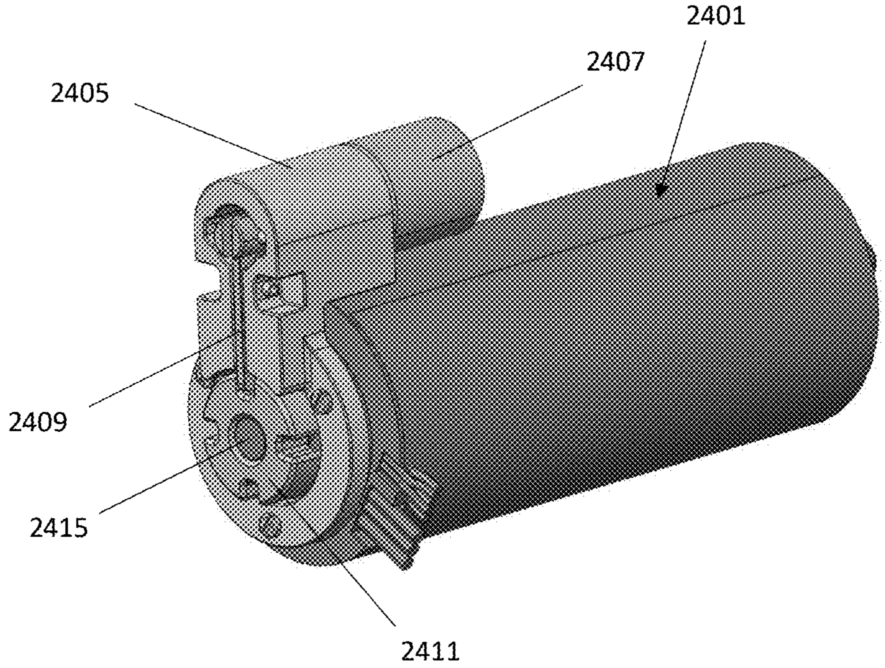
FIG. 24 illustrates one example of an electromechanical brake for any of the electronically adjustable systems (e.g., systems for adjusting camber, caster and/or toe) as described herein.

For example, FIG. 24 illustrates one example of an electromechanical brake apparatus. As shown in FIG. 24, the apparatus (e.g., system) mounts to the rear of a motor 2401 and prevents the motor shaft from turning in the event of power outage. In FIG. 24 the apparatus includes a mounting bracket/housing 2405, a solenoid 2407 with a spring-return, a brake arm 2409 (e.g., lever), and a notched/slotted disk/wheel 2411 that couples onto the rear shaft 2415 of the motor. The solenoid is configured such that when powered the brake arm is disengaged from the notched disk to allow it and the motor shaft to rotate freely. Conversely, when power is removed, the spring return on the solenoid causes the lever to engage with the notched disk to prevent it and the motor shaft from rotating, locking in the current position.

This system is extremely light, cheap and small, and has the added advantage of positive-locking rather than friction braking. The example shown in FIG. 24 uses a pull-type solenoid, however other configurations may be used, including a push-type solenoid arrangement, or a linear actuator. In some examples the solenoid may be rear mounted, so it engages directly with the notched disk without the need for a pivoting lever. For example, instead the piston of the solenoid may extend directly into the notched/slotted disk/wheel or may include a rigid extension that extends into the notched/slotted disk/wheel. The example shown in FIG. 24 may advantageously provide a compact packaging solution which is beneficial for the active wheel alignment apparatuses described herein, as it is highly space efficient.

Any of the methods described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +1-5% of the stated value (or range of values), +1-10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points.

For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A device for adjusting wheel alignment of a vehicle having a suspension, the device comprising:

- a frame, configured to be mounted to a wheel of the vehicle;
- a drive motor coupled to the frame;
- a drive shaft driven in rotation by the drive motor;
- a gear engaging the drive shaft, such that rotation of the drive shaft by the drive motor rotates the gear; and
- an offset bearing coupled to the gear and configured to be rotated by the gear when the drive motor rotates the gear, wherein the offset bearing is configured to couple with a linkage coupled to a body of the vehicle and to drive the linkage to adjust the alignment of the vehicle.

2. The device of claim 1, wherein the offset bearing comprises an offset bushing.

3. The device of claim 1, wherein the linkage coupled to the body of the vehicle is configured to be driven into or away from the body of the vehicle.

4. The device of claim 1, wherein the gear comprises a hypoid drive gear and an offset gear, wherein the offset gear is configured to rotate the offset bearing.

5. The device of claim 4, wherein the offset gear is rigidly coupled to the offset bearing.

6. The device of claim 1, wherein the drive shaft is geared to the offset bearing with a greater than 5:1 gear ratio.

7. The device of claim 1, wherein the linkage comprises a control arm of a double wishbone suspension system.

8. The device of claim 1, wherein the linkage comprises a link of a multi-link suspension system.

9. The device of claim 1, wherein the linkage comprises a toe link of a suspension system for controlling the toe angle of the wheel.

10. The device of claim 1, wherein the frame is configured to secure the drive motor perpendicular to the linkage.

11. The device of claim 1, wherein the frame is configured to pivotally support the offset bearing; further wherein the drive motor extends laterally from the frame.

12. The device of claim 1, wherein the device is configured to adjust camber or castor or toe of a wheel.

13. The device of claim 1, further comprising an encoder configured to monitor the position of the drive motor or gear.

14. The device of claim 1, wherein the drive motor is configured to lock in position when not driving rotation of the drive shaft.

15. A system for adjusting wheel alignment of a vehicle having a suspension, the system comprising:

- a frame mounted to a wheel of the vehicle;
- a drive motor coupled to the frame;
- a drive shaft driven in rotation by the drive motor;
- a gear engaging the drive shaft, such that rotation of the drive shaft by the drive motor rotates the gear;
- an offset bearing coupled to the gear and configured to be rotated by the gear when the drive motor rotates the gear; and
- a linkage coupled to the offset bearing wherein the linkage is also coupled to a body of the vehicle, wherein rotation of the offset bearing causes the linkage to move axially perpendicular to the wheel or the vehicle to adjust alignment of the wheel.

16. The system of claim 15, wherein the offset bearing is an offset bushing.

17. The system of claim 15, wherein the system is configured as a camber adjustment system.

18. The system of claim 15, wherein the system is configured as a caster adjustment system.

19. The system of claim 15, wherein the linkage comprises an upper or a lower control arm of a double-wishbone suspension.

20. The system of claim 15, wherein the linkage comprises a straight arm of a multilink system.

21. The device of claim 15, wherein the linkage comprises a link of a multi-link suspension system.

22. The device of claim 15, wherein the linkage comprises a toe link of a suspension system for controlling a toe angle of the wheel.

23. The system of claim 15, wherein the drive shaft is geared to the offset bearing through the gear with greater than a 2:1 gear ratio.

24. The system of claim 15, wherein the drive shaft is geared to the offset bearing through the gear with greater than a 5:1 gear ratio.

25. The system of claim 15, further comprising an electronic controller configured to control the actuation of the drive motor.

26. The system of claim 15, wherein the frame is configured to pivotally support the offset bearing; further wherein the drive motor extends laterally from the frame.

27. The system of claim 15, further comprising an encoder configured to monitor the rotation of the drive motor or drive shaft.

28. A device for adjusting wheel alignment of a vehicle having a suspension, the device comprising:

a frame, configured to be securely mounted to a wheel of the vehicle;

a spiral bevel gear including a hypoid drive gear, and an offset gear having a larger diameter than the hypoid drive gear;

a drive motor coupled to the frame and configured to drive the hypoid drive gear; and an eccentric shaft coupled to the offset gear and configured to be rotated by the offset gear, when the drive motor rotates the hypoid drive gear to rotate the offset gear, wherein the eccentric shaft is configured to couple with a linkage coupled to a body of the vehicle.

* * * * *